(12) United States Patent
Hogan

(10) Patent No.: US 9,772,759 B2
(45) Date of Patent: Sep. 26, 2017

(54) DEVICE, METHOD, AND GRAPHICAL USER INTERFACE FOR DATA INPUT USING VIRTUAL SLIDERS

(75) Inventor: Edward P. A. Hogan, Pittsburgh, PA (US)

(73) Assignee: Apple Inc., Cupertino, CA (US)

(*) Notice: Subject to any disclaimer, the term of this patent is extended or adjusted under 35 U.S.C. 154(b) by 1451 days.

(21) Appl. No.: 13/323,761

(22) Filed: Dec. 12, 2011

(65) Prior Publication Data

US 2013/0097551 A1    Apr. 18, 2013

Related U.S. Application Data

(60) Provisional application No. 61/547,642, filed on Oct. 14, 2011.

(51) Int. Cl.
*G06F 3/0484* (2013.01)
*G06F 3/0488* (2013.01)
*G06F 3/0485* (2013.01)

(52) U.S. Cl.
CPC ........ *G06F 3/04847* (2013.01); *G06F 3/0488* (2013.01); *G06F 3/0485* (2013.01); *Y10S 715/974* (2013.01)

(58) Field of Classification Search
None
See application file for complete search history.

(56) References Cited

U.S. PATENT DOCUMENTS

| | | |
|---|---|---|
| 4,837,798 A | 6/1989 | Cohen et al. |
| 4,935,954 A | 6/1990 | Thompson et al. |
| 4,972,462 A | 11/1990 | Shibata |
| 5,003,577 A | 3/1991 | Ertz et al. |
| 5,164,982 A | 11/1992 | Davis |
| 5,283,818 A | 2/1994 | Klausner et al. |
| 5,333,266 A | 7/1994 | Boaz et al. |
| 5,390,236 A | 2/1995 | Klausner et al. |

(Continued)

FOREIGN PATENT DOCUMENTS

| | | |
|---|---|---|
| CN | 101477558 A | 7/2009 |
| DE | 102004029203 A1 | 12/2005 |

(Continued)

OTHER PUBLICATIONS

Bing search q=resize%20scrollbar&qs=n&form=QBRE& Nov. 29, 2015.*

(Continued)

*Primary Examiner* — Jeffrey A Gaffin
*Assistant Examiner* — John M Heffington
(74) *Attorney, Agent, or Firm* — Morrison & Foerster LLP

(57) ABSTRACT

An electronic device with a display and a touch-sensitive surface detects a first user input that selects a first numerical value field and, in response, displays a value selection bar at a first length and with a range of values and displays a value selection object. The device detects a gesture on the value selection bar and, in response to, displays the value selection bar at a second length. While the value selection bar is displayed at the second length, the device detects a third user input that moves the value selection object within the value selection bar and, in response, enters a second value within the range of values into the first numerical value field based on a position of the value selection object on the value selection bar.

21 Claims, 36 Drawing Sheets

(56) References Cited

U.S. PATENT DOCUMENTS

| | | | |
|---|---|---|---|
| 5,392,388 A * | 2/1995 | Gibson | G06F 3/04845 345/684 |
| 5,524,140 A | 6/1996 | Klausner et al. | |
| 5,553,225 A * | 9/1996 | Perry | G06F 3/04855 345/660 |
| 5,559,301 A * | 9/1996 | Bryan, Jr. | G10H 1/0008 345/173 |
| 5,572,576 A | 11/1996 | Klausner et al. | |
| 5,655,094 A * | 8/1997 | Cline | G06F 3/04855 345/684 |
| 5,710,899 A * | 1/1998 | Eick | G06F 3/04847 715/708 |
| 5,936,623 A | 8/1999 | Amro | |
| 5,943,052 A | 8/1999 | Allen et al. | |
| 5,963,623 A | 10/1999 | Kim | |
| 5,973,676 A | 10/1999 | Kawakura | |
| 6,542,171 B1 | 4/2003 | Satou et al. | |
| 6,954,899 B1 | 10/2005 | Anderson | |
| 7,007,239 B1 | 2/2006 | Hawkins et al. | |
| 7,080,324 B1 * | 7/2006 | Nelson | G06F 3/04847 715/771 |
| 7,117,450 B1 * | 10/2006 | Chaudhri | G06F 3/04847 345/471 |
| 7,444,599 B1 * | 10/2008 | Chaudhri | G06F 3/0485 715/815 |
| 7,956,847 B2 | 6/2011 | Christie | |
| 8,510,677 B2 | 8/2013 | Van Os | |
| 2002/0032907 A1 * | 3/2002 | Daniels | H04N 5/44543 725/51 |
| 2002/0063737 A1 * | 5/2002 | Feig | G06F 3/04847 715/786 |
| 2002/0080151 A1 | 6/2002 | Venolia | |
| 2002/0100044 A1 * | 7/2002 | Daniels | H04N 5/44543 725/39 |
| 2002/0154173 A1 * | 10/2002 | Etgen | G06F 3/04855 715/833 |
| 2002/0186252 A1 * | 12/2002 | Himmel | G06F 3/04855 715/787 |
| 2002/0191029 A1 | 12/2002 | Gillespie et al. | |
| 2003/0095149 A1 | 5/2003 | Fredriksson et al. | |
| 2005/0024345 A1 | 2/2005 | Eastty et al. | |
| 2005/0057584 A1 | 3/2005 | Gruen et al. | |
| 2005/0108253 A1 | 5/2005 | Metsatahti et al. | |
| 2005/0192930 A1 * | 9/2005 | Hightower | G06Q 30/02 |
| 2006/0007174 A1 | 1/2006 | Shen | |
| 2006/0015819 A1 | 1/2006 | Hawkins et al. | |
| 2006/0028917 A1 | 2/2006 | Wigginton | |
| 2006/0038796 A1 | 2/2006 | Hinckley et al. | |
| 2006/0090141 A1 | 4/2006 | Loui et al. | |
| 2006/0236262 A1 | 10/2006 | Bathiche et al. | |
| 2007/0146337 A1 | 6/2007 | Ording et al. | |
| 2007/0156565 A1 * | 7/2007 | Singer | G06Q 40/00 705/37 |
| 2007/0192744 A1 | 8/2007 | Reponen | |
| 2007/0198111 A1 | 8/2007 | Oetzel et al. | |
| 2007/0271532 A1 | 11/2007 | Nguyen et al. | |
| 2008/0005087 A1 | 1/2008 | Sato et al. | |
| 2008/0071663 A1 | 3/2008 | Busby | |
| 2008/0155417 A1 | 6/2008 | Vallone et al. | |
| 2008/0163131 A1 | 7/2008 | Hirai et al. | |
| 2008/0172287 A1 | 7/2008 | Tien et al. | |
| 2008/0320391 A1 | 12/2008 | Lemay et al. | |
| 2009/0055768 A1 * | 2/2009 | Chaudhri | G06F 3/0485 715/784 |
| 2009/0174667 A1 | 7/2009 | Kocienda et al. | |
| 2009/0177998 A1 * | 7/2009 | Barrios | G06F 3/04855 715/799 |
| 2009/0222768 A1 * | 9/2009 | Roe | G06F 17/30592 715/850 |
| 2009/0241048 A1 | 9/2009 | Augustine et al. | |
| 2009/0273571 A1 * | 11/2009 | Bowens | G06F 3/03547 345/173 |
| 2009/0322692 A1 | 12/2009 | Kim et al. | |
| 2010/0070913 A1 * | 3/2010 | Murrett | G06F 3/017 715/786 |
| 2010/0231354 A1 | 9/2010 | Nishiguchi et al. | |
| 2010/0231534 A1 | 9/2010 | Chaudhri et al. | |
| 2010/0251167 A1 * | 9/2010 | DeLuca | G06F 3/0485 715/786 |
| 2010/0283743 A1 * | 11/2010 | Coddington | G06F 3/0485 345/173 |
| 2011/0202834 A1 * | 8/2011 | Mandryk | G06F 3/04883 715/701 |
| 2011/0202837 A1 * | 8/2011 | Fong | G06F 3/0485 715/702 |
| 2011/0246943 A1 * | 10/2011 | Fujibayashi | G06F 3/0488 715/833 |
| 2013/0016126 A1 * | 1/2013 | Wang | G06F 3/041 345/650 |
| 2013/0326401 A1 | 12/2013 | van Os | |

FOREIGN PATENT DOCUMENTS

| | | |
|---|---|---|
| EP | 684543 A1 | 11/1995 |
| EP | 795811 A1 | 9/1997 |
| EP | 1614109 A2 | 1/2006 |
| EP | 1942401 A1 | 7/2008 |
| JP | 09152856 A * | 6/1997 |
| JP | 2001 202176 | 7/2001 |
| WO | 99/16181 A1 | 4/1999 |
| WO | 00/63766 A1 | 10/2000 |

OTHER PUBLICATIONS

Bing search q=scaling+scrollbar&src=IE-SearchBox Nov. 29, 2015.*
International Search Report and Written Opinion received for PCT Patent Application No. PCT/US2007/077443, mailed on Feb. 21, 2008, 8 pages.
International Search Report and Written Opinion received for PCT Application No. PCT/US2008/050083, mailed on Jul. 4, 2008, 9 pages.
International Search Report and Written Opinion received for PCT Patent Application No. PCT/US2010/027088, mailed on Jun. 18, 2010, 8 pages.
International Preliminary Report on Patentability received for PCT Patent Application No. PCT/US2010/052313 mailed on Jul. 19, 2012, 10 pages.
International Search Report and Written Opinion received for PCT Patent Application No. PCT/US2010/062313, mailed on Apr. 15, 2011, 12 pages.
Office Action received for Chinese Patent Application No. 201080064146.2, mailed on Dec. 25, 2014, 3 pages (Official Copy only).(See Communication under 37 CFR § 1.98(a) (3)).
Office Action received for Chinese Patent Application No. 201080064146.2, mailed on Jun. 12, 2014, 22 pages. (11 Pages English Translation and 11 pages official copy).
Office Action received for European Patent Application No. 07814635.4 mailed on Feb. 24, 2010, 4 pages.
Office Action Received for German Patent Application No. 112007002000.3, mailed on Jun. 7, 2010, 8 pages.
Final Office Acion received for U.S. Appl. No. 11/968,064, mailed on Jan. 5, 2010, 20 pages.
Non-Final Office Action received for U.S. Appl. No. 11/968,064, mailed on May 15, 2009, 17 pages.
Non Final Office Action recieived for U.S. Appl. No. 12/789,433, mailed on Sep. 13, 2012, 11 pages.
Notice of Allowance received for U.S. Appl. No. 12/789,433, mailed on Apr. 4, 2013, 26 pages.
Office Action Received for Australian Patent Application No. 2007292473, mailed on Feb. 17, 2010, 1 page.
The Complete Idiot's Guide, Microsoft Outlook 2000, Temple, published, 1999, p. 186.
Arons, Barry Michael, "The Audio-Graphical Interface to a Personal Integrated Telecommunications System", Thesis Submitted to the Department of Architecture at the Massachusetts Institute of Technology, Jun. 1984, pp. 1-88.

(56) References Cited

OTHER PUBLICATIONS

Coleman, David W., "Meridian Mail Voice Mail System Integrates Voice Processing and Personal Computing", Speech Technology, vol. 4, No. 2, Mar./Apr. 1988, pp. 84-87.
Microsoft Corporation, "Microsoft Office Word 2003 (SP2)", SP3 as of 2005, pp. MSWord 2003 Figures 1-5, 1983-2003, 5 pages.
Microsoft Corporation, "Microsoft Word 2000 (9.0.2720)", MS Word Figures 1-5, 1999, 5 pages.
Myers, Brad A., "Shortcutter for Palm", available at >http://www.cs.cmu.edu/~pebbles/v5/shortcutter/palm/index.html>, retrieved on Jun. 18, 2014, 10 pages.
Schmandt et al, "A Conversational Telephone Messaging System", IEEE Transactions on Consumer Electronics, vol. CE-30, Aug. 1984, pp. xxi-xxiv.
Schmandt et al, "Phone Slave: A Graphical Telecommunications Interface", Proceedings of the SID, vol. 26, No. 1, 1985, pp. 79-82.
Schmandt et al, "Phone Slave: A Graphical Telecommunications Interface", Sociey for Information Display, International Symposium Digest of Technical Papers, Jun. 1984, 4 pages.
Decision to Grant received for Chinese Patent Application No. 201080064146.2, mailed on Apr. 2, 2015, 4 pages (Official Copy only),(See Communication under 37 CFR § 1.98(a) (3)).
Non-Final Office Action received for U.S. Appl. No. 13/963,455, mailed on Dec. 21, 2015, 17 pages.
Notice of Allowance received for U.S. Appl. No. 13/963,455, mailed on Jun. 24, 2016, 6 pages.

\* cited by examiner

800

```
┌─────────────────────────────────────────────────────────────────┐
│ Detect a second gesture, the second gesture including a contact moving in a │──836
│             second direction opposite the first direction                   │
└─────────────────────────────────────────────────────────────────┘
                                    ▼
┌─────────────────────────────────────────────────────────────────┐
│   In response to detecting the second gesture, cease to display the second  │──838
│          value selection bar and the second value selection object          │
└─────────────────────────────────────────────────────────────────┘

┌─────────────────────────────────────────────────────────────────┐
│ While displaying the second value in the numerical value field, detect a third │──840
│   gesture, the third gesture including a contact moving in the first direction │
│  ┌──────────────────────────────────────────────────────────┐                  │
│  │ The second user input, the first gesture, the third user input, and the third │──842
│  │   gesture are made in sequence by a single continuous contact with the        │
│  │                         touch-sensitive surface                               │
│  └──────────────────────────────────────────────────────────┘                  │
│                                    ▼                                           │
│ ┌──────────────────────────────────────────────────────────────┐               │
│ │  In response to detecting the third gesture, display a third value selection bar │──844
│ │  having a third primary axis and a third value selection object on the third value │
│ │  selection bar, wherein: the third value selection bar has a fifth end and a sixth │
│ │   end on the third primary axis, the fifth end associated with a third minimum     │
│ │     value, and the sixth end, opposite the fifth end, associated with a third      │
│ │       maximum value, the third minimum value and the third maximum value           │
│ │  defining a third range of values associated with the third value selection bar,   │
│ │ wherein the third range of values is within the second range of values; and the    │
│ │  third value selection object is movable on the third value selection bar along    │
│ │     the third primary axis within bounds of the fifth end and the sixth end        │
│ │  ┌──────────────────────────────────────────────────────┐                          │──846
│ │  │  In response to detecting the third gesture, maintain display of the indicia    │
│ │  │             of one or more additional value selection bars                      │
│ │  └──────────────────────────────────────────────────────┘                          │
│ │  ┌──────────────────────────────────────────────────────┐                          │──848
│ │  │    In response to detecting the third gesture, disable the second value         │
│ │  │                           selection bar                                         │
│ │  └──────────────────────────────────────────────────────┘                          │
│ │  ┌──────────────────────────────────────────────────────┐                          │──850
│ │  │      The second value is substantially centered within the third range of       │
│ │  │                                values                                           │
│ │  └──────────────────────────────────────────────────────┘                          │
└─────────────────────────────────────────────────────────────────┘
                                    ▼
┌─────────────────────────────────────────────────────────────────┐
│ Detect a fourth user input that moves the third value selection object within the │──852
│                          third value selection bar                                │
│  ┌──────────────────────────────────────────────────────────┐                     │──854
│  │     The second user input, the first gesture, the third user input, the third  │
│  │         gesture, and the fourth input are made in sequence by a single         │
│  │                 continuous contact with the touch-sensitive surface            │
│  └──────────────────────────────────────────────────────────┘                     │
└─────────────────────────────────────────────────────────────────┘
                                    ▼
┌─────────────────────────────────────────────────────────────────┐
│   In response to detecting the fourth user input, enter a third value within the  │──856
│   third range of values into the numerical value field based on a position of the │
│    third value selection object on the third values selection bar, the third value│
│                           replacing the second value                              │
└─────────────────────────────────────────────────────────────────┘
```

Figure 8C

DEVICE, METHOD, AND GRAPHICAL USER INTERFACE FOR DATA INPUT USING VIRTUAL SLIDERS

RELATED APPLICATION

This application claims priority on U.S. Provisional Application Ser. No. 61/547,642, filed Oct. 14, 2011, which is incorporated herein by reference in its entirety.

TECHNICAL FIELD

This relates generally to electronic devices with touch-sensitive surfaces, including but not limited to electronic devices with touch-sensitive surfaces that receive data input using virtual sliders.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include using virtual sliders and similar user interface objects to select or input data, such as numerical values. A user may need to perform such manipulations on slider user interface objects in, for example, a spreadsheet application (e.g., Numbers from Apple Inc. of Cupertino, Calif.).

But existing methods for inputting data using virtual sliders are cumbersome and inefficient. For example, it can be difficult to select values finely using a slider, especially when the range of values corresponding to the slider is large and/or the slider user interface object is small. As a result, fine value selection using sliders is tedious and creates a significant cognitive burden on a user. In addition, existing methods take longer than necessary, thereby wasting energy. This latter consideration is particularly important in battery-operated devices.

SUMMARY

Accordingly, there is a need for electronic devices with faster, more efficient methods and interfaces for inputting data using virtual sliders. Such methods and interfaces may complement or replace conventional methods for inputting data using virtual sliders. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device with a display and a touch-sensitive surface. The method includes: displaying a first numerical value field at a first magnification level; detecting a first user input that selects the first numerical value field; in response to detecting the first input, displaying a value selection bar at a first length along a primary axis, and displaying a value selection object on the value selection bar, wherein: the value selection bar has a first end and a second end on the primary axis, the first end associated with a minimum value, and the second end, opposite the first end, associated with a maximum value, the minimum value and the maximum value defining a range of values associated with the value selection bar; and the value selection object is movable on the value selection bar along the primary axis within bounds of the first end and the second end; while the value selection bar is displayed at the first length: detecting a second user input that moves the value selection object on the value selection bar; in response to detecting the second input, entering a first value within the range of values into the first numerical value field based on a position of the value selection object on the value selection bar; detecting a gesture on the value selection bar; and in response to detecting the gesture, displaying the value selection bar at a second length along the primary axis, the second length different from the first length, while maintaining display of the first numerical value field at the first magnification level; while the value selection bar is displayed at the second length: detecting a third user input that moves the value selection object within the value selection bar; and in response to detecting the third user input, entering a second value within the range of values into the first numerical value field based on a position of the value selection object on the value selection bar, the second value replacing the first value.

In accordance with some embodiments, a method is performed at an electronic device with a display and a touch-sensitive surface. The method includes: displaying a first numerical value field; detecting a first user input that selects the first numerical value field; in response to detecting the first input, displaying a value selection bar, the value selection bar having a length along a primary axis, and displaying a value selection object on the value selection bar, wherein: the value selection bar has a first end and a second end on the primary axis, the first end associated with a first minimum value, and the second end, opposite the first end, associated with a first maximum value, the first minimum value and the first maximum value defining a first range of values associated with the value selection bar; and the value selection object is movable on the value selection bar along the primary axis within bounds of the first end and the second end; detecting a second user input that moves the value selection object on the value selection bar; in response to detecting the second user input, entering a first value within the first range of values into the first numerical value field based on a position of the value selection object on the value selection bar; detecting a gesture on the value selection bar; in response to detecting the gesture: maintaining the length of the value selection bar along the primary axis; and associating the first end with a second minimum value and associating the second end with a second maximum value, the second minimum value and the second maximum value defining a second range of numerical values associated with the value selection bar, the second range of numerical values being distinct from the first range of numerical values; while the value selection bar corresponds to the second range of numerical values, detecting a third user input that moves the value selection object within the value selection bar; and in response to detecting the third user input, entering a second numerical value within the second range of numerical values into the first numerical value field based on a position of the value selection object on the value selection bar, the second numerical value replacing the first numerical value.

In accordance with some embodiments, a method is performed at an electronic device with a display and a touch-sensitive surface. The method includes: displaying a numerical value field; detecting a first user input selecting the numerical value field; in response to detecting the first input, displaying a first value selection bar having a first primary axis and a first value selection object on the first value selection bar, wherein: the first value selection bar has a first end and a second end on the first primary axis, the first end associated with a first minimum value, and the second end, opposite the first end, associated with a first maximum value, the first minimum value and the first maximum value defining a first range of values associated with the first value selection bar; and the first value selection object is movable on the first value selection bar along the first primary axis within bounds of the first end and the second end; detecting a second user input that moves the first value selection object on the first value selection bar; in response to detecting the second input, entering a first value within the first range of values into the numerical value field based on a position of the first value selection object on the first value selection bar; detecting a first gesture, the first gesture including a contact moving in a first direction; in response to detecting the first gesture, displaying a second value selection bar having a second primary axis and a second value selection object on the second value selection bar, wherein: the second value selection bar has a third end and a fourth end on the second primary axis, the third end associated with a second minimum value, and the fourth end, opposite the third end, associated with a second maximum value, the second minimum value and the second maximum value defining a second range of values associated with the second value selection bar, wherein the second range of values is within the first range of values; and the second value selection object is movable on the second value selection bar along the second primary axis within bounds of the third end and the fourth end; detecting a third user input that moves the second value selection object within the second value selection bar; and in response to detecting the third user input, entering a second value within the second range of values into the numerical value field based on a position of the second value selection object on the second values selection bar, the second value replacing the first value.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display, a touch-sensitive surface, cause the device to perform the operations of any of the methods described above. In accordance with some embodiments, an electronic device includes: a display, a touch-sensitive surface; and means for performing the operations of any of the methods described above. In accordance with some embodiments, an information processing apparatus, for use in an electronic device with a display and a touch-sensitive surface, includes means for performing the operations of any of the methods described above.

In accordance with some embodiments, an electronic device includes a display unit configured to display a first numerical value field at a first magnification level; a touch-sensitive surface unit configured to receive user inputs and gestures; and a processing unit coupled to the display unit and the touch-sensitive surface unit. The processing unit is configured to: detect a first user input that selects the first numerical value field; in response to detecting the first input, enable display of a value selection bar at a first length along a primary axis, and enable display of a value selection object on the value selection bar, wherein: the value selection bar has a first end and a second end on the primary axis, the first end associated with a minimum value, and the second end, opposite the first end, associated with a maximum value, the minimum value and the maximum value defining a range of values associated with the value selection bar; and the value selection object is movable on the value selection bar along the primary axis within bounds of the first end and the second end; while the value selection bar is displayed at the first length: detect a second user input that moves the value selection object on the value selection bar; in response to detecting the second input, enter a first value within the range of values into the first numerical value field based on a position of the value selection object on the value selection bar; detect a gesture on the value selection bar; and in response to detecting the gesture, enable display of the value selection bar at a second length along the primary axis, the second length different from the first length, while maintaining display of the first numerical value field at the first magnification level; while the value selection bar is displayed at the second length: detect a third user input that moves the value selection object within the value selection bar; and in response to detecting the third user input, enter a second value within the range of values into the first numerical value field based on a position of the value selection object on the value selection bar, the second value replacing the first value.

In accordance with some embodiments, an electronic device includes a display unit configured to display a first numerical value field; a touch-sensitive surface unit configured to receive user inputs and gestures; and a processing unit coupled to the display unit and the touch-sensitive surface unit. The processing unit is configured to: detect a first user input that selects the first numerical value field; in response to detecting the first input, enable display of a value selection bar, the value selection bar having a length along a primary axis, and enable display of a value selection object on the value selection bar, wherein: the value selection bar has a first end and a second end on the primary axis, the first end associated with a first minimum value, and the second end, opposite the first end, associated with a first maximum value, the first minimum value and the first maximum value defining a first range of values associated with the value selection bar; and the value selection object is movable on the value selection bar along the primary axis within bounds of the first end and the second end; detect a second user input that moves the value selection object on the value selection bar; in response to detecting the second user input, enter a first value within the first range of values into the first numerical value field based on a position of the value selection object on the value selection bar; detect a gesture on the value selection bar; in response to detecting the gesture: maintaining the length of the value selection bar along the primary axis; and associating the first end with a second minimum value and associating the second end with a second maximum value, the second minimum value and the second maximum value defining a second range of numerical values associated with the value selection bar, the second range of numerical values being distinct from the first range of numerical values; while the value selection bar corresponds to the second range of numerical values, detecting a third user input that moves the value selection object within the value selection bar; and in response to detecting the third user input, entering a second numerical value within the second range of numerical values into the first numerical value field based on a position of the value selection object on the value selection bar, the second numerical value replacing the first numerical value.

In accordance with some embodiments, an electronic device includes a display unit configured to display a numerical value field; a touch-sensitive surface unit configured to receive user inputs and gestures; and a processing unit coupled to the display unit and the touch-sensitive surface unit. The processing unit is configured to: detect a first user input selecting the numerical value field; in response to detecting the first input, enable display of a first value selection bar having a first primary axis and a first value selection object on the first value selection bar, wherein: the first value selection bar has a first end and a second end on the first primary axis, the first end associated with a first minimum value, and the second end, opposite the first end, associated with a first maximum value, the first minimum value and the first maximum value defining a first range of values associated with the first value selection bar; and the first value selection object is movable on the first value selection bar along the first primary axis within bounds of the first end and the second end; detect a second user input that moves the first value selection object on the first value selection bar; in response to detecting the second input, enter a first value within the first range of values into the numerical value field based on a position of the first value selection object on the first value selection bar; detect a first gesture, the first gesture including a contact moving in a first direction; in response to detecting the first gesture, enable display of a second value selection bar having a second primary axis and a second value selection object on the second value selection bar, wherein: the second value selection bar has a third end and a fourth end on the second primary axis, the third end associated with a second minimum value, and the fourth end, opposite the third end, associated with a second maximum value, the second minimum value and the second maximum value defining a second range of values associated with the second value selection bar, wherein the second range of values is within the first range of values; and the second value selection object is movable on the second value selection bar along the second primary axis within bounds of the third end and the fourth end; detect a third user input that moves the second value selection object within the second value selection bar; and in response to detecting the third user input, enter a second value within the second range of values into the numerical value field based on a position of the second value selection object on the second values selection bar, the second value replacing the first value.

Thus, electronic devices with displays and touch-sensitive surfaces are provided with faster, more efficient methods and interfaces for inputting data using virtual sliders, thereby increasing the effectiveness, efficiency, and user satisfaction with such devices. Such methods and interfaces may complement or replace conventional methods for inputting data using virtual sliders.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 8A-8C are flow diagrams illustrating a method of inputting data using virtual sliders in accordance with some embodiments.

DESCRIPTION OF EMBODIMENTS

Figure 1A:
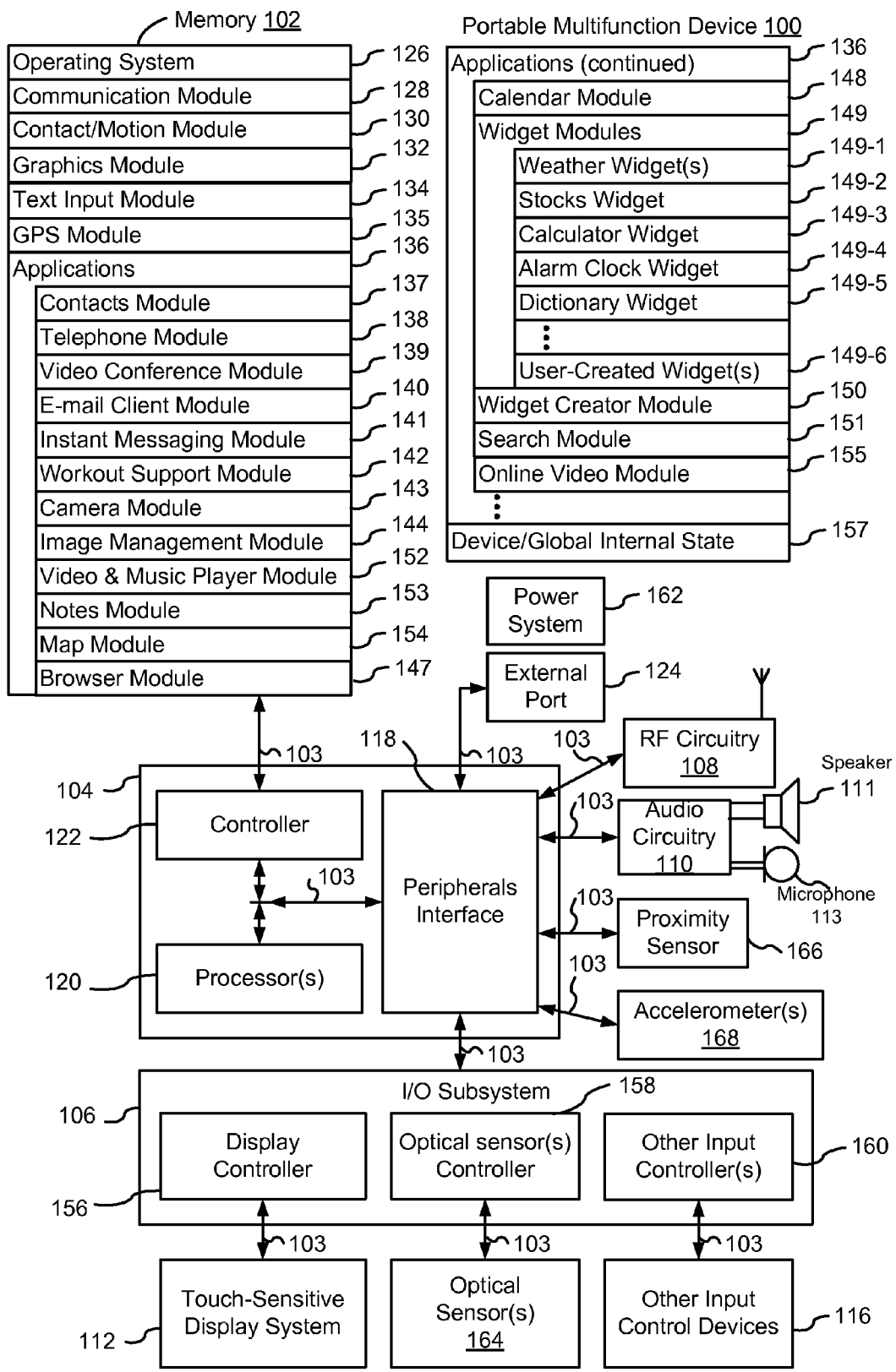
FIG. 1A is a block diagram illustrating a portable multifunction device with a touch-sensitive display in accordance with some embodiments.

In graphical user interfaces where a user may enter numerical values using virtual sliders, the control the slider provides to the user for selecting the numerical value may be too coarse, making it difficult for the user to enter the exact value sought by the user. The embodiments described below provide virtual slider interfaces that enable finer control over numerical value input. In one embodiment, the user may lengthen the virtual slider, while the range of values for the slider remains the same. In another embodiment, the user may reduce the range of values for the virtual slider, while the length of the slider remains the same. In another embodiment, the user may bring up, one at a time, virtual sliders with progressively smaller ranges of values. These embodiments reduce the amount of change in the numerical value to be entered per unit amount of movement of the virtual slider, thus giving the user relatively finer control over the input value.

Below, FIGS. 1A-1B, 2, 3, 9-11 provide a description of exemplary devices. FIGS. 4A-4B and 5A-5Q illustrate exemplary user interfaces for inputting values using virtual sliders. FIGS. 6A-6C, 7A-7D, and 8A-8C are flow diagrams illustrating methods of inputting values using virtual sliders. The user interfaces in FIGS. 5A-5Q are used to illustrate the processes in FIGS. 6A-6C, 7A-7D, and 8A-8C.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth.

In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
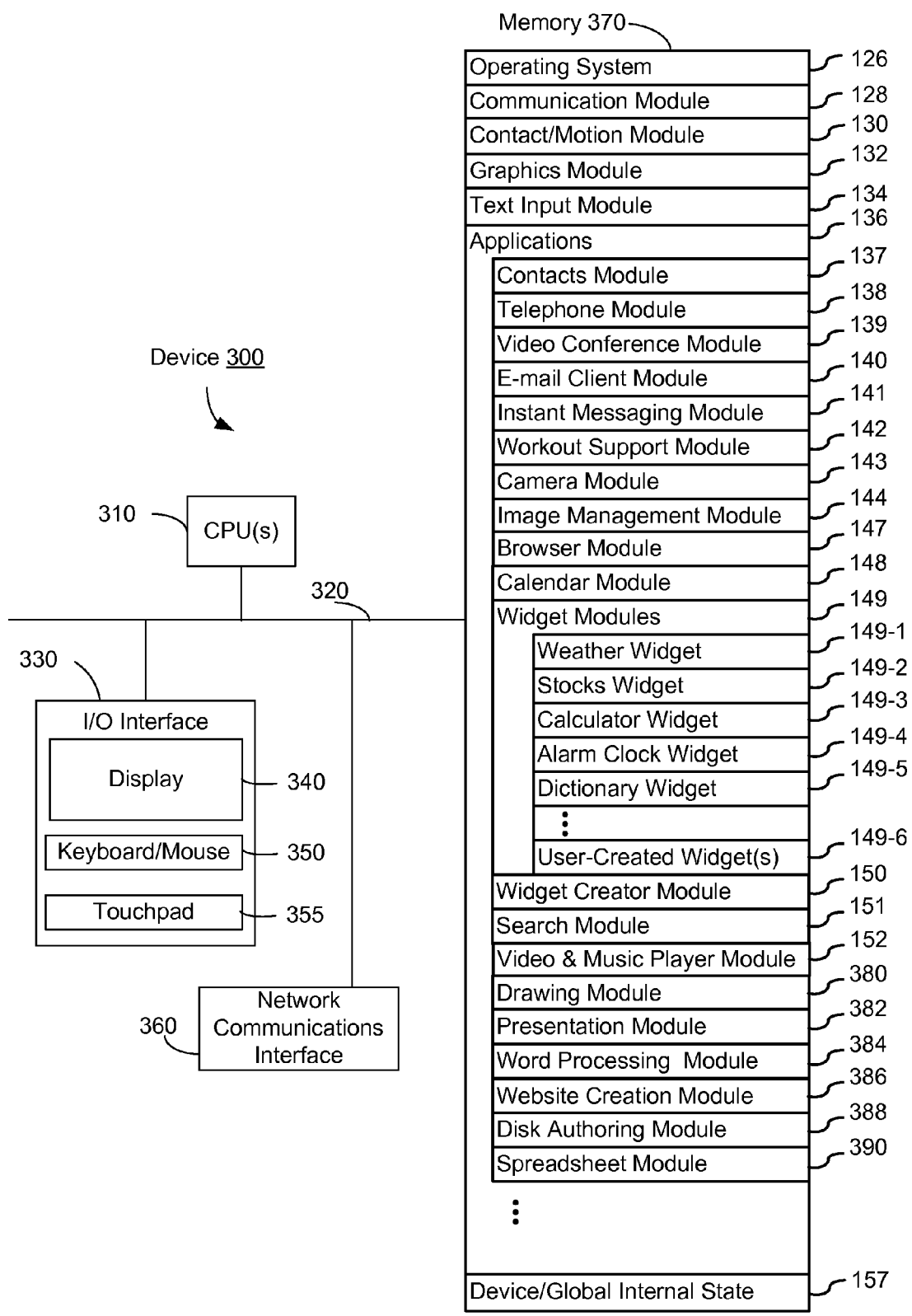
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
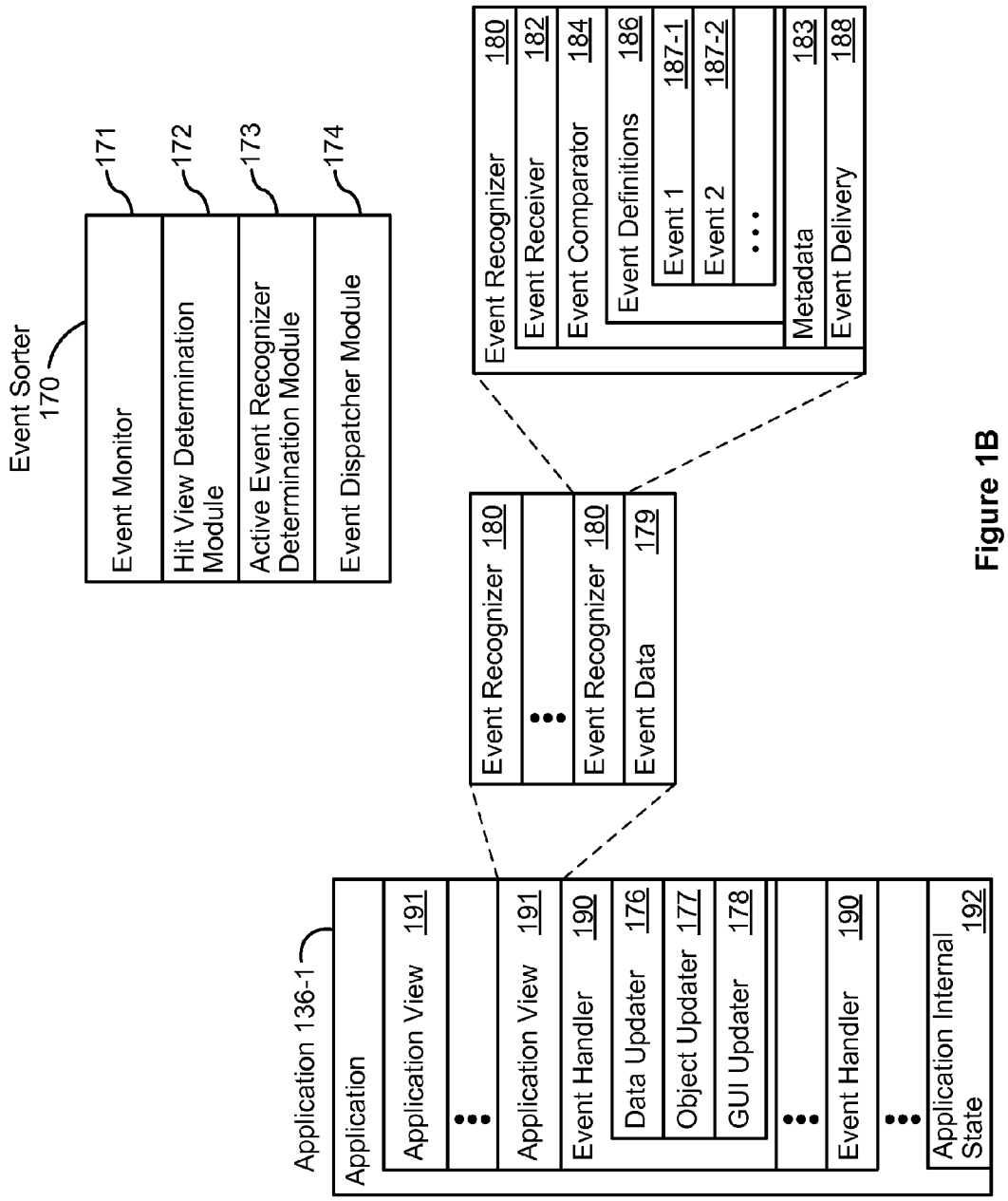
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIGS. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
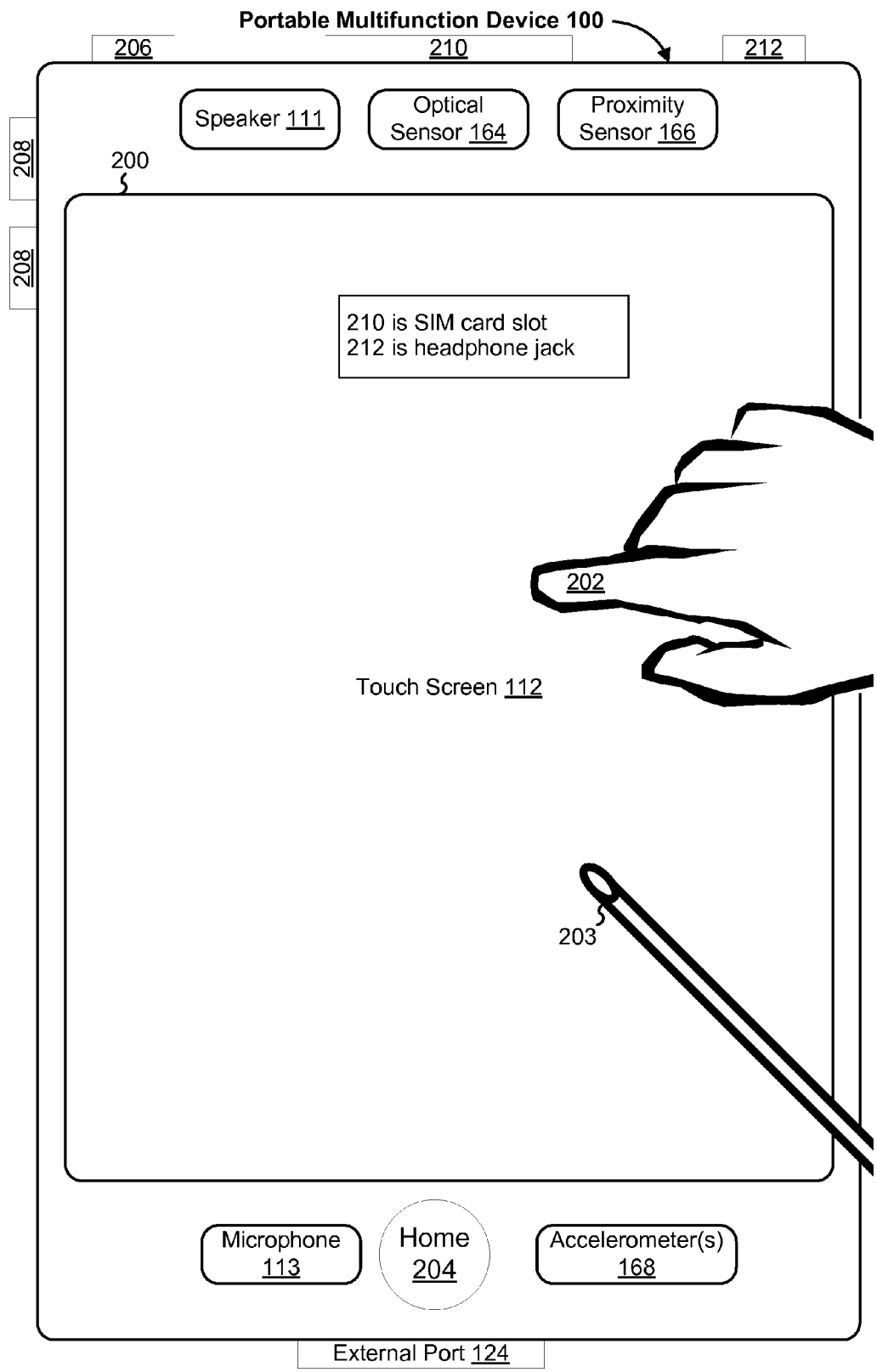
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
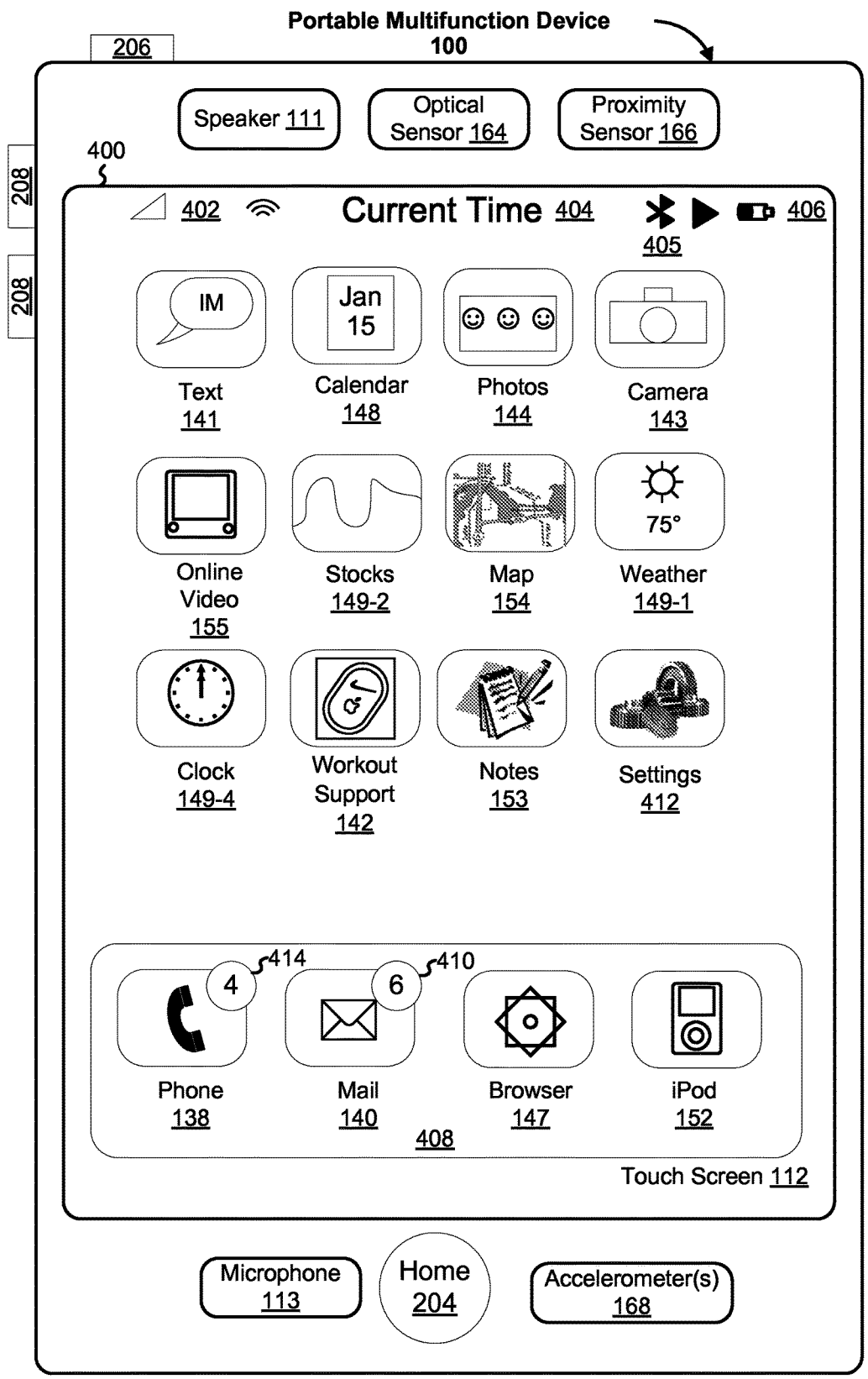
FIG. 4A illustrates an exemplary user interface for a menu of applications on a portable multifunction device in accordance with some embodiments.
Figure 5A:
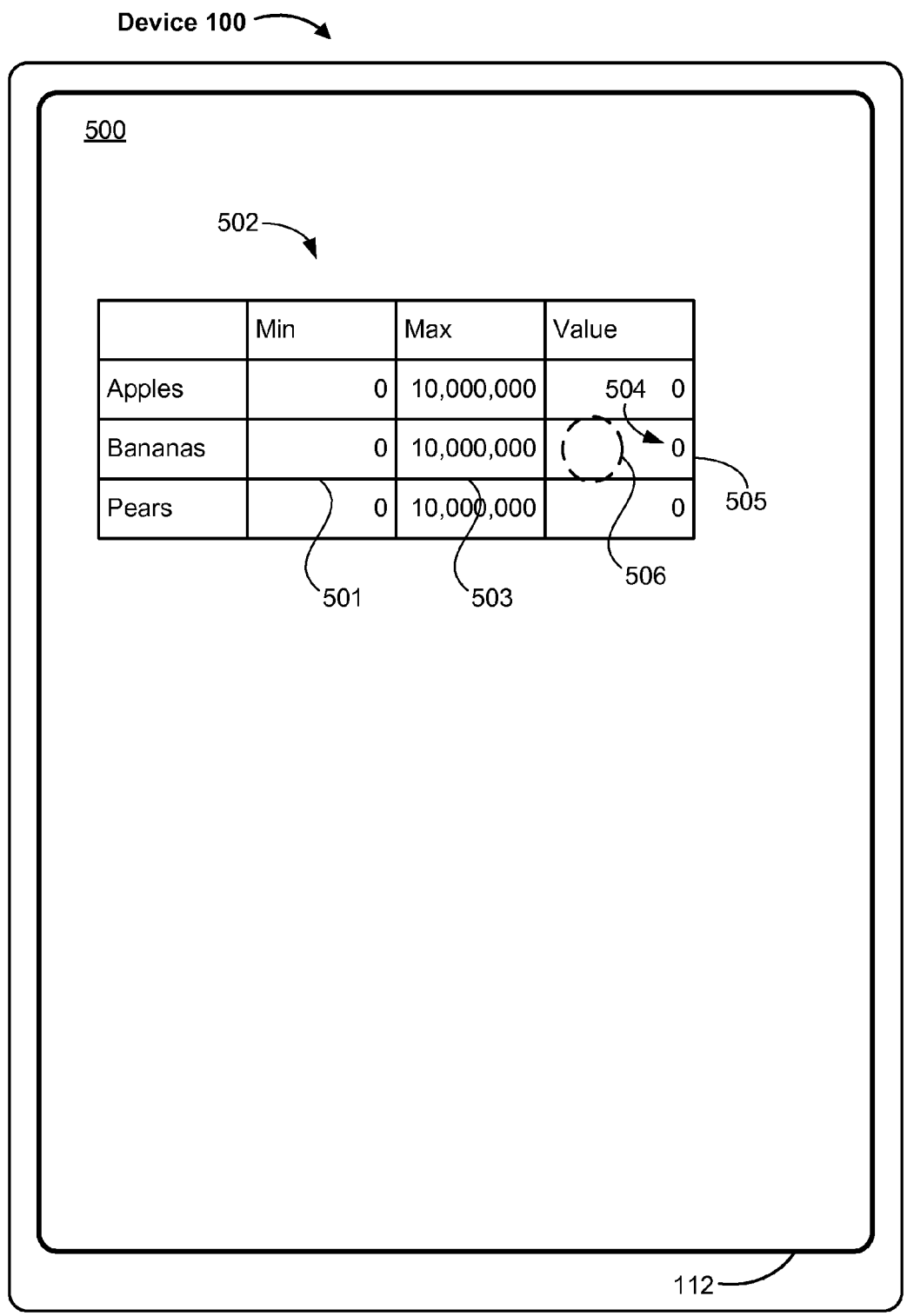
FIGS. 5A-5Q illustrate exemplary user interfaces for inputting data using virtual sliders in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Figure 4B:
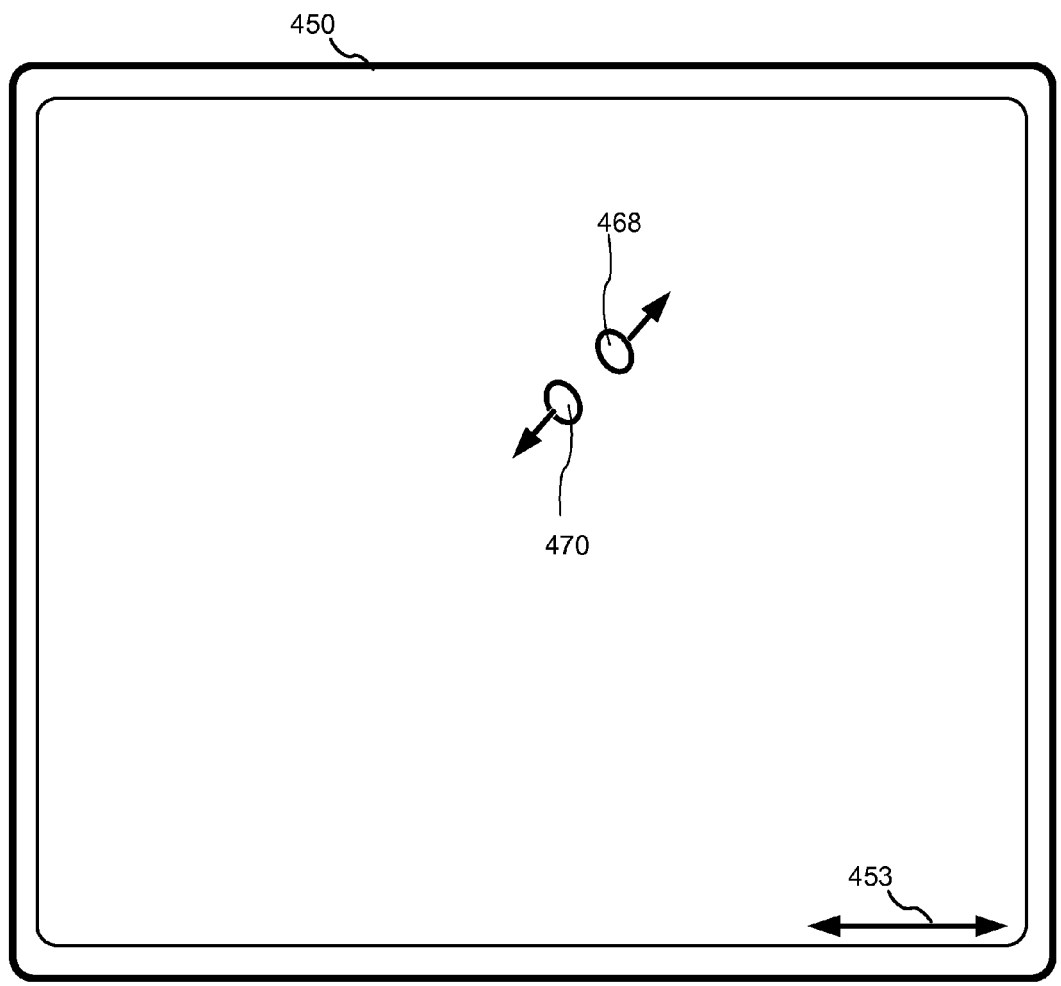
FIG. 4B illustrates an exemplary user interface for a multifunction device with a touch-sensitive surface that is separate from the display in accordance with some embodiments.
Figure 4B:
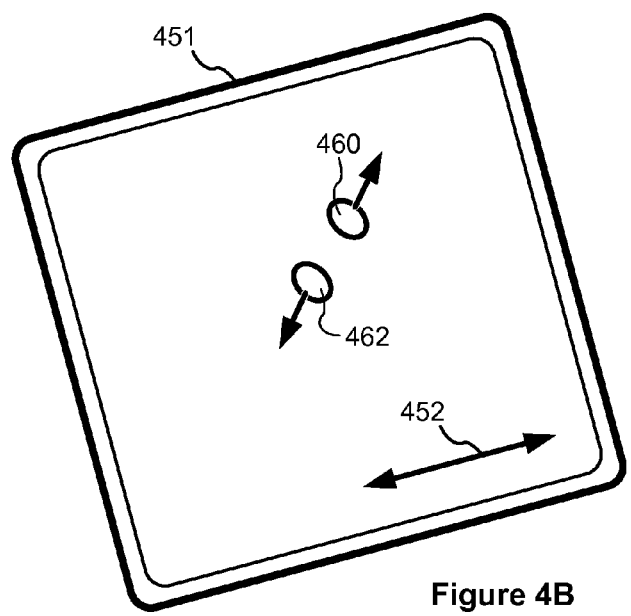

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5Q illustrate exemplary user interfaces for inputting values using sliders in accordance with some embodiments. The user interfaces in these figures are used to illustrate the processes described below, including the processes in FIGS. 6A-6C, 7A-7D, and 8A-8C.

FIG. 5A illustrates user interface 500 displayed on touch screen 112 of device 100. User interface 500 may be a user interface for an application on device 100. In some embodiments, the application is a spreadsheet application or other application that includes one or more numerical value fields.

Spreadsheet 502 is displayed in user interface 500. In some embodiments, user interface 500 in which spreadsheet 502 is displayed is a user interface for a spreadsheet application. Spreadsheet 502 includes one or more cells. The cells are examples of fields into which numerical values may be entered. More generally, one or more fields into which numerical values may be entered may be displayed in user interface 500 (e.g., the fields may be included in a document or page displayed in user interface 500).

The cells in spreadsheet 502 are arranged in a tabular format. For example, spreadsheet 502 includes three data rows, a header row, three data columns, and a header column. One of the data rows include cells 501, 503, and 505, with each of cells 501, 503, and 505 belonging to a respective column in spreadsheet 502. Cell 501 is in a column labeled "Min." Cell 503 is in a column labeled "Max." Cell 505 is in a column labeled "Value." Cells 501, 503, 505 accept numerical values as data. For example, cell 505 holds value 504. Initially, value 504 is zero, but may be modified in accordance with user input.

In some embodiments, numerical values in a cell have a specified format. For example, numerical values in a cell may be formatted as a specified numerical data type (e.g., integer, floating point number). As another example, numerical values in a cell may be formatted as currency values or with a specified number of decimal places. Formats may be predefined as defaults and/or set by a user.

In some embodiments, numerical values in a cell have a minimum and a maximum value; a value entered into the cell is restricted to be within the range defined by the minimum and maximum, inclusive, for the cell. In some embodiments, by default, the minimum and maximum for a cell is the smallest and largest, respectively, possible value for the device. For example, if numerical values in device 100 are stored as 64-bit words, the minimum and maximum values for a cell may be the smallest and largest, respectively, possible values that may be stored in a 64-bit word.

In some embodiments, the minimum and maximum values for values in a cell may be specified in other cells in spreadsheet 502. For example, value 504 in cell 505 may initially have as a minimum value the value in cell 501 and as a maximum value the value in cell 503.

Figure 5B:
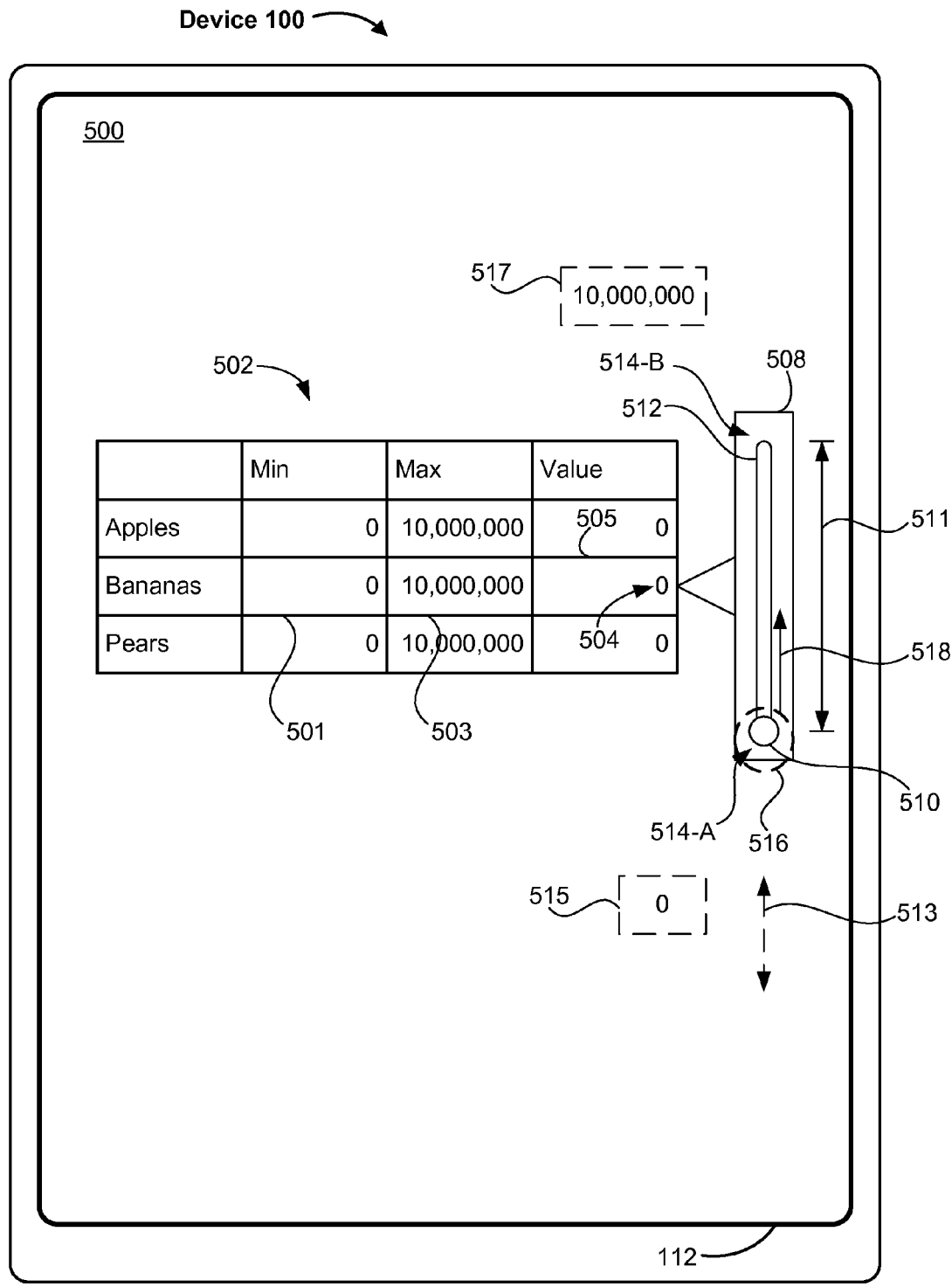

FIG. 5A shows gesture 506 detected on touch screen 112. Gesture 506 is detected at a location on touch screen 112 corresponding to cell 505. In response to the detection of gesture 506, cell 505 is selected for data entry and slider interface 508 is displayed for data entry, as shown in FIG. 5B. In some embodiments, when cell 505 is selected, cell 505 (and spreadsheet 502) is displayed at the same magnification level as just prior to the detection of gesture 506. In some embodiments, slider interface 508 is displayed adjacent to the selected cell (e.g., cell 505 in FIG. 5B) and/or includes some indicia of association with the selected cell (e.g., some graphical object connecting the selected cell to slider interface 508).

Slider interface 508 includes value selection bar 512, which has primary axis 513 and ends 514-A and 514-B. Value selection bar 512 has, measured from end 514-A to end 514-B, length 511. Slider interface 508 also has value selection object 510, which is displayed on value selection bar 512. Value selection object 510 is movable on value selection bar 512 parallel to primary axis 513 within the bounds of ends 514-A and 514-B (e.g., where the center of value selection object 510 can be moved up to, but not beyond, either end 514-A or 514-B).

Value selection bar 512 is associated with a range of values defined by minimum value 515 and maximum value 517, associated with ends 514-A and 514-B, respectively (values 515 and 517 may be not displayed on touch screen 112 to the user, but are shown in the figures for ease of understanding). In FIG. 5B, end 514-A is associated with minimum value 515 of the range, and end 514-B is associated with maximum value 517 of the range. Initially, minimum value 515 and maximum value 517 are set to predefined defaults (e.g., smallest/largest possible number that may be stored in device 100) or to specified values in other cells or fields. For example, in FIG. 5B minimum value 515 is initially set to the value (0) in cell 501 and maximum value 517 is initially set to the value (10,000,000) in cell 503.

In FIGS. 5B-5E, value 504 in cell 505 takes on a value that is based on the position of value selection object 510 on value selection bar 512 and within the range defined by minimum and maximum values 515 and 517. In some embodiments, value 504 varies linearly with the position of value selection object 510 on value selection bar 512.

Figure 5C:
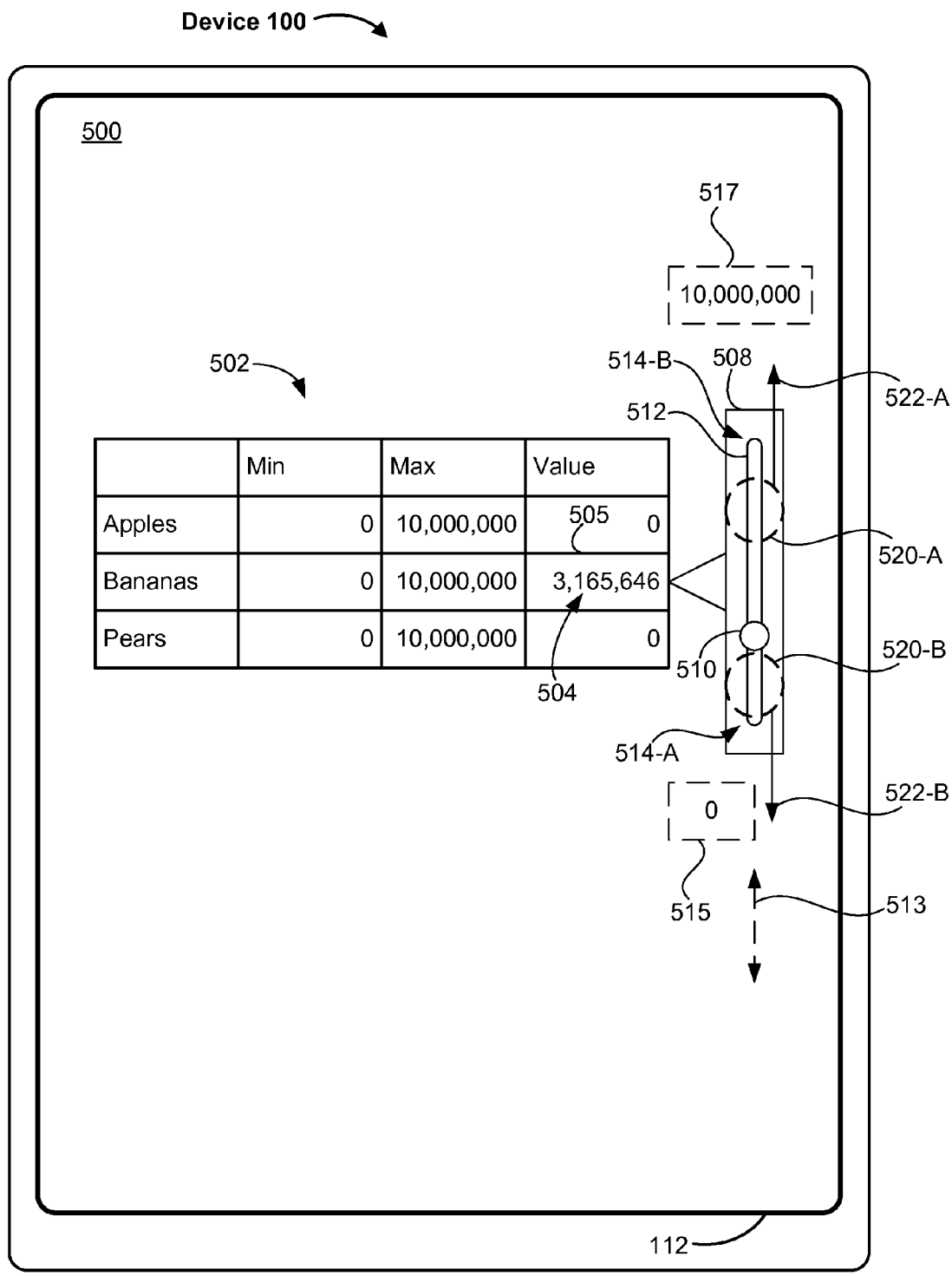

Returning to FIG. 5B, gesture 516 is detected on value selection object 510. Gesture 516 includes a finger contact on value selection object 510 and movement of the finger contact in direction 518 parallel to axis 513. In response to the detection of gesture 516, value selection object 510 is moved to a different position on value selection bar 512, as shown in FIG. 5C; value selection object 510 slides along value selection bar 512 in accordance with the movement in gesture 516. In response to the movement of value selection object 510 to the different position, value 504 changes to a different value; value 504 in FIG. 5C is "3,165,646," where value 504 was "0" in FIG. 5B.

Figure 5D:
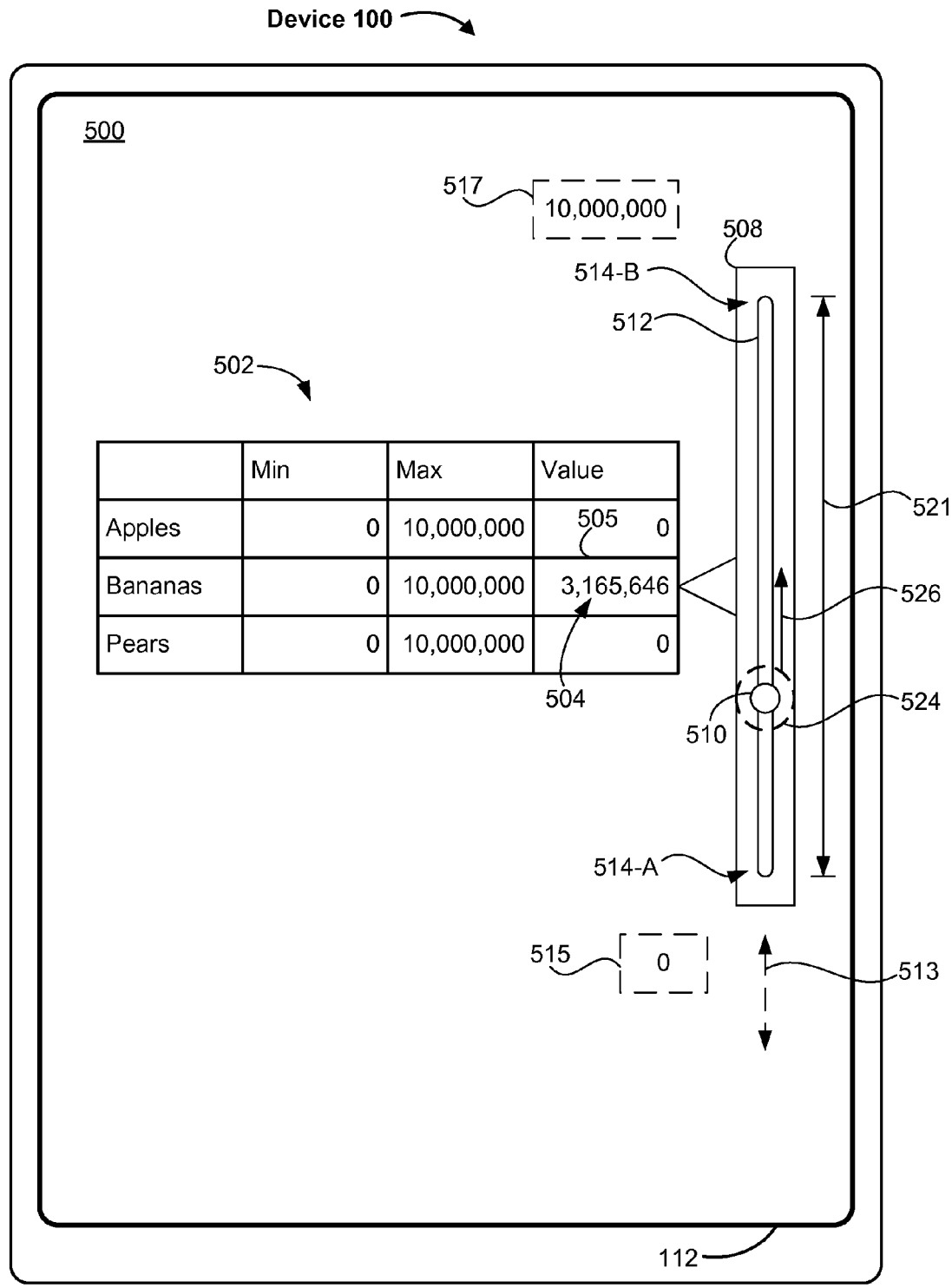

In FIG. 5C, gesture 520 is detected on slider interface 508. Gesture 520 includes finger contacts 520-A and 520-B moving apart in directions 522-A and 522-B, respectively; gesture 520 is a depinch gesture. In some embodiments, at least one of contacts 520-A and 520-B started on slider interface 508. In response to the detection of gesture 520, slider interface 508, including value selection bar 512, increases in length, as shown in FIG. 5D. The length of value selection bar 512, measured from end 514-A to end 514-B, increases from length 511 to length 521. Minimum value 515 and maximum value 517, associated with ends 514-A and 514-B, respectively, of the lengthened value selection bar 512 are unchanged. In FIG. 5D, minimum value 515 is still 0 and maximum value 517 is still 10,000,000. In some embodiments, when value selection bar 512 is lengthened, the position of value selection object 510 on value selection bar 512 may be changed so as to substantially maintain value 504; the new position of value selection object 510 on the lengthened value selection bar 512 yields the same value or a value within a threshold range of the value prior to the lengthening of value selection bar 512 as the position of value selection bar 510 on value selection bar 512 prior to the lengthening.

Figure 5E:
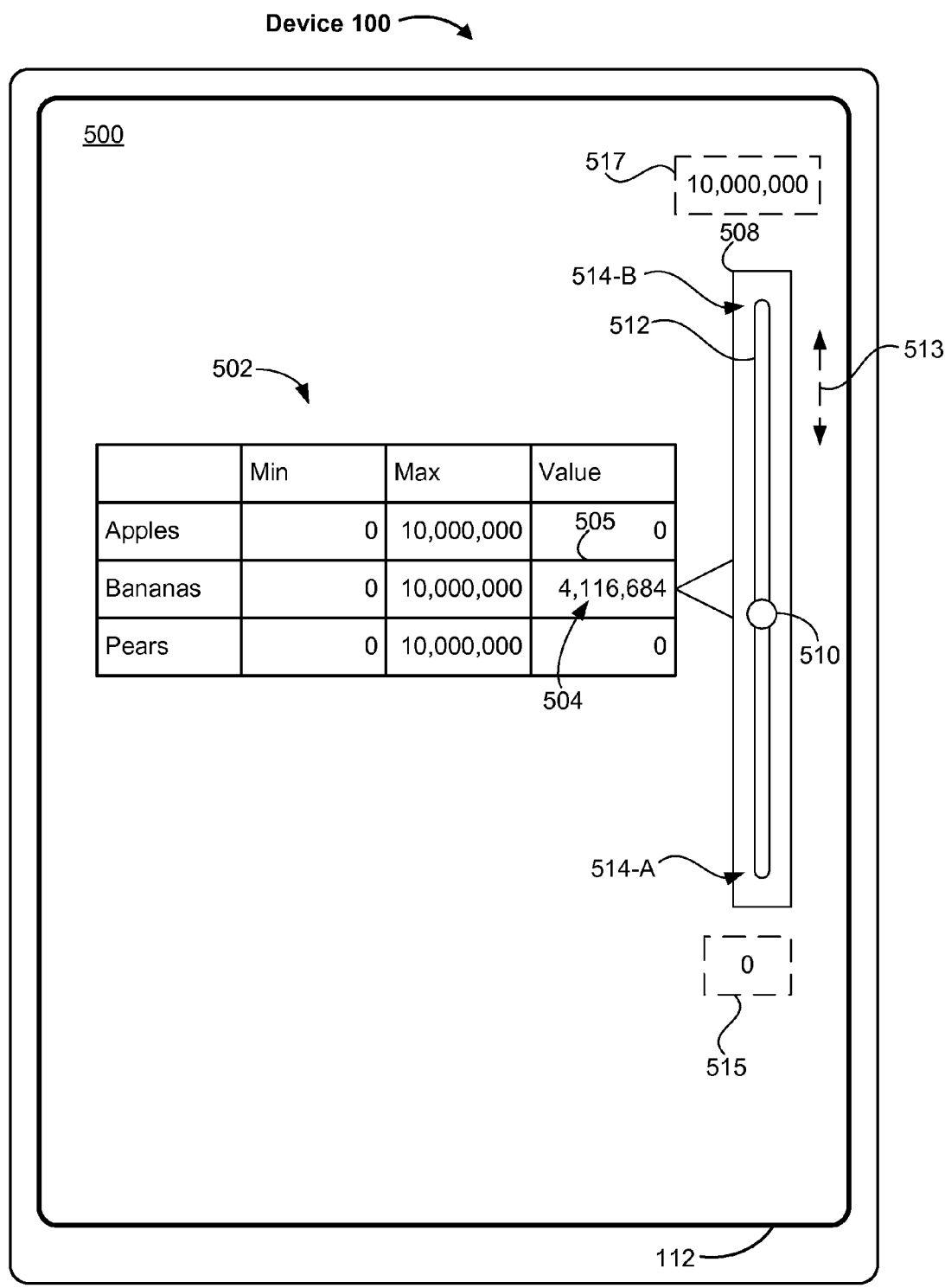

In FIG. 5D, gesture 524 is detected on value selection object 510. Gesture 524 includes a finger contact on value selection object 510 and movement of the finger contact in direction 526 parallel to axis 513. In response to the detection of gesture 524, value selection object 510 is moved to a different position on the lengthened value selection bar 512, as shown in FIG. 5E; value selection object 510 slides along value selection bar 512 in accordance with the movement in gesture 524. In response to the movement of value selection object 510 to the different position, value 504 changes to a different value; value 504 in FIG. 5E is "4,116,684," whereas value 504 was "3,165,646" in FIG. 5D.

It should be appreciated that, with the lengthened value selection bar 512, the user has relatively finer control over value 504 than prior to the lengthening of value selection bar 512. With value 504 being based on the position of value selection object 510 on value selection bar 512, a longer value selection bar 512 (e.g., as in FIG. 5D, compared to FIG. 5B) for the same range of values leads to a smaller change in value 504 for the same amount of (pixel) movement by value selection object 510 along value selection bar 512 (i.e., relatively finer control over value 504).

Figure 5F:
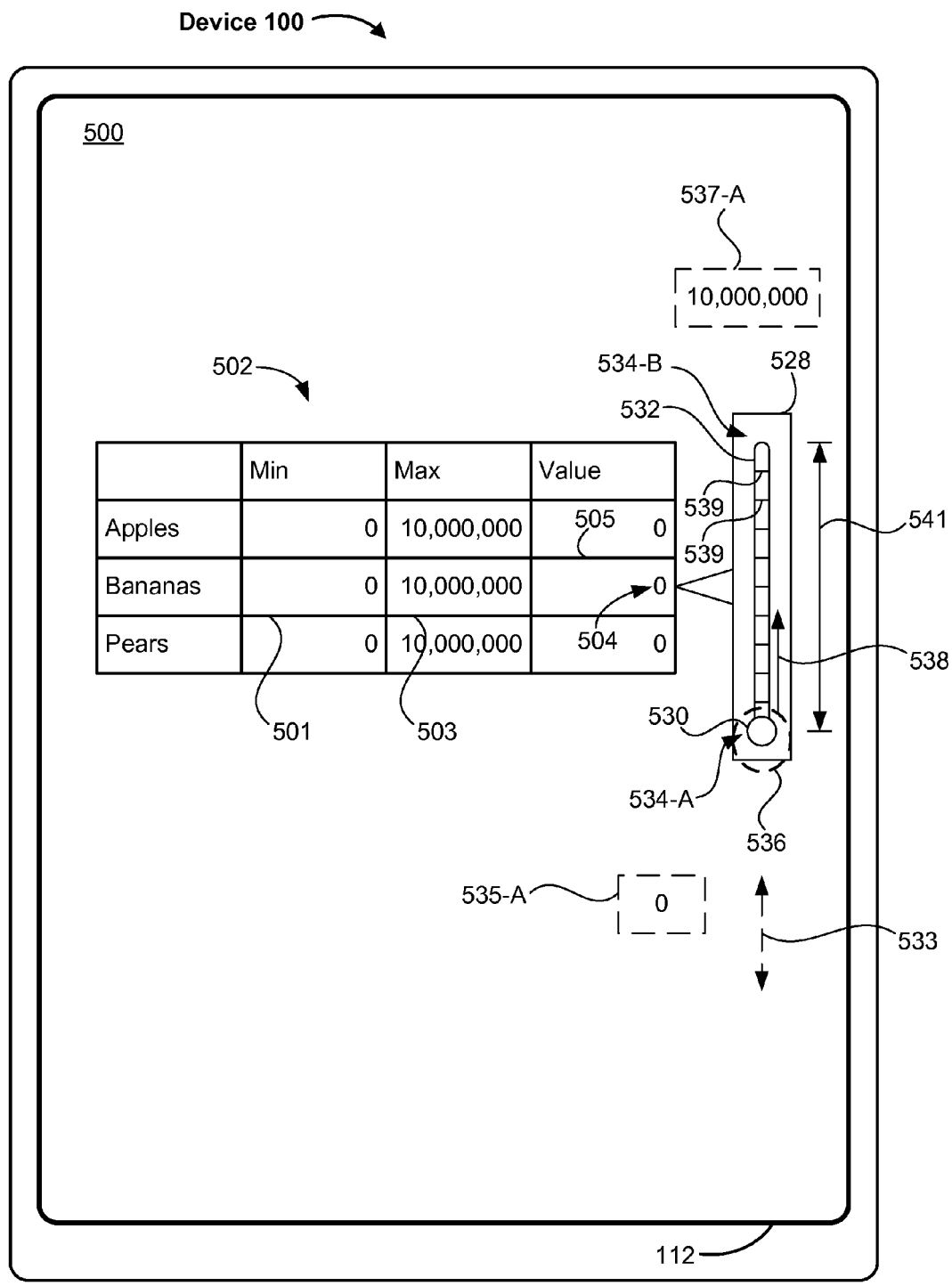

FIG. 5F illustrates an alternative response to the detection of gesture 506 (FIG. 5A). FIG. 5F shows cell 505 being selected for data entry and slider interface 528 being displayed for data entry in response to the detection of gesture 506. In some embodiments, when cell 505 is selected, cell 505 (and spreadsheet 502) is displayed at the same magnification level as just prior to the detection of gesture 506. In some embodiments, slider interface 528 is displayed adjacent to the selected cell (e.g., cell 505 in FIG. 5F) and/or includes some indicia of association with the selected cell (e.g., some graphical object connecting the selected cell to slider interface 528).

Slider interface 528 includes value selection bar 532, which has primary axis 533 and ends 534-A and 534-B. Value selection bar 532 is displayed at length 541. Slider interface 528 also has value selection object 530, which is displayed on value selection bar 532. Value selection object 530 is movable on value selection bar 532 parallel to primary axis 533 within the bounds of ends 534-A and 534-B (e.g., where the center of value selection object 530 can be moved up to, but not beyond, either end 534-A or 534-B).

Value selection bar 532 is associated with a range of values defined by minimum value 535 and maximum value 537, associated with ends 534-A and 534-B, respectively (minimum value 535 and maximum value 537 are not displayed on touch screen 112 to the user, but is shown in the figures for ease of understanding). In FIG. 5F, end 534-A is associated with minimum value 535 of the range, and end 534-B is associated with maximum value 537 of the range. Minimum value 535 has the value 0 (referenced in FIG. 5F as 535-A), and maximum value 537 has the value 10,000,000 (referenced in FIG. 5F as 537-A). Initially, minimum value 535 and maximum value 537 are set to predefined defaults (e.g., smallest/largest possible number that may be stored in device 100) or to specified values in other cells or fields. For example, in FIG. 5F minimum value 535 is initially set to the value (0) in cell 501 and maximum value 537 is initially set to the value (10,000,000) in cell 503.

In FIGS. 5F-5I, value 504 in cell 505 takes on a value that is based on the position of value selection object 530 on value selection bar 532 and within the range defined by minimum and maximum values 535 and 537. In some embodiments, value 504 varies linearly with the position of value selection object 530 on value selection bar 532.

In some embodiments, value selection bar 532 includes markings 539 at positions corresponding to predefined value intervals within the range of values defined by minimum value 535 and maximum value 537. For example, if minimum value 535 is 0 and maximum value 537 is 10,000,000, there may be markings 539 at every 1,000,000 on value selection bar 532 starting at 1,000,000 (i.e., markings 539 are positioned at 1,000,000, 2,000,000, 3,000,000, and so on).

Figure 5G:
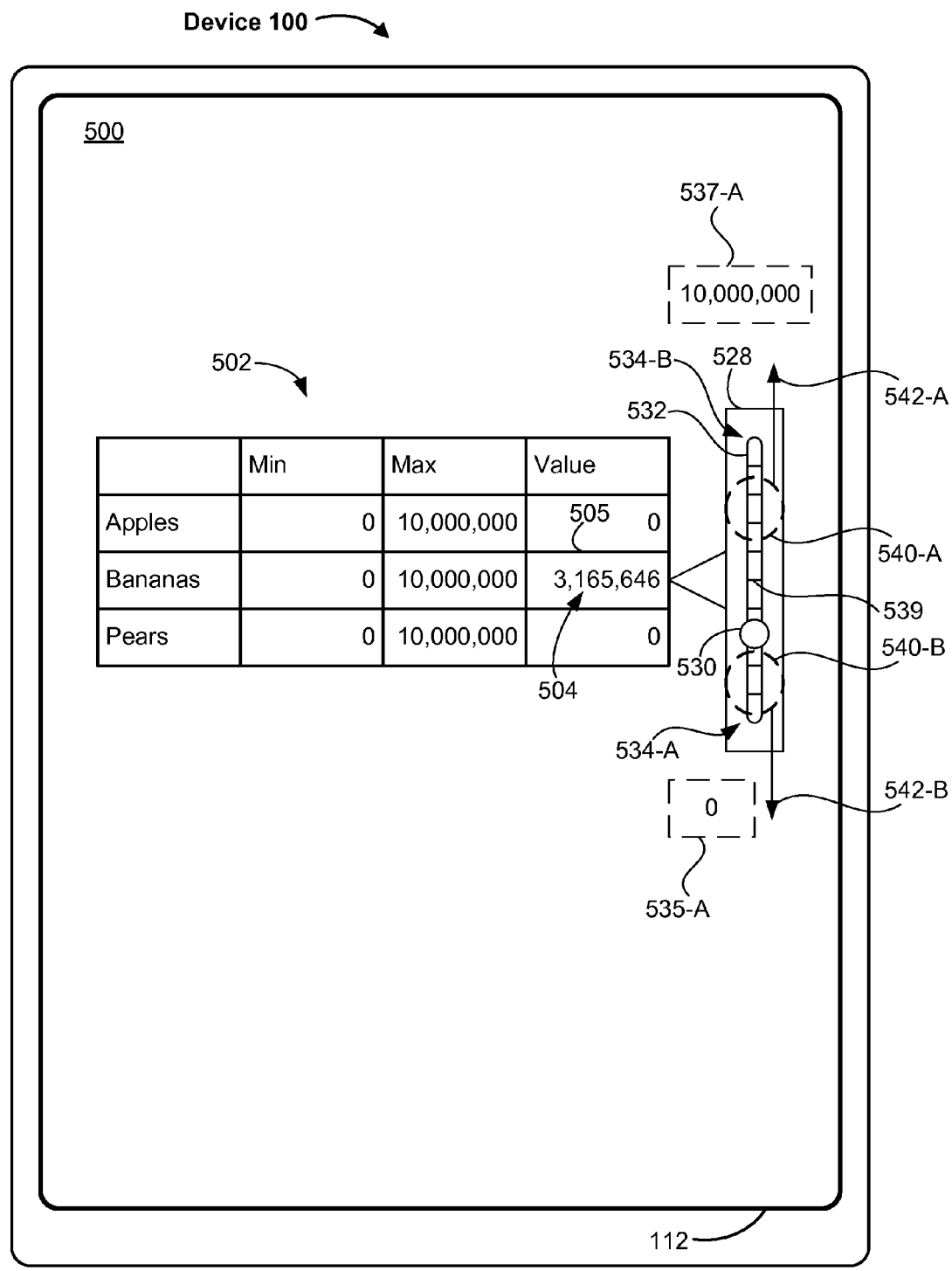

Returning to FIG. 5F, gesture 536 is detected on value selection object 530. Gesture 536 includes a finger contact on value selection object 530 and movement of the finger contact in direction 538 parallel to axis 533. In response to the detection of gesture 536, value selection object 530 is moved to a different position on value selection bar 532, as shown in FIG. 5G; value selection object 530 slides along value selection bar 532 in accordance with the movement in gesture 536. In response to the movement of value selection object 530 to the different position, value 504 changes to a different value; value 504 in FIG. 5G is "3,165,646," whereas value 504 was "0" in FIG. 5F.

Figure 5H:
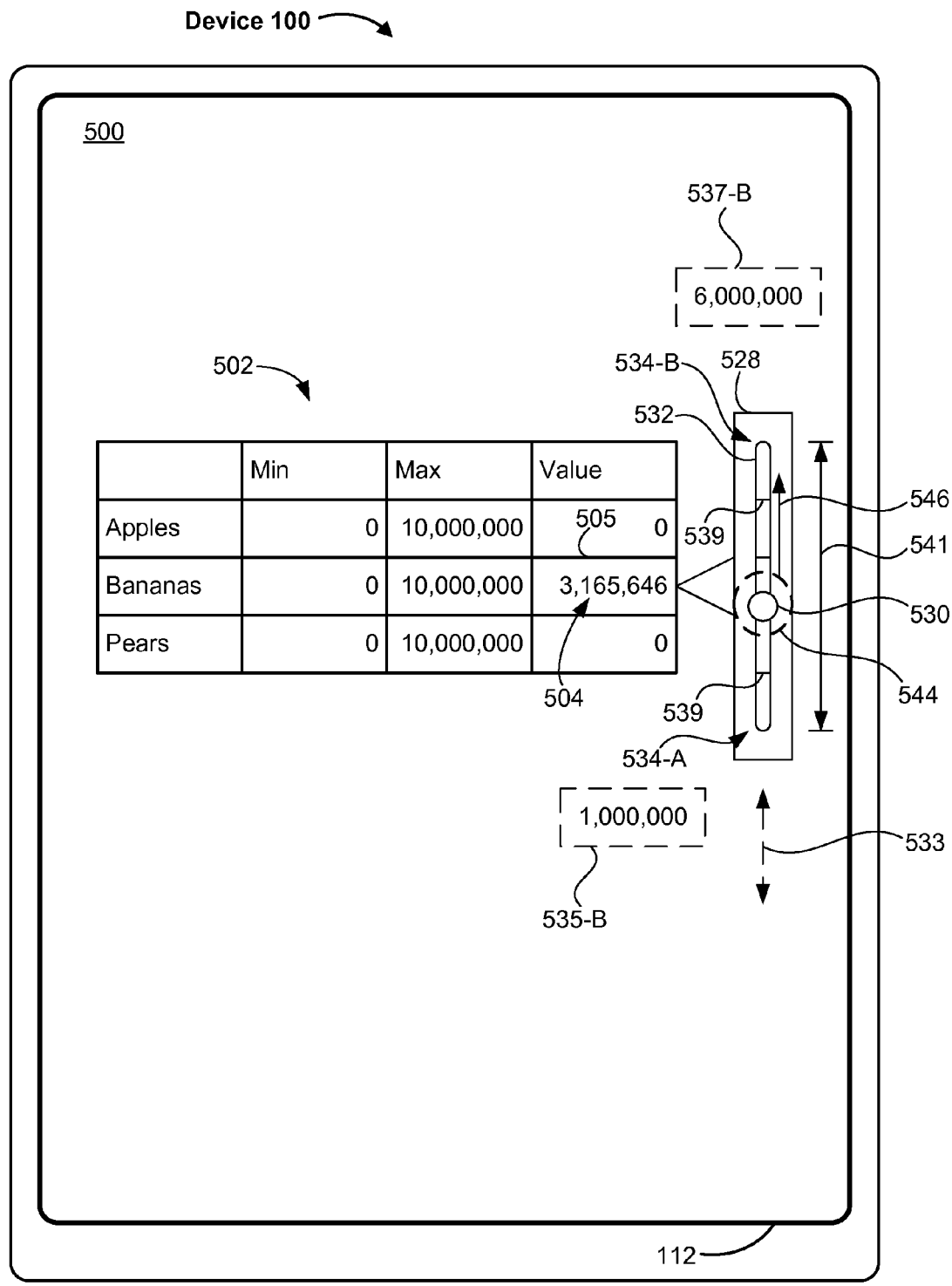

In FIG. 5G, gesture 540 is detected on slider interface 528. Gesture 540 includes finger contacts 540-A and 540-B moving apart in directions 542-A and 542-B, respectively; gesture 540 is a depinch gesture. In some embodiments, at least one of contacts 540-A and 540-B started on slider interface 528. As shown in FIG. 5H, in response to the detection of gesture 540, minimum value 535, associated with end 534-A, changes to 1,000,000 (referenced in FIG. 5H as 535-B); and maximum value 537, associated with end 534-B, changes to 6,000,000 (referenced in FIG. 5H as 537-B); the range of values defined by minimum value 535 and maximum value 537 changed. Value selection bar 532 maintains length 541. Markings 539 move further apart in response to the detection of gesture 540; with the change in the range of values, the value to which a position on value selection bar 532 corresponds may have changed, and the markings 539 move apart in accordance with these changes.

In some embodiments, when minimum value 535 and maximum value 537 changes, the position of value selection object 530 on value selection bar 532 may be changed so as to substantially maintain value 504; the new position of value selection object 530 on value selection bar 532 with the new range of values yields the same value or a value within a threshold range of the value prior to the change as the position of value selection bar 530 on value selection bar 532 prior to the change.

In some embodiments, new values for minimum value 535 and maximum value 537 are selected, in response to gesture 540, so as to maintain value 504 as it was just prior to gesture 540 in substantially the middle of the range defined by the new values for minimum value 535 and maximum value 537. In other words, value 504 may be substantially centered in the range defined by minimum value 535-B and maximum value 537-B. For example, in FIG. 5H, the range defined by minimum value 535-B (1,000,000) and maximum value 537-B (6,000,000) is substantially centered about value 504 (3,165,645).

Figure 5I:
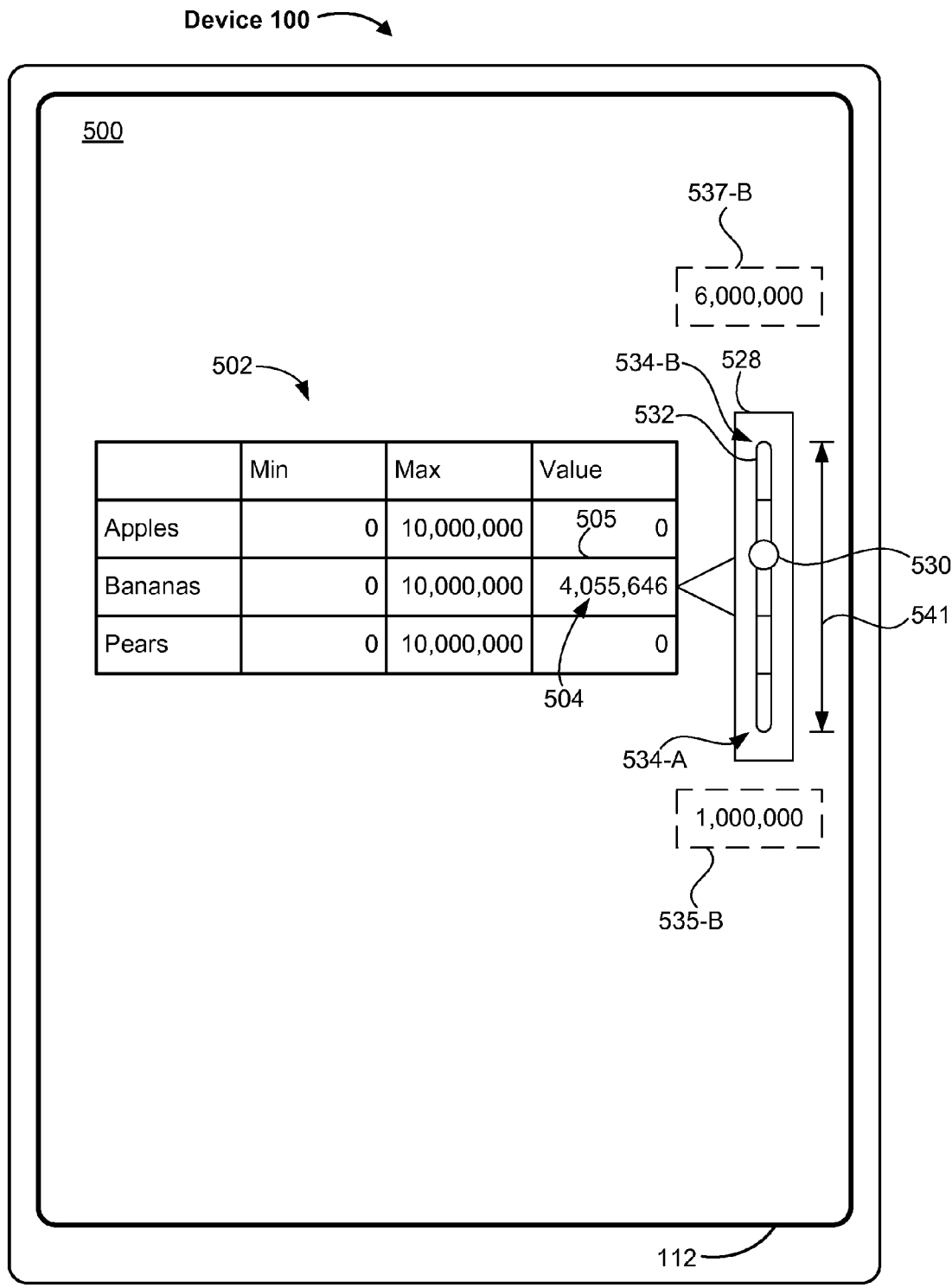

Returning to FIG. 5H, gesture 544 is detected on value selection object 530. Gesture 544 includes a finger contact on value selection object 530 and movement of the finger contact in direction 546 parallel to axis 533. In response to the detection of gesture 544, value selection object 530 is moved to a different position on value selection bar 532 with the changed range of values, as shown in FIG. 5I; value selection object 530 slides along value selection bar 532 in accordance with the movement in gesture 544. In response to the movement of value selection object 540 to the different position, value 504 changes to a different value; value 504 in FIG. 5I is "4,055,646," whereas value 504 was "3,165,646" in FIG. 5H.

It should be appreciated that, with the changed range of values for value selection bar 532 of the same length, the user has relatively finer control over value 504 than with the range of values prior to the change. With value 504 being based on the position of value selection object 530 on value selection bar 532, value selection bar 532 whose length is unchanged but with a smaller range of values (e.g., as in FIG. 5H, compared to FIG. 5F) leads to a smaller change in value 504 for the same amount of (pixel) movement by value selection object 530 along value selection bar 532 (i.e., relatively finer control over value 504).

Figure 5J:
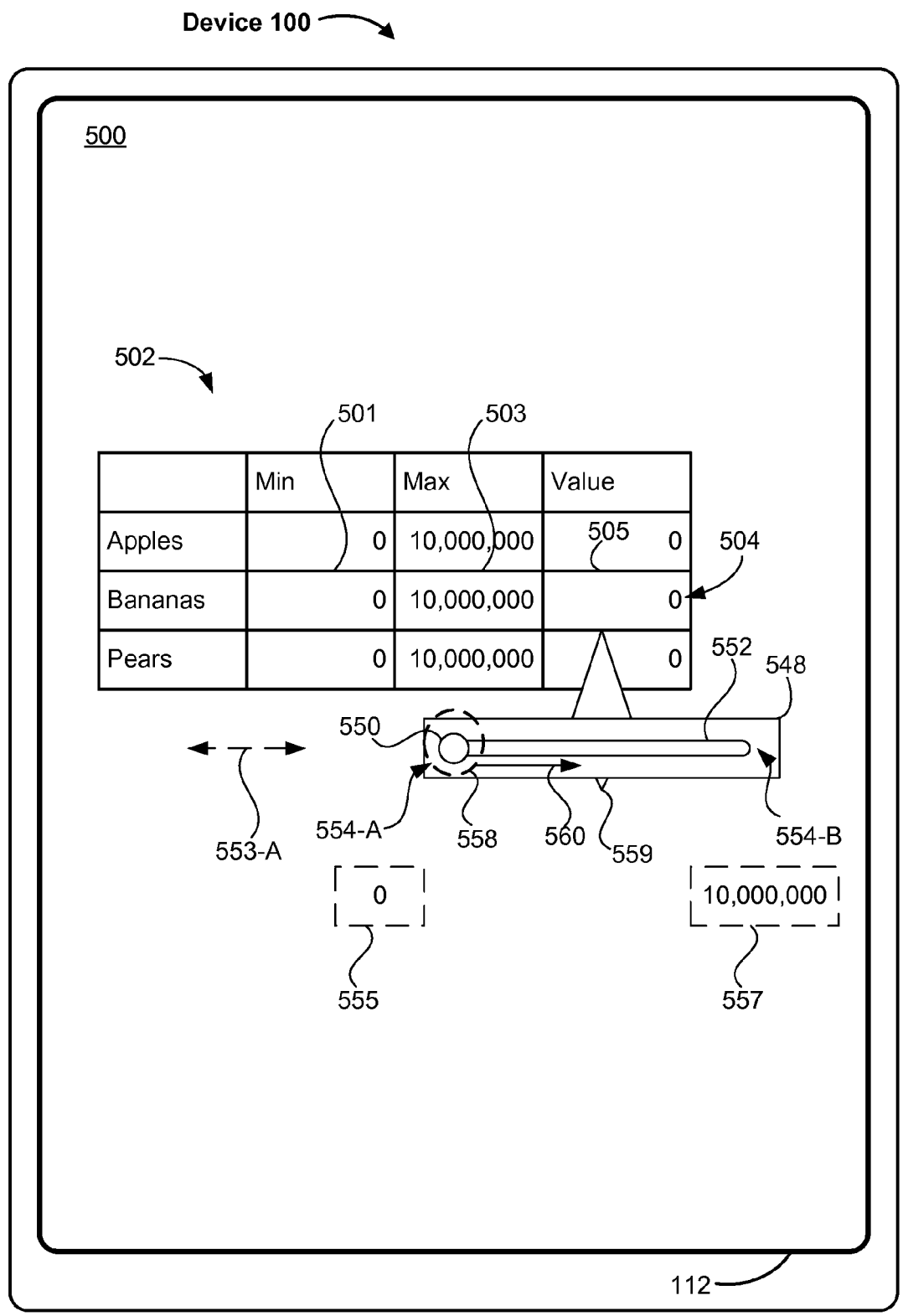

FIG. 5J illustrates another alternative response to the detection of gesture 506 (FIG. 5A). FIG. 5J shows cell 505 being selected for data entry and slider interface 548 being displayed for data entry in response to the detection of gesture 506. In some embodiments, when cell 505 is selected, cell 505 (and spreadsheet 502) is displayed at the same magnification level as just prior to the detection of gesture 506. In some embodiments, slider interface 548 is displayed adjacent to the selected cell (e.g., cell 505 in FIG. 5J) and/or includes some indicia of association with the selected cell (e.g., some graphical object connecting the selected cell to slider interface 548).

Slider interface 548 includes value selection bar 552, which has primary axis 553-A and ends 554-A and 554-B. Slider interface 548 also has value selection object 550, which is displayed on value selection bar 552. Value selection object 550 is movable on value selection bar 552 parallel to primary axis 553-A within the bounds of ends 554-A and 554-B (e.g., where the center of value selection object 550 can be moved up to, but not beyond, either end 554-A or 554-B).

Value selection bar 552 is associated with a range of values defined by minimum value 555 and maximum value 557, associated with ends 554-A and 554-B, respectively (values 555 and 557 may not be displayed on touch screen 112 to the user, but are shown in the figures for ease of understanding). In FIG. 5J, end 554-A is associated with minimum value 555 of the range, and end 554-B is associated with maximum value 557 of the range. Initially, minimum value 555 and maximum value 557 are set to predefined defaults or to specified values in other cells or fields. For example, in FIG. 5J minimum value 555 is initially set to the value (0) in cell 501 and maximum value 557 is initially set to the value (10,000,000) in cell 503.

Figure 5K:
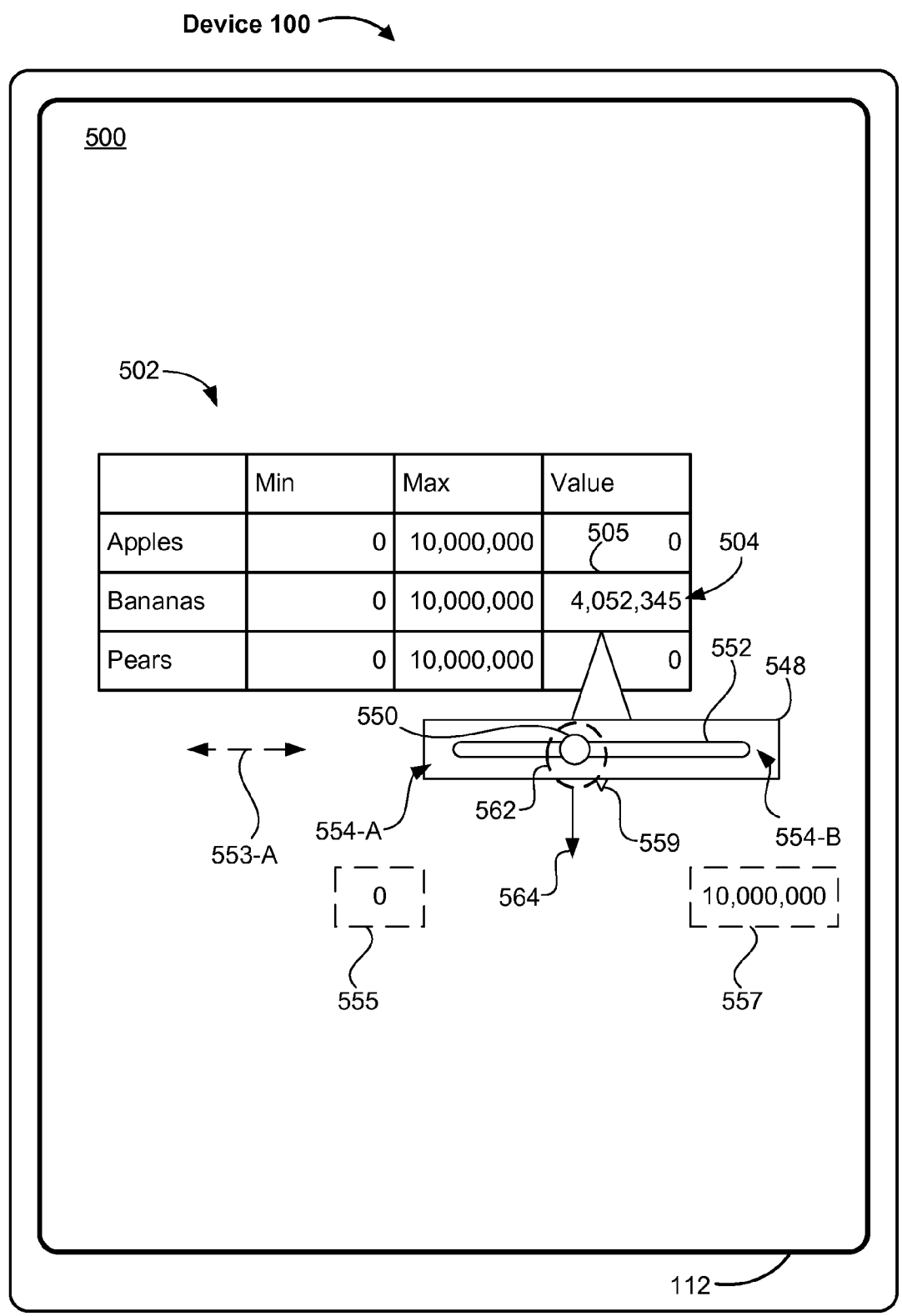

In FIGS. 5J-5K, value 504 in cell 505 takes on a value that is based on the position of value selection object 550 on value selection bar 552 and within the range defined by minimum and maximum values 555 and 557. In some embodiments, value 504 varies linearly with the position of value selection object 550 on value selection bar 552.

Returning to FIG. 5J, gesture 558 is detected on value selection object 550. Gesture 558 includes a finger contact on value selection object 550 and movement of the finger contact in direction 560 parallel to axis 553-A. In response to the detection of gesture 558, value selection object 550 is moved to a different position on value selection bar 552, as shown in FIG. 5K; value selection object 550 slides along value selection bar 552 in accordance with the movement in gesture 558. In response to the movement of value selection object 550 to the different position, value 504 changes to a different value; value 504 in FIG. 5K is "4,052,345," whereas value 504 was "0" in FIG. 5J.

In FIG. 5K, gesture 562 is detected on slider interface 548. Gesture 562 includes a finger contact moving in direction 564 perpendicular to axis 553-A. In some embodiments, the finger contact in gesture 562 starts on value selection object 550, as shown in FIG. 5K. In some other embodiments, the finger contact in gesture 562 starts anywhere on value selection bar 552.

Figure 5L:
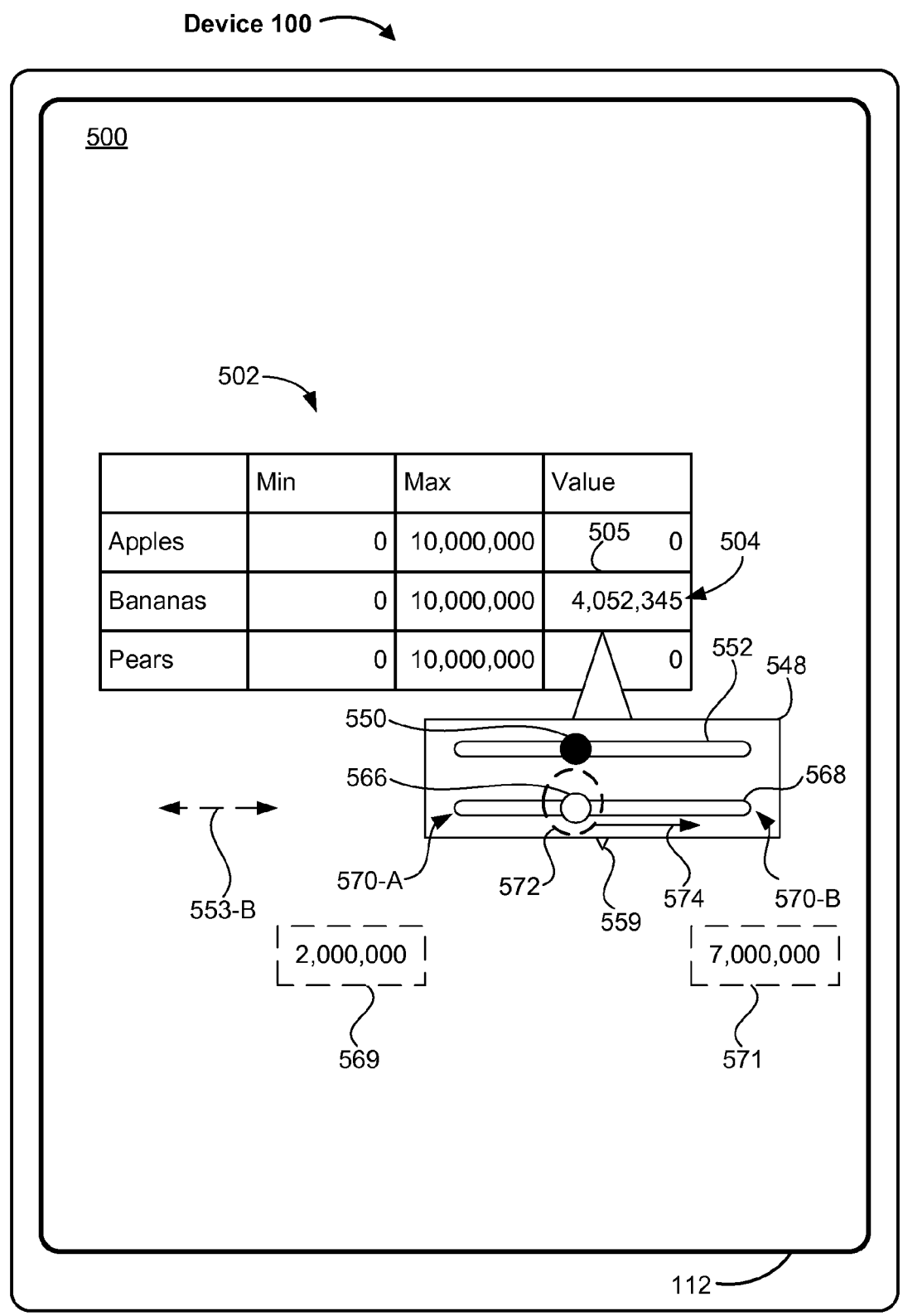

In response to the detection of gesture 562, value selection bar 568 and value selection object 566 are displayed, as shown in FIG. 5L. Value selection bar 568 has primary axis 553-B, which is parallel to axis 553-A, and ends 570-A and 570-B, which are associated with minimum value 569 and maximum value 571, respectively. Value selection bar 568 has the same length as value selection bar 552. Minimum value 569 and Maximum value 571 define the range of values for value selection bar 568. In FIG. 5L, minimum value 569 is 2,000,000, and maximum value 571 is 7,000,000; value selection bar 568 has a range of values that is a sub-range of the range of values for value selection bar 552. In some embodiments, while value selection bar 568 and value selection object 566 are displayed, value selection object 550 is locked in place on value selection bar 552; value selection bar 552 is disabled.

Figure 5M:
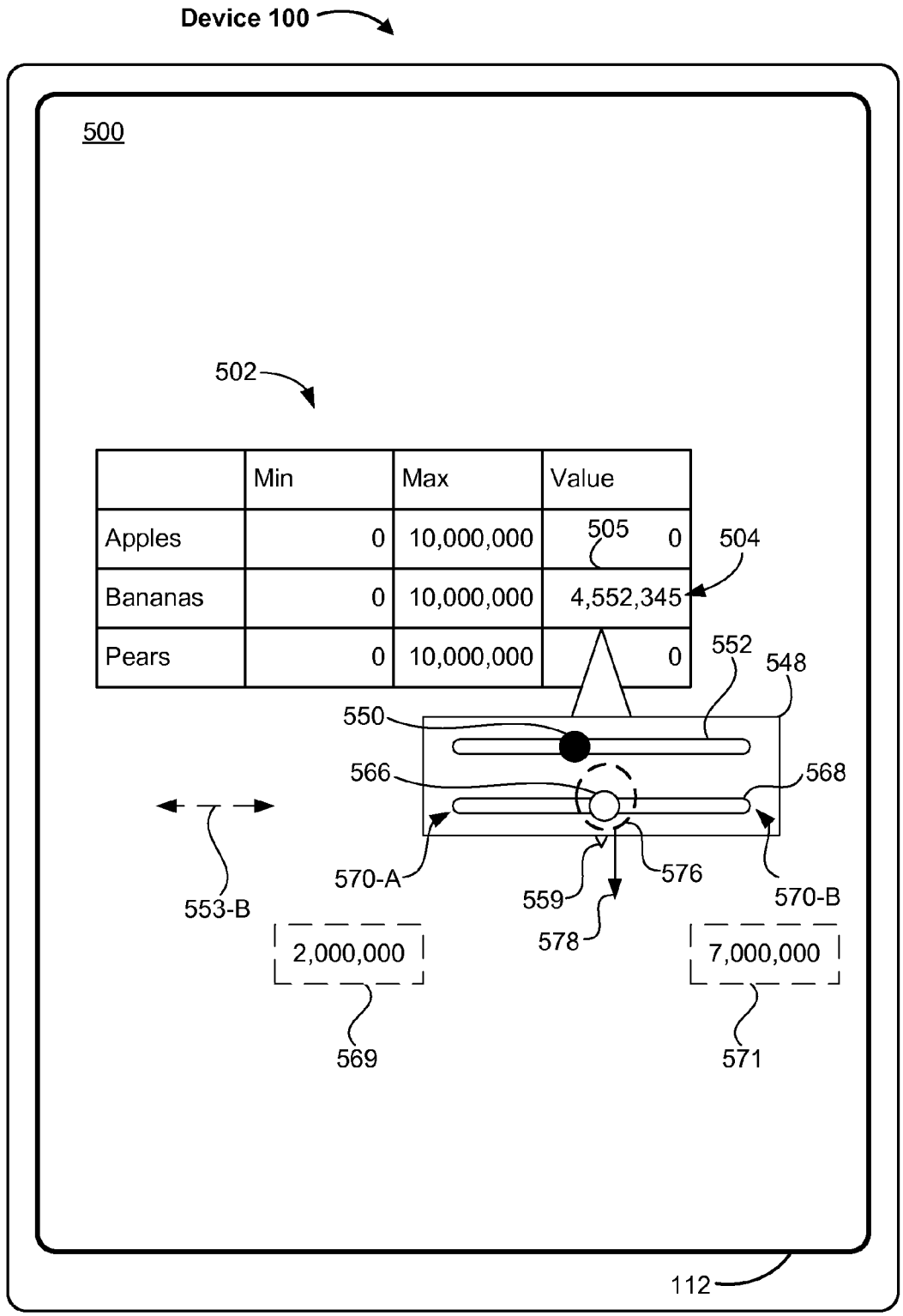

In FIG. 5L, gesture 572 is detected on value selection object 566. Gesture 572 includes a finger contact on value selection object 566 and movement of the finger contact in direction 574 parallel to axis 553-B. In response to the detection of gesture 572, value selection object 566 is moved to a different position on value selection bar 568, as shown in FIG. 5M; value selection object 566 slides along value selection bar 568 in accordance with the movement in gesture 572. In response to the movement of value selection object 566 to the different position, value 504 changes to a different value; value 504 in FIG. 5M is "4,552,345," whereas value 504 was "4,052,345" in FIG. 5L.

In FIG. 5M, gesture 576 is detected on slider interface 548. Gesture 576 includes a finger contact moving in direction 578 perpendicular to axis 553-B. In some embodiments, the finger contact in gesture 576 starts on value selection object 566, as shown in FIG. 5M. In some other embodiments, the finger contact in gesture 576 starts anywhere on value selection bar 568.

Figure 5N:
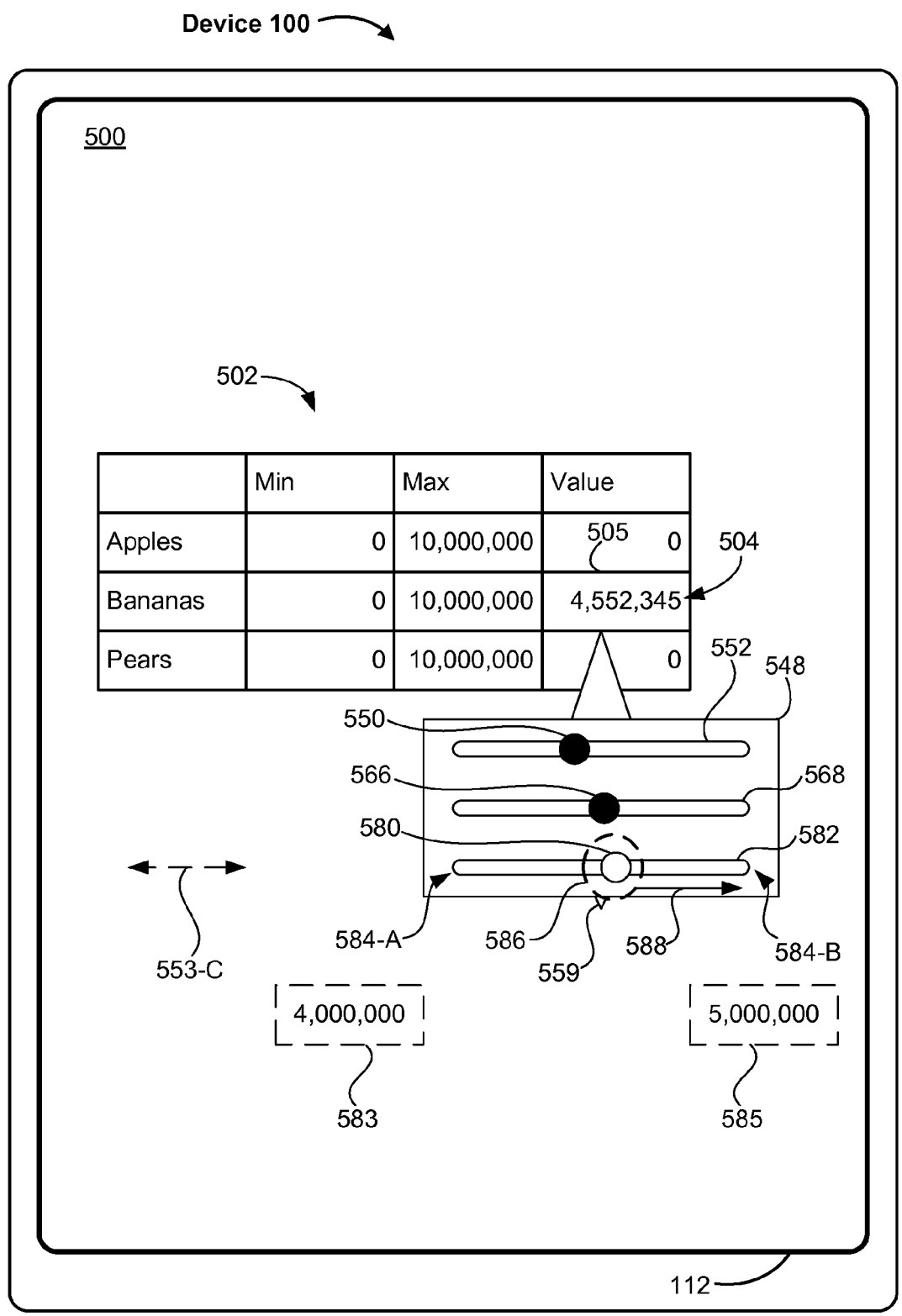

In response to the detection of gesture 576, value selection bar 582 and value selection object 580 are displayed, as shown in FIG. 5N. Value selection bar 582 has primary axis 553-C, which is parallel to axes 553-A and 553-B, and ends 584-A and 584-B, which are associated with minimum value 583 and maximum value 585, respectively. Value selection bar 582 has the same length as value selection bars 568 and 552. Minimum value 583 and Maximum value 585 define the range of values for value selection bar 582. In FIG. 5N, minimum value 583 is 4,000,000, and maximum value 585 is 5,000,000; value selection bar 582 has a range of values that is a sub-range of the range of values for value selection bar 568, and thus a further sub-range of the range of values for value selection bar 552. In some embodiments, while value selection bar 582 and value selection object 580 are displayed, value selection object 566 is locked in place on value selection bar 568, as well as value selection bar 550 being locked in place on value selection bar 552; value selection bars 552 and 568 are disabled.

Figure 5O:
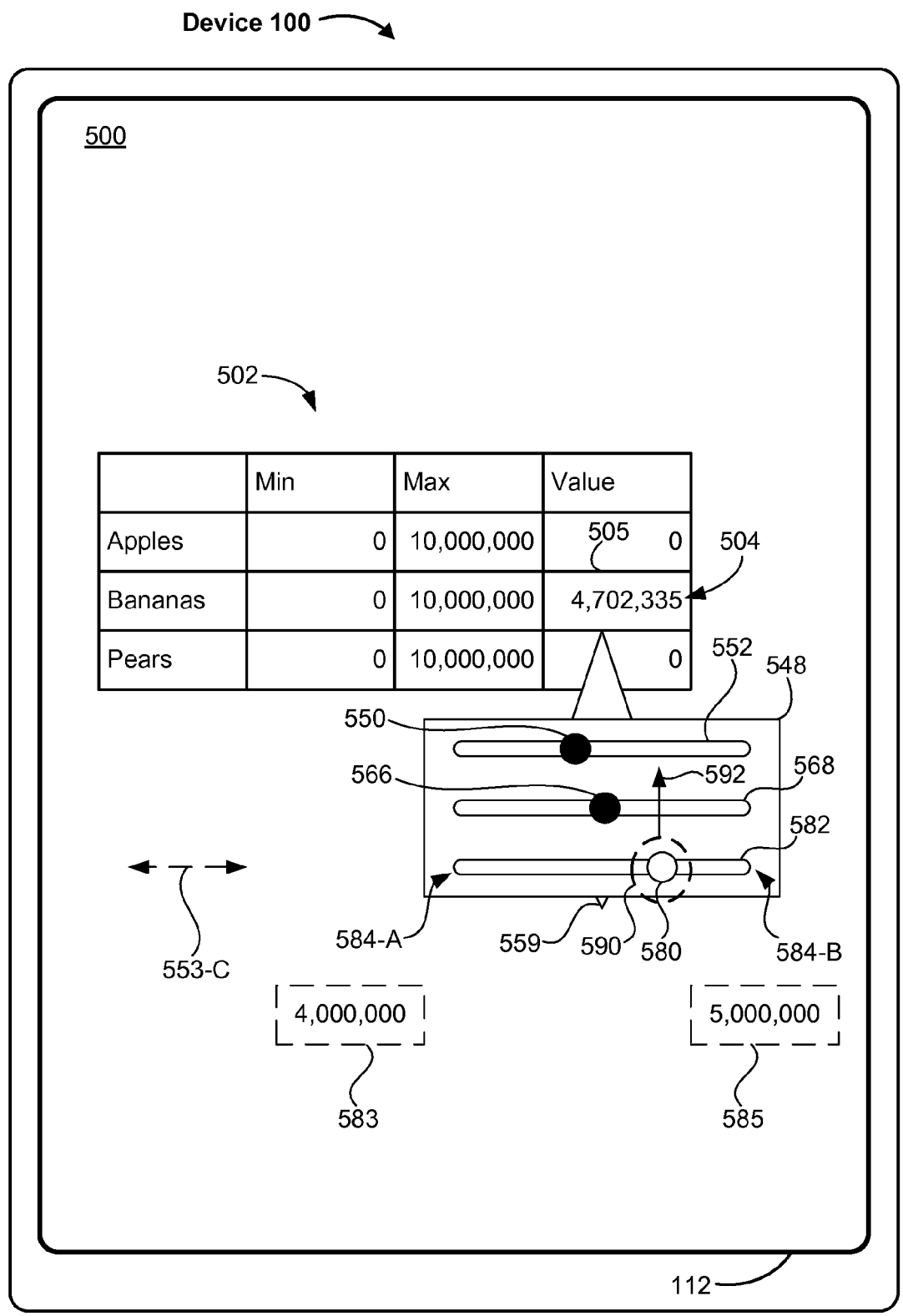

In FIG. 5N, gesture 586 is detected on value selection object 580. Gesture 586 includes a finger contact on value selection object 580 and movement of the finger contact in direction 588 parallel to axis 553-C. In response to the detection of gesture 586, value selection object 580 is moved to a different position on value selection bar 582, as shown in FIG. 5O; value selection object 580 slides along value selection bar 582 in accordance with the movement in gesture 586. In response to the movement of value selection object 580 to the different position, value 504 changes to a different value; value 504 in FIG. 5O is "4,702,335," whereas value 504 was "4,552,345" in FIG. 5N.

In FIG. 5O, gesture 590 is detected on slider interface 548. Gesture 590 includes a finger contact moving in direction 592 perpendicular to axis 553-C and opposite of direction 578 (FIG. 5M). In some embodiments, the finger contact in gesture 590 starts on value selection object 580, as shown in FIG. 5O. In some other embodiments, the finger contact in gesture 590 starts anywhere on value selection bar 582.

Figure 5P:
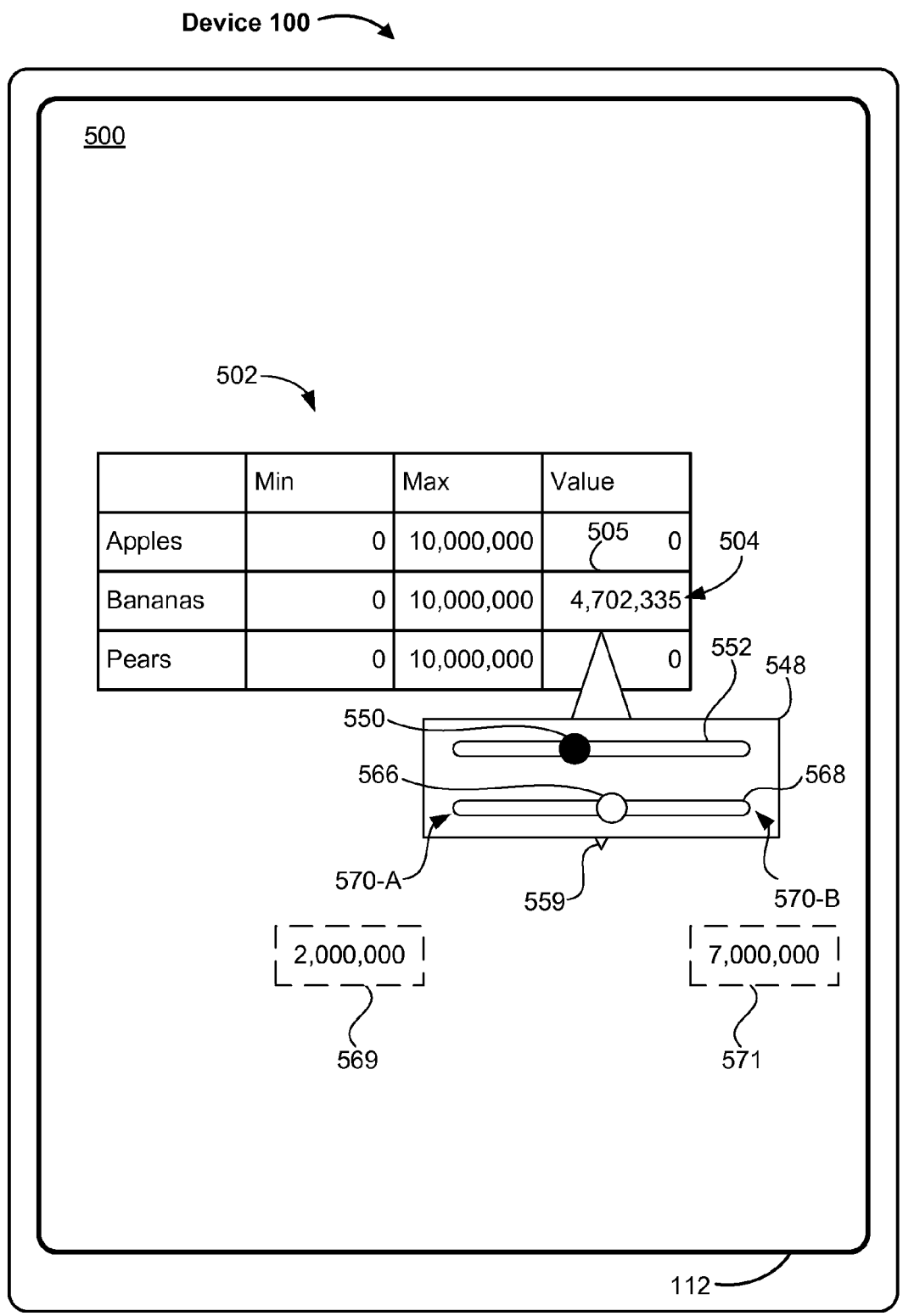
Figure 5Q:
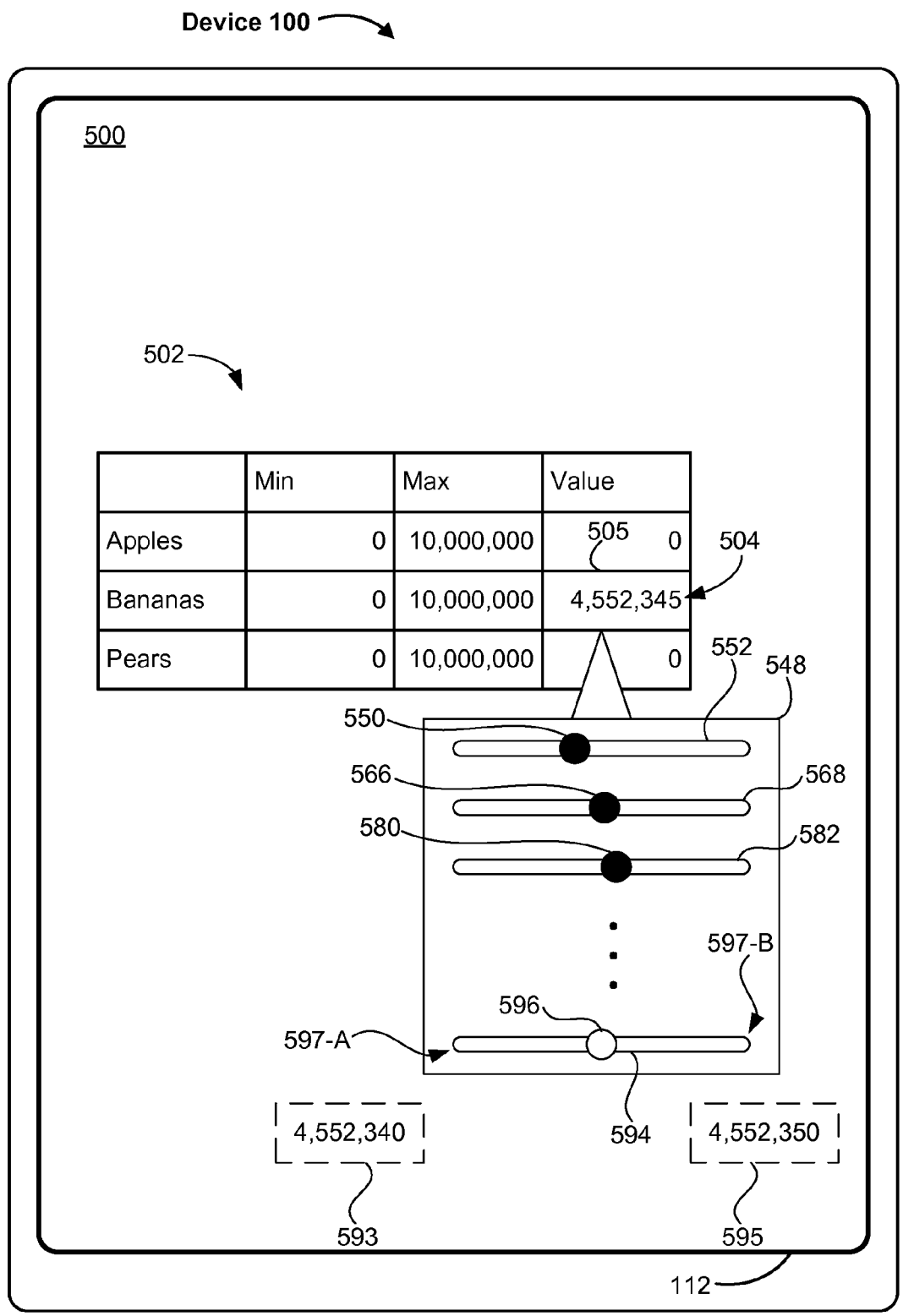

In response to the detection of gesture 590, value selection bar 582 and value selection object 580 ceases to be displayed, as shown in FIG. 5P. Value selection bar 568 is re-enabled; value selection object 566 may be moved again along value selection bar 568.

Thus, in response to predefined gestures (e.g., gestures 562, 576) by the user, additional value selection bars (e.g., value selection bars 568, 582) corresponding to progressively smaller value ranges for the same length of value selection bar, and thus having progressively finer control over value 504, may be displayed. When the user wants more fine control over value 504, the user may perform the predefined gestures to bring up, one at a time, additional value selection bars with progressively smaller value ranges. When the user wants less fine control (e.g., the user wishes to change value 504 by a relatively large amount), the user may perform the reverse of the predefined gestures to hide, one at a time, the additional value selection bars.

In some embodiments, a graphical indicator that additional value selection bars with smaller value ranges are available is displayed. For example, in FIGS. 5J-5P, indicator 559 is displayed adjacent to slider interface 548, indicating that additional value selection bars may be displayed in response to predefined gestures (e.g., gesture 562, 576). On the other hand, in FIG. 5Q, indicator 559 is not displayed. In FIG. 5Q, value selection bar 594 is the last of multiple value selection bars (bars 552, 568, 582, and so on) having progressively smaller value ranges. Value selection object 596 is displayed on value selection bar 594. Value selection bar 594 has ends 597-A and 597-B, which are associated with minimum value 593 and maximum value 595, respectively. For value selection bar 594, minimum value 593 is 4,552,340 and maximum value 595 is 4,552,350. The lack of indicator 559 indicates that there is no more finer value selection bar that the user can bring up than value selection bar 594.

Figure 6A:
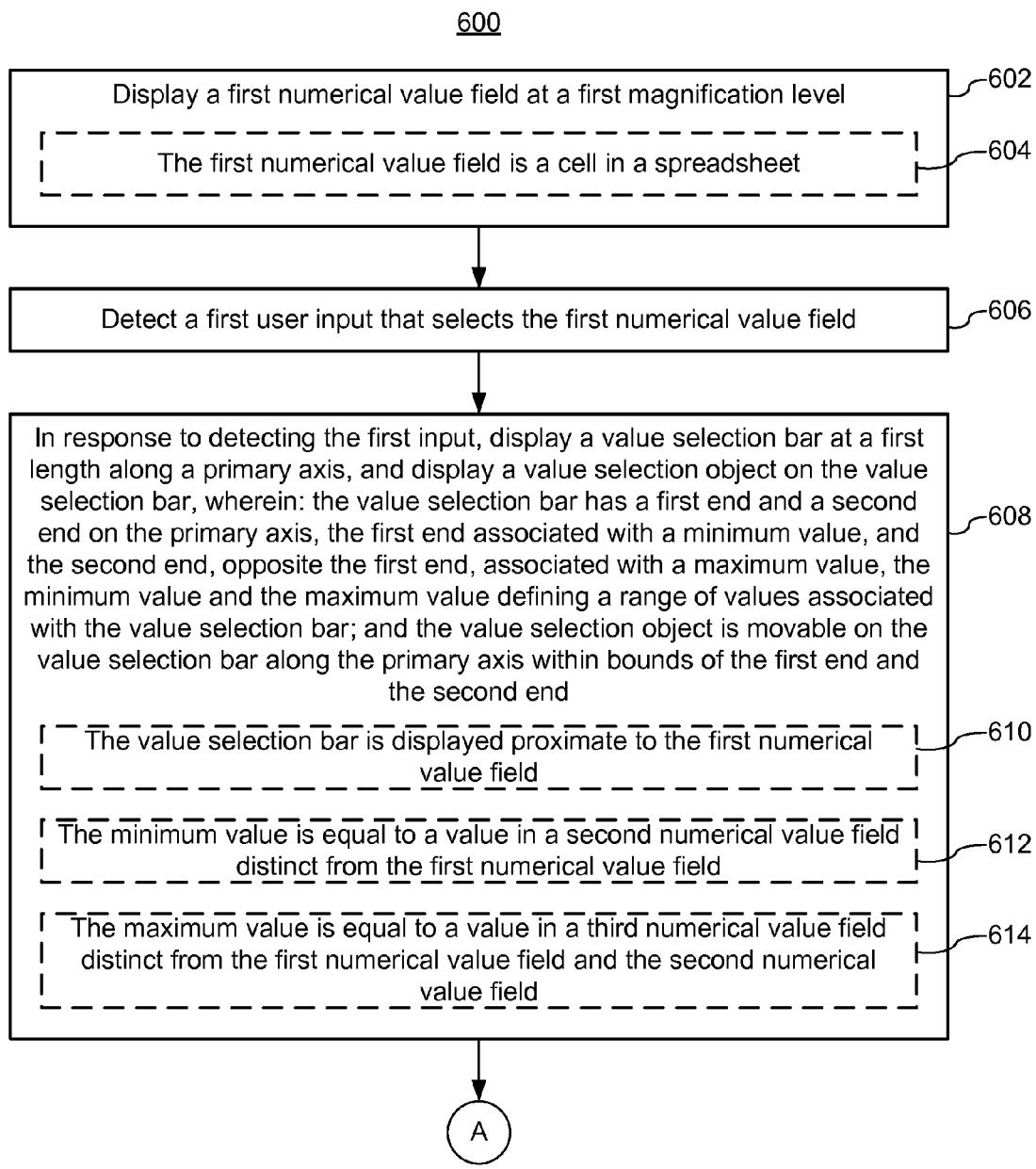
FIGS. 6A-6C are flow diagrams illustrating a method of inputting data using virtual sliders in accordance with some embodiments.
Figure 6B:
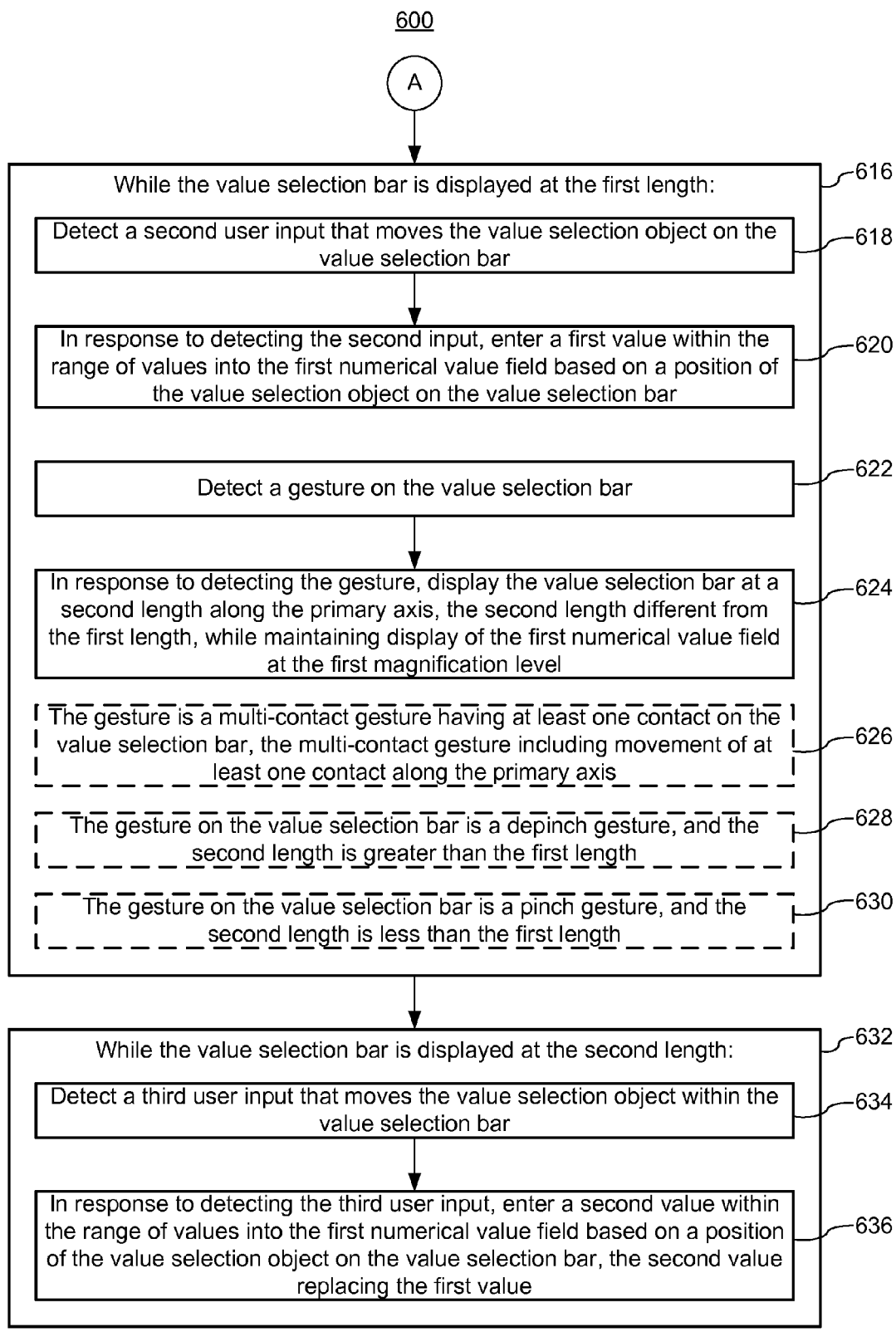
Figure 6C:
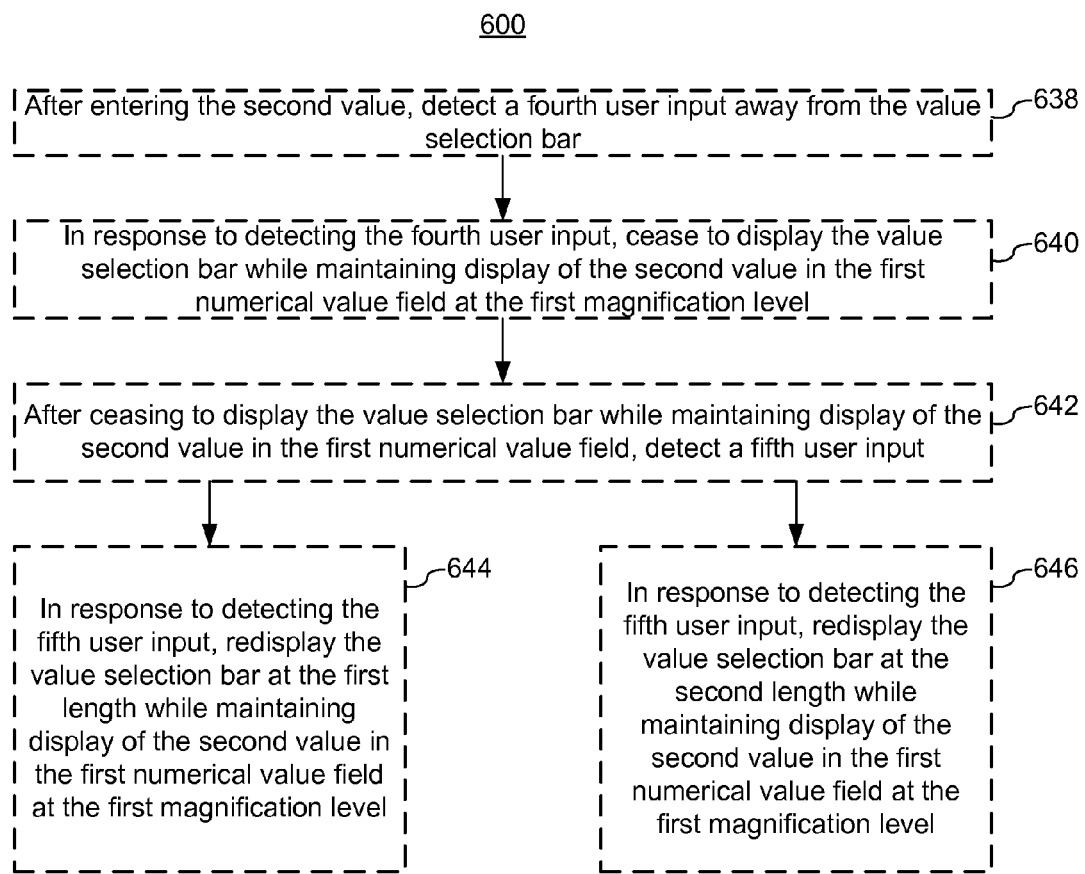
Figure 7A:
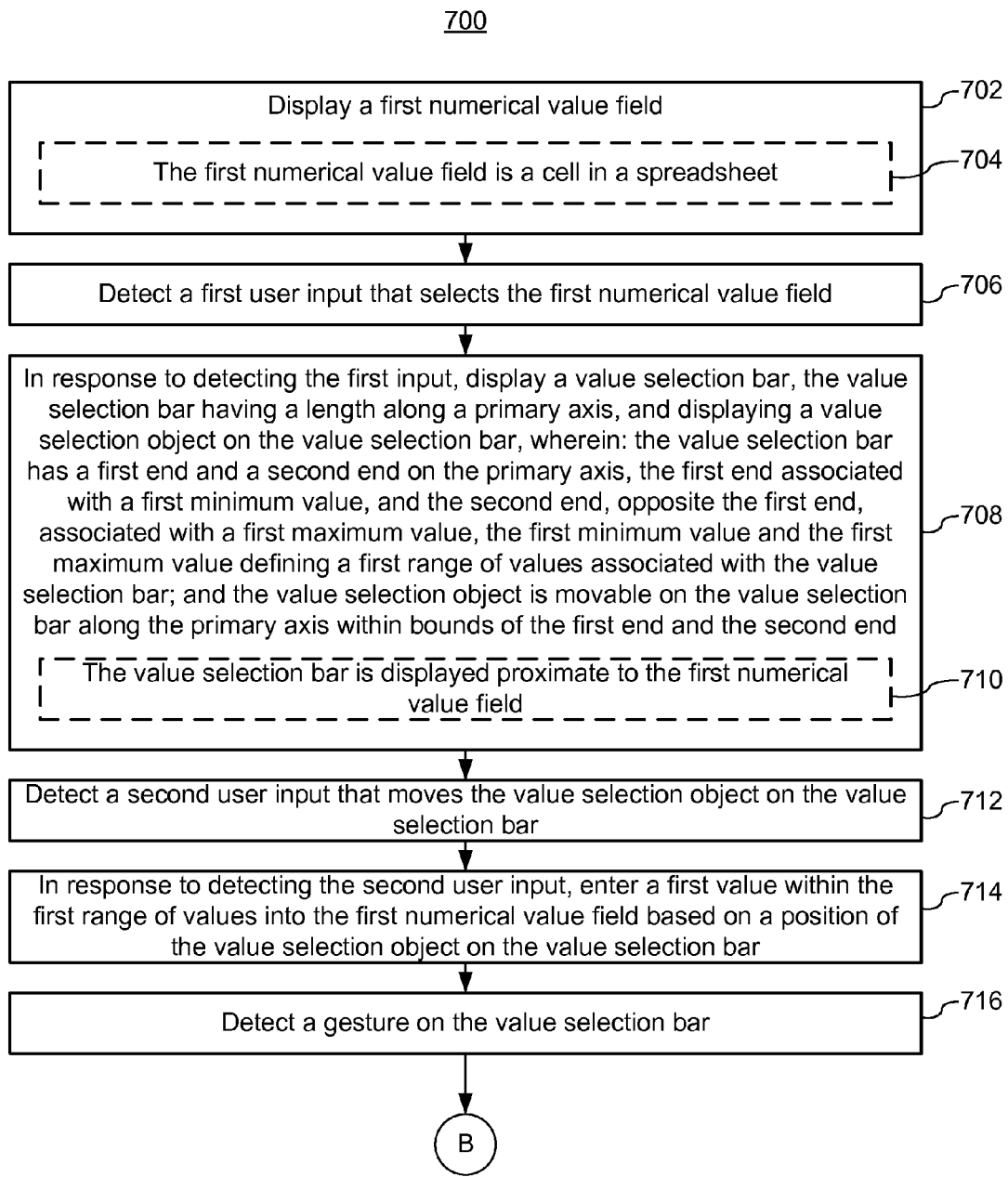
FIGS. 7A-7D are flow diagrams illustrating a method of inputting data using virtual sliders in accordance with some embodiments.
Figure 7B:
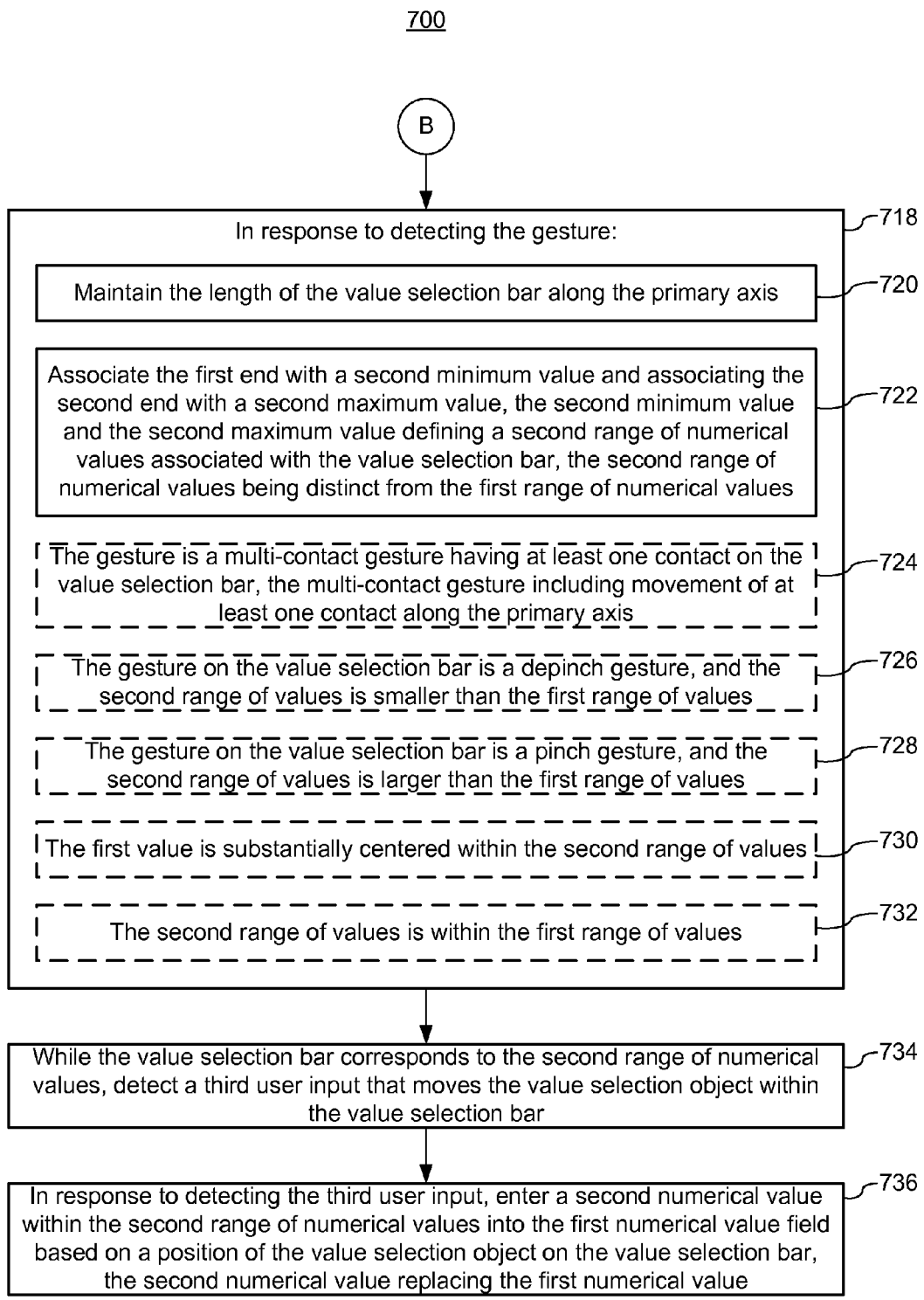
Figure 7C:
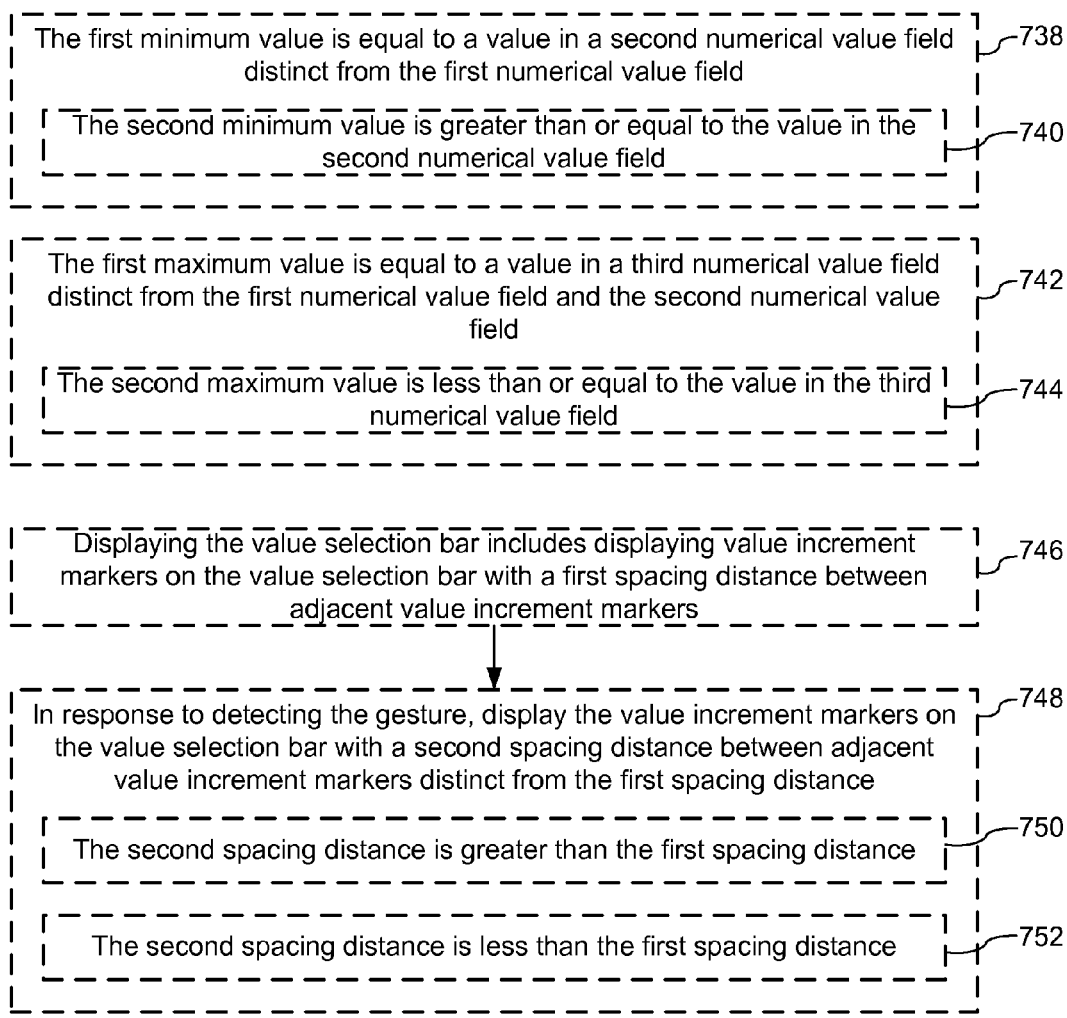
Figure 7D:
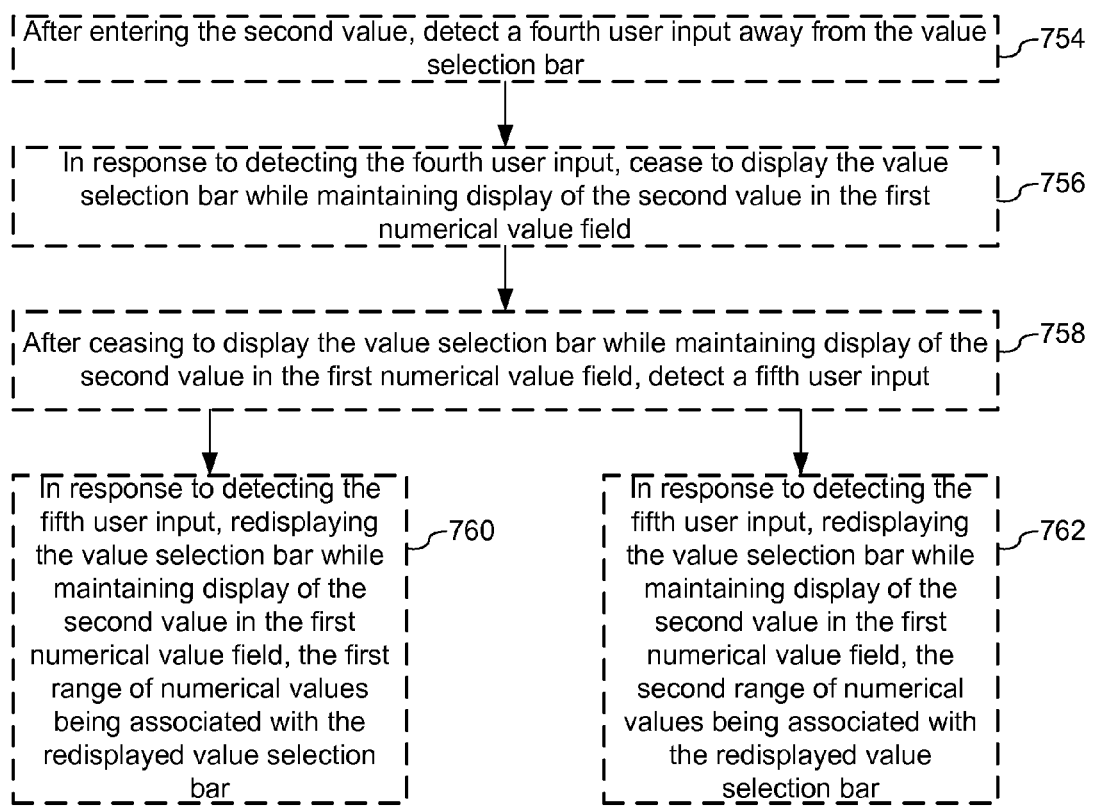

FIGS. 6A-6C are flow diagrams illustrating a method 600 of inputting data using virtual sliders in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides a more efficient way to precisely input data using virtual sliders. The method reduces the cognitive burden on a user when inputting data using sliders, thereby creating a more efficient human-machine interface. For battery-operated electronic devices, enabling a user to input data using sliders faster and more efficiently conserves power and increases the time between battery charges.

The device displays a first numerical value field at a first magnification level (602). For example, cell 505, which is an example of a numerical value field, may be displayed on display 112 of device 100, as shown in FIG. 5A. Cell 505 is displayed at a particular magnification level.

In some embodiments, the first numerical value field is a cell in a spreadsheet (604). For example, in FIG. 5A, cell 505 is a cell in spreadsheet 502.

The device detects a first user input that selects the first numerical value field (606). For example, in FIG. 5A, gesture 506 (e.g., a tap gesture) is detected at a location on display 112 corresponding to cell 505. Gesture 506 selects cell 505.

In response to detecting the first input, the device displays a value selection bar at a first length along a primary axis and displays a value selection object on the value selection bar (608). The value selection bar has a first end and a second end on the primary axis. The first end is associated with a minimum value. The second end is opposite the first end and associated with a maximum value. The minimum value and the maximum value define a range of values associated with the value selection bar. The value selection object is movable on the value selection bar along the primary axis within bounds of the first end and the second end.

For example, in response to the detection of gesture 506, cell 505 is selected. Value selection bar 512 is displayed, and value selection object 510 is displayed on value selection bar 512, as shown in FIG. 5B. Value selection bar 512 has length 511 along primary axis 513. Value selection bar 512 has opposite ends 514-A and 514-B on primary axis 513. End 514-A is associated with minimum value 515, and end 514-B is associated with maximum value 517. Minimum value 515 and maximum value 517 define a range of values for value selection bar 512. Value selection object 510 may be moved on value selection bar 512 along primary axis 513, and the range of movement of value selection object 510 is bound by ends 514-A and 514-B. In FIG. 5B, minimum value 515 has the value 0 and maximum value 517 has the value 10,000,000, defining a range of 0 to 10,000,000, inclusive, for value selection bar 512.

In some embodiments, the value selection bar is displayed proximate to the first numerical value field (610). For example, value selection bar 512 is displayed near cell 505, as shown in FIG. 5B, with a triangular pointer associating or connecting cell 505 with the slider interface containing value selection bar 512.

In some embodiments, the minimum value is equal to a value in a second numerical value field distinct from the first numerical value field (612). For example, in FIG. 5B, minimum value 515 is equal to the value in cell 501.

In some embodiments, the maximum value is equal to a value in a third numerical value field distinct from the first numerical value field and the second numerical value field (614). For example, in FIG. 5B, minimum value 517 is equal to the value in cell 503.

While the value selection bar is displayed at the first length (616), the device detects a second user input that moves the value selection object on the value selection bar (618). In response to detecting the second input, the device enters a first value within the range of values into the first numerical value field based on a position of the value selection object on the value selection bar (620). For example, in FIGS. 5B-5C, while value selection bar 512 is displayed at length 511, gesture 516 is detected on value selection object 510. In response to the detection of gesture 516, value selection object 510 is moved to a different position on value selection bar 512. A value (3,165,646) within the range of values defined by minimum value 515 and maximum value 517 is entered as value 504 into cell 505 based on the new position of value selection object 510 on value selection bar 512.

While the value selection bar is displayed at the first length (616), the device detects a gesture on the value selection bar (622), and in response to detecting the gesture, displays the value selection bar at a second length along the primary axis, the second length different from the first length, while maintaining display of the first numerical value field at the first magnification level (624). For example, as shown in FIG. 5C, gesture 520 is detected on value selection bar 512 while value selection bar 512 is displayed at length 511. In response to the detection of gesture 520, value selection bar 512 is displayed at length 521 (FIG. 5D), which is different from length 511, along primary axis 513. In FIG. 5D, cell 505 is still displayed at the same magnification level as before the detection of gesture 520. Here, gesture 520 increases the size of the slider interface without increasing the magnification of spreadsheet 502.

In some embodiments, the gesture is a multi-contact gesture having at least one contact on the value selection bar, the multi-contact gesture including movement of at least one contact along the primary axis (626). For example, gesture 520 is a multi-contact gesture with contacts 520-A and 520-B, as shown in FIG. 5C. Contacts 520-A and 520-B start on value selection bar 512 and move in direction 522-A and 522-B, respectively, along primary axis 513.

In some embodiments, the gesture on the value selection bar is a depinch gesture, and the second length is greater than the first length (628). For example, in FIG. 5C, gesture 520 is a depinch gesture, with contacts 520-A and 520-B moving away from each other. The resulting new length 521 (FIG. 5D) for value selection bar 512 is longer than length 511 (FIG. 5B). In some embodiments, the value selection bar may be lengthened up to a predefined maximum length.

In some embodiments, the gesture on the value selection bar is a pinch gesture, and the second length is less than the first length (630). As described above, value selection bar 512 may be lengthened in response to the detection of gesture 520, as shown in FIGS. 5C-5D. Conversely, value selection bar 512 may be shortened in response to the detection of a reverse of gesture 520, i.e., a pinch gesture. Thus, for example, if the user performs a pinch gesture that includes multiple (e.g., two) finger contacts moving toward each other, as in a reverse of gesture 520, in response to the detection of the gesture, value selection bar 512 is shortened to a length shorter than prior to the gesture. In some embodiments, the value selection bar may be shortened up to a predefined minimum length.

While the value selection bar is displayed at the second length (632), the device detects a third user input that moves the value selection object within the value selection bar (634), and, in response to detecting the third user input, enters a second value within the range of values into the first numerical value field based on a position of the value selection object on the value selection bar, where the second value replaces the first value (636). For example, as shown in FIGS. 5D-5E, while value selection bar 512 is displayed at length 521, gesture 524 is detected on value selection object 510. In response to the detection of gesture 524, value selection object 510 is moved to a different position on value selection bar 512. A value (4,116,684) within the range of values defined by minimum value 515 and maximum value 517 is entered as value 504 into cell 505, replacing the previous value 504, based on the new position of value selection object 510 on value selection bar 512.

In some embodiments, after entering the second value, the device detects a fourth user input away from the value selection bar (638). In response to detecting the fourth user input, the device ceases to display the value selection bar while maintaining display of the second value in the first numerical value field at the first magnification level (640). After ceasing to display the value selection bar while maintaining display of the second value in the first numerical value field, the device detects a fifth user input (642). In response to detecting the fifth user input, the device redisplays the value selection bar at the first length while maintaining display of the second value in the first numerical value field at the first magnification level (644). When the first numerical value field is deselected, the value selection bar (whose length had changed in response to the gesture) ceases to be displayed. When the first numerical value field is selected again, the value selection bar may be displayed at the length prior to the length change. For example, the length prior to the length change may be a predefined default length; when the value selection bar is re-displayed after ceasing to be displayed, it is displayed at the default length.

For example, following from FIG. 5E, a gesture similar to gesture 506 (e.g., a tap gesture) is detected away from (e.g., not on) cell 505. In response to the gesture, cell 505 is de-selected and slider interface 508, including value selection bar 512 ceases to be displayed. Value 504 remains displayed in cell 505 at its current value (i.e., the value as of what is shown in FIG. 5E). Then, another gesture similar to gesture 506 (e.g., a tap gesture) is detected on cell 505. In response to that gesture, cell 505 is re-selected. Slider interface 508, including value selection bar 512, is redisplayed, and cell 505 is still displayed at the same magnification level as prior to the re-selection gesture. Value selection bar 512 is re-displayed at length 511, and value 504 is displayed at its current value in cell 505.

In some other embodiments, in response to detecting the fifth user input, the device redisplays the value selection bar at the second length while maintaining display of the second value in the first numerical value field at the first magnification level (646). Following from step 642, instead of re-displaying the value selection bar at the first length, the value selection bar is re-displayed at the second length. That is, the value selection bar is re-displayed at its most recent length before ceasing to be displayed. For example, in response to the gesture re-selecting cell 505, value selection bar 512 is re-displayed at length 521.

It should be understood that the particular order in which the operations in FIGS. 6A-6C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 700 and 800 (e.g., FIGS. 7A-7D and 8A-8C respectively) are also applicable in an analogous manner to method 600 described above with respect to FIGS. 6A-6C. For example, cell 505 and value 504 described above with reference to method 600 may have one or more of the characteristics of the cell 505 and value 504 described herein with reference to methods 700 and 800. For brevity, these details are not repeated here.

FIGS. 7A-7D are flow diagrams illustrating a method 700 of inputting data using virtual sliders in accordance with some embodiments. The method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides a more efficient way to precisely input data using virtual sliders. The method reduces the cognitive burden on a user when inputting data using sliders, thereby creating a more efficient human-machine interface. For battery-operated electronic devices, enabling a user to input data using sliders faster and more efficiently conserves power and increases the time between battery charges.

The device displays a first numerical value field (702). For example, cell 505, which is an example of a numerical value field, may be displayed on display 112 of device 100, as shown in FIG. 5A.

In some embodiments, the first numerical value field is a cell in a spreadsheet (704). For example, in FIG. 5A, cell 505 is a cell in spreadsheet 502.

The device detects a first user input that selects the first numerical value field (706). For example, in FIG. 5A, gesture 506 (e.g., a tap gesture) is detected at a location on display 112 corresponding to cell 505. Gesture 506 selects cell 505.

In response to detecting the first input, the device displays a value selection bar and displays a value selection object on the value selection bar (708). The value selection bar has a length along a primary axis. The value selection bar has a first end and a second end on the primary axis. The first end is associated with a first minimum value. The second end, which is opposite the first end, is associated with a first maximum value. The first minimum value and the first maximum value define a first range of values associated with the value selection bar. The value selection object is movable on the value selection bar along the primary axis within bounds of the first end and the second end.

For example, in response to the detection of gesture 506, cell 505 is selected. Value selection bar 532 is displayed, and value selection object 530 is displayed on value selection bar 532, as shown in FIG. 5F. Value selection bar 532 has length 541 along primary axis 533. Value selection bar 532 has opposite ends 534-A and 534-B on primary axis 533. End 534-A is associated with minimum value 535-A, and end 534-B is associated with maximum value 537-A. Minimum value 535-A and maximum value 537-A define a range of values for value selection bar 532. In FIG. 5F, minimum value 535-A has the value 0 and maximum value 537-A has the value 10,000,000. Value selection object 530 may be moved on value selection bar 532 along primary axis 533, and the range of movement of value selection object 530 is bound by ends 534-A and 534-B.

In some embodiments, the value selection bar is displayed proximate to the first numerical value field (710). For example, value selection bar 532 is displayed near cell 505, as shown in FIG. 5F, with a triangular pointer associating or connecting cell 505 with the slider interface containing value selection bar 532.

The device detects a second user input that moves the value selection object on the value selection bar (712). In response to detecting the second user input, the device enters a first value within the first range of values into the first numerical value field based on a position of the value selection object on the value selection bar (714). For example, in FIGS. 5F-5G, gesture 536 is detected on value selection object 530. In response to the detection of gesture 536, value selection object 530 is moved to a different position on value selection bar 532. A value (3,165,646) within the range of values defined by minimum value 535-A and maximum value 537-A is entered as value 504 into cell 505 based on the new position of value selection object 530 on value selection bar 532.

The device detects a gesture on value selection bar (716). In response to detecting the gesture (718), the device maintains the length of the value selection bar along the primary axis (720), and associates the first end with a second minimum value and associating the second end with a second maximum value (722). The second minimum value and the second maximum value define a second range of numerical values associated with the value selection bar. The second range of numerical values is distinct from the first range of numerical values. For example, in FIG. 5G, gesture 540 is detected. In response to the detection of gesture 540, the length of value selection bar 532 is maintained at length 541. End 534-A is associated with minimum value 535-B, and end 534-B is associated with maximum value 537-B, as shown in FIG. 5H. Minimum value 535-B and maximum value 537-B define a different range of values than minimum value 535-A and maximum value 537-A.

In some embodiments, the gesture is a multi-contact gesture having at least one contact on the value selection bar, the multi-contact gesture including movement of at least one contact along the primary axis (724). In FIG. 5G, for example, gesture 540 is a multi-contact gesture with contacts 540-A and 540-B. Contacts 540-A and 540-B start on value selection bar 532 and move in direction 542-A and 542-B, respectively, along primary axis 533.

In some embodiments, the gesture on the value selection bar is a depinch gesture, and the second range of values is smaller than the first range of values (726). For example, in FIG. 5G, gesture 540 is a depinch gesture, with contacts 540-A and 540-B moving away from each other. The resulting new minimum and maximum values 535-B and 537-B (FIG. 5H) for value selection bar 532 define a smaller range of values than the range defined by minimum and maximum values 535-A and 537-B.

In some embodiments, the gesture on the value selection bar is a pinch gesture, and the second range of values is larger than the first range of values (728). As described above, the range of values for value selection bar 532 may be reduced in response to the detection of gesture 540, as shown in FIGS. 5G-5H. Conversely, the range of values for value selection bar 532 may be enlarged in response to the detection of a reverse of gesture 540, i.e., a pinch gesture. Thus, for example, if the user performs a pinch gesture that includes multiple (e.g., two) finger contacts moving toward each other, as in a reverse of gesture 540, in response to the detection of the gesture, minimum value 535 and maximum value 537 change to values that enlarge the range of values for value selection bar 532 (e.g., minimum value 535 changes to a smaller value and/or maximum value 537 changes to a larger value).

In some embodiments, the first value is substantially centered within the second range of values (730). In other words, in some embodiments, the adjustment of the range of values is centered about the current value in the first numerical field. For example, in FIG. 5H, the range defined by minimum value 535-B (1,000,000) and maximum value 537-B (6,000,000) is substantially centered about value 504 (3,165,645).

In some embodiments, the second range of values is within the first range of values (732). For example, the range of values defined by minimum value 535-B and maximum value 537-B is within the range of values defined by minimum value 535-A and maximum value 537-A.

While the value selection bar corresponds to the second range of numerical values, the device detects a third user input that moves the value selection object within the value selection bar (734). In response to detecting the third user input, the device enters a second numerical value within the second range of numerical values into the first numerical value field based on a position of the value selection object on the value selection bar, the second numerical value replacing the first numerical value (736). For example, as shown in FIGS. 5H-5I, while value selection bar 532 is displayed and corresponds to the range of values defined by minimum value 535-B and maximum value 537-B, gesture 544 is detected on value selection object 530. In response to the detection of gesture 544, value selection object 530 is moved to a different position on value selection bar 532. A value (4,055,646) within the range of values defined by minimum value 535-B and maximum value 537-B is entered as value 504 into cell 505, replacing the previous value 504, based on the new position of value selection object 530 on value selection bar 532.

In some embodiments, the first minimum value is equal to a value in a second numerical value field distinct from the first numerical value field (738). For example, in FIG. 5F, minimum value 535-A is equal to the value in cell 501.

In some embodiments, the second minimum value is greater than or equal to the value in the second numerical value field (740). For example, in FIG. 5H, minimum value 535-B is greater than the value in cell 501.

In some embodiments, the first maximum value is equal to a value in a third numerical value field distinct from the first numerical value field and the second numerical value field (742). For example, in FIG. 5F, maximum value 537-A is equal to the value in cell 503.

In some embodiments, the second maximum value is less than or equal to the value in the third numerical value field (744). For example, in FIG. 5H, maximum value 537-B is less than the value in cell 503.

In some embodiments, displaying the value selection bar includes displaying value increment markers on the value selection bar with a first spacing distance between adjacent value increment markers (746). For example, markings 539 are displayed on value selection bar 532, as shown in FIG. 5F. Markings 539 are spaced a particular distance apart.

In some embodiments, in response to detecting the gesture, the device displays the value increment markers on the value selection bar with a second spacing distance between adjacent value increment markers distinct from the first spacing distance (748). For example, in response to the detection of gesture 540, markings 539 are displayed with different spacing than prior to the detection of gesture 540. Markings 539 are spaced farther apart as shown in FIG. 5H than in FIG. 5G.

In some embodiments, the second spacing distance is greater than the first spacing distance (750). For example, markings 539 are spaced farther apart as shown in FIG. 5H than in FIG. 5G.

In some embodiments, the second spacing distance is less than the first spacing distance (752). For example, if the range of values for value selection bar 532 is enlarged instead of reduced, then markings 539 are displayed closer together.

In some embodiments, after entering the second value, the device detects a fourth user input away from the value selection bar (754). In response to detecting the fourth user input, the device ceases to display the value selection bar while maintaining display of the second value in the first numerical value field (756). After ceasing to display the value selection bar while maintaining display of the second value in the first numerical value field, the device detects a fifth user input (758). In response to detecting the fifth user input, the device redisplays the value selection bar while maintaining display of the second value in the first numerical value field, the first range of numerical values being associated with the redisplayed value selection bar (760). When the first numerical value field is deselected, the value selection bar (whose range of values had changed in response to the gesture) ceases to be displayed. When the first numerical value field is selected again, the value selection bar may be displayed with the range of values prior to the change in the range. For example, the range prior to the change may be a predefined default; when the value selection bar is re-displayed after ceasing to be displayed, it is displayed with the default range.

For example, following from FIG. 5I, a gesture similar to gesture 506 (e.g., a tap gesture) is detected away from (e.g., not on) cell 505. In response to the gesture, cell 505 is de-selected and slider interface 528, including value selection bar 532 ceases to be displayed. Value 504 remains displayed in cell 505 at its current value (i.e., the value as of what is shown in FIG. 5I). Then, another gesture similar to gesture 506 (e.g., a tap gesture) is detected on cell 505. In response to that gesture, cell 505 is re-selected. Slider interface 528, including value selection bar 532, is re-displayed. Value selection bar 532 is re-displayed at length 541 and with the range defined by minimum value 535-A and maximum value 537-A, and value 504 is displayed at its current value in cell 505.

In some other embodiments, in response to detecting the fifth user input, the device redisplays the value selection bar while maintaining display of the second value in the first numerical value field, the second range of numerical values being associated with the redisplayed value selection bar (762). Following from step 758, instead of re-displaying the value selection bar with the first range of values, the value selection bar is re-displayed with the second range of values. That is, the value selection bar is re-displayed with its most recent range of values before ceasing to be displayed. For example, in response to the gesture re-selecting cell 505, value selection bar 532 is re-displayed at length 541 and with the range defined by minimum value 535-B and maximum value 537-B.

It should be understood that the particular order in which the operations in FIGS. 7A-7D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 800 (e.g., FIGS. 6A-6C and 8A-8C respectively) are also applicable in an analogous manner to method 700 described above with respect to FIGS. 7A-7D. For example, the value 504 and cell 505 described above with reference to method 700 may have one or more of the characteristics of the value 504 and cell 505 described herein with reference to methods 600 and 800. For brevity, these details are not repeated here.

Figure 8A:
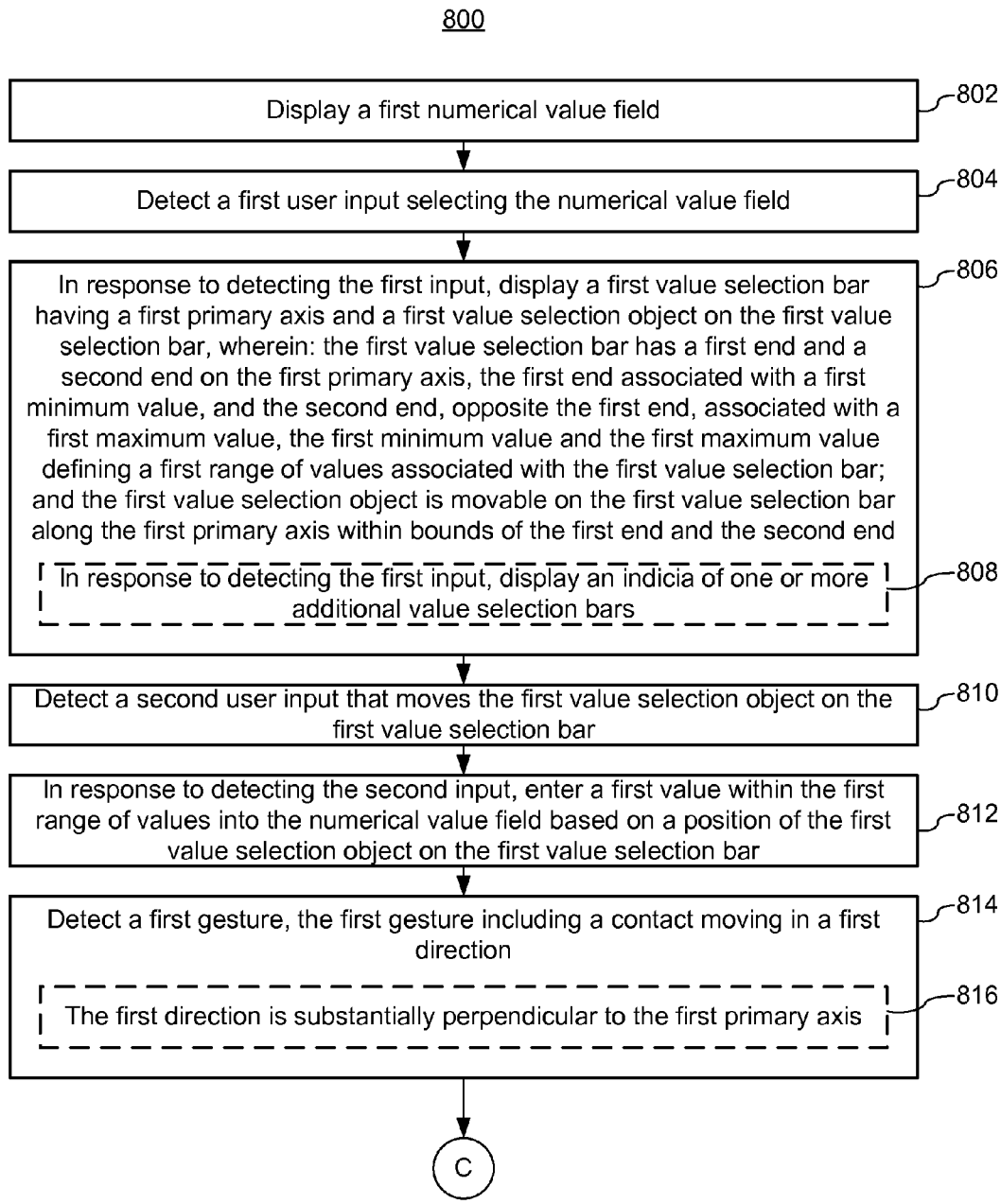
Figure 8B:
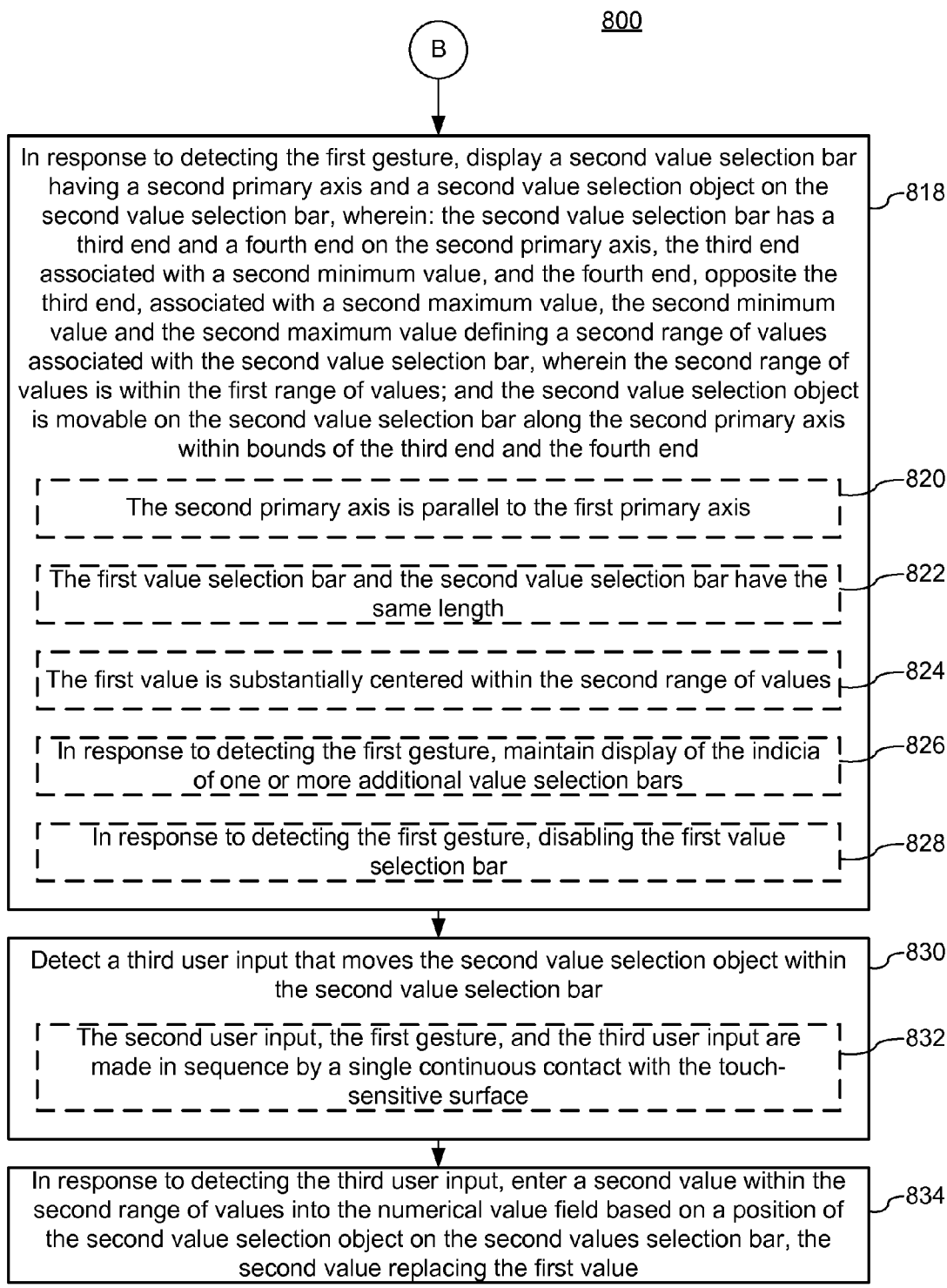

FIGS. 8A-8C are flow diagrams illustrating a method 800 of inputting data using virtual sliders in accordance with some embodiments. The method 800 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 800 may be combined and/or the order of some operations may be changed.

As described below, the method 800 provides a more efficient way to precisely input data using virtual sliders. The method reduces the cognitive burden on a user when inputting data using sliders, thereby creating a more efficient human-machine interface. For battery-operated electronic devices, enabling a user to input data using sliders faster and more efficiently conserves power and increases the time between battery charges.

The device displays a numerical value field (802). For example, cell 505, which is an example of a numerical value field, may be displayed on display 112 of device 100, as shown in FIG. 5A.

The device detects a first user input selecting the numerical value field (804). For example, in FIG. 5A, gesture 506 (e.g., a tap gesture) is detected at a location on display 112 corresponding to cell 505. Gesture 506 selects cell 505.

In response to detecting the first input, the device displays a first value selection bar having a first primary axis and a first value selection object on the first value selection bar (806). The first value selection bar has a first end and a second end on the first primary axis. The first end is associated with a first minimum value. The second end, opposite the first end, is associated with a first maximum value. The first minimum value and the first maximum value define a first range of values associated with the first value selection bar. The first value selection object is movable on the first value selection bar along the first primary axis within bounds of the first end and the second end.

For example, in response to the detection of gesture 506, cell 505 is selected. Value selection bar 552 is displayed, and value selection object 550 is displayed on value selection bar 552, as shown in FIG. 5J. Value selection bar 552 has primary axis 553-A. Value selection bar 552 has opposite ends 554-A and 554-B on primary axis 553-A. End 554-A is associated with minimum value 555, and end 554-B is associated with maximum value 557. Minimum value 555 and maximum value 557 define a range of values for value selection bar 552. In FIG. 5J, minimum value 555 has the value 0 and maximum value 557 has the value 10,000,000. Value selection object 550 may be moved on value selection bar 552 along primary axis 553-A, and the range of movement of value selection object 550 is bound by ends 554-A and 554-B.

In some embodiments the device displays indicia of one or more additional value selection bars (808). For example, in FIG. 5J, indicator 559 indicates that there are additional value selection bars.

The device detects a second user input that moves the first value selection object on the first value selection bar (810). In response to detecting the second input, the device enters a first value within the first range of values into the numerical value field based on a position of the first value selection object on the first value selection bar (812). For example, in FIGS. 5J-5K, gesture 558 is detected on value selection object 550. In response to the detection of gesture 558, value selection object 550 is moved to a different position on value selection bar 552. A value (4,052,345) within the range of values defined by minimum value 555 and maximum value 557 is entered as value 504 into cell 505 based on the new position of value selection object 550 on value selection bar 552.

The device detects a first gesture, the first gesture including a contact moving in a first direction (814). For example, in FIG. 5K, gesture 562 is detected. Gesture 562 includes a finger contact moving in direction 564.

In some embodiments, the first direction is substantially perpendicular to the first primary axis (816). Direction 564 of gesture 562, for example, is perpendicular to axis 553-A.

In response to detecting the first gesture, the device displays a second value selection bar having a second primary axis and a second value selection object on the second value selection bar (818). The second value selection bar has a third end and a fourth end on the second primary axis. The third end is associated with a second minimum value. The fourth end, opposite the third end, is associated with a second maximum value. The second minimum value and the second maximum value define a second range of values associated with the second value selection bar. The second range of values is within the first range of values. The second value selection object is movable on the second value selection bar along the second primary axis within bounds of the third end and the fourth end.

For example, in response to the detection of gesture 564, value selection bar 568 is displayed, and value selection object 566 is displayed on value selection bar 568, as shown in FIG. 5L. Value selection bar 568 has primary axis 553-B. Value selection bar 568 has opposite ends 570-A and 570-B on primary axis 553-B. End 570-A is associated with minimum value 569, and end 570-B is associated with maximum value 571. Minimum value 569 and maximum value 571 define a range of values for value selection bar 568. In FIG. 5L, minimum value 569 has the value 2,000,000 and maximum value 571 has the value 7,000,000. The range of values defined by minimum value 569 and maximum value 571 is within the range of values for value selection bar 552 (i.e., the range of values defined by minimum value 555 and maximum value 557). Value selection object 566 may be moved on value selection bar 568 along primary axis 553-B, and the range of movement of value selection object 566 is bound by ends 570-A and 570-B.

In some embodiments, the second primary axis is parallel to the first primary axis (820). For example, axis 553-B (FIG. 5L) is parallel to axis 553-A (FIG. 5K).

In some embodiments, the first value selection bar and the second value selection bar have the same length (822). For example, value selection bars 568 and 552 have the same length, as shown in FIG. 5L.

In some embodiments, the first value is substantially centered within the second range of values (824). In other words, in some embodiments, the second range of values is centered about the current value in the numerical field. For example, in FIG. 5L, the range for value selection bar 568 (2,000,000 to 7,000,000) is substantially centered about value 504 (4,052,345).

In some embodiments, in response to detecting the first gesture, the device maintains display of the indicia of one or more additional value selection bars (826). For example, in FIGS. 5K-5L, in response to the detection of gesture 564, indicator 559 remains displayed; additional value selection bars are still available.

In some embodiments, in response to detecting the first gesture, the device disables the first value selection bar (828). For example, in FIGS. 5K-5L, in response to the detection of gesture 564, value selection bar 552 is disabled; value selection object 550 is locked in place.

The device detects a third user input that moves the second value selection object within the second value selection bar (830). For example, in FIG. 5L, gesture 572 is detected on value selection object 566. In response to the detection of gesture 572, value selection object 566 is moved to a different position on value selection bar 568.

In some embodiments, the second user input, the first gesture, and the third user input are made in sequence by a single continuous contact with the touch-sensitive surface (832). For example, gestures 558, 562, and 572 may be one continuous gesture in sequence with no intervening liftoff of the contact.

In response to detecting the third user input, the device enters a second value within the second range of values into the numerical value field based on a position of the second value selection object on the second values selection bar, the second value replacing the first value (834). For example, in response to the detection of gesture 572 (FIG. 5L), a value (4,552,345) within the range of values defined by minimum value 569 and maximum value 571 is entered as value 504 into cell 505 based on the new position of value selection object 566 on value selection bar 568 (FIG. 5M).

In some embodiments, the device detects a second gesture, the second gesture including a contact moving in a second direction opposite the first direction (836). In response to detecting the second gesture, the device ceases to display the second value selection bar and the second value selection object (838).

In FIG. 5O, gesture 590 is detected on value selection object 580. Gesture 590 includes a contact moves in direction 592 opposite of direction 578 (FIG. 5M). In response to the detection of gesture 590, value selection bar 582 and value selection object 580 ceases to be displayed. A gesture similar to gesture 590 may be detected on value selection object 566 (i.e., a gesture starting on value selection object 566 and moving in same direction as direction 592). In response to that gesture, value selection bar 568 and value selection object 566 ceases to be displayed in an analogous manner as value selection bar 582 and value selection object 580 ceases to be displayed in response to the detection of gesture 590.

While displaying the second value in the numerical value field, the device detects a third gesture, the third gesture including a contact moving in the first direction (840). For example, in FIG. 5M, while a new value 504 is displayed, gesture 576 is detected. Gesture 576 includes movement in direction 578, which is the same as direction 564.

In some embodiments, the second user input, the first gesture, the third user input, and the third gesture are made in sequence by a single continuous contact with the touch-sensitive surface (842). For example, gestures 558, 562, 572, and 576 may be one continuous gesture in sequence with no intervening liftoff of the contact.

In response to detecting the third gesture, the device displays a third value selection bar having a third primary axis and a third value selection object on the third value selection bar (844). The third value selection bar has a fifth end and a sixth end on the third primary axis. The fifth end is associated with a third minimum value. The sixth end, opposite the fifth end, is associated with a third maximum value. The third minimum value and the third maximum value define a third range of values associated with the third value selection bar. The third range of values is within the second range of values. The third value selection object is movable on the third value selection bar along the third primary axis within bounds of the fifth end and the sixth end.

For example, in response to the detection of gesture 576, value selection bar 582 is displayed, and value selection object 580 is displayed on value selection bar 582, as shown in FIG. 5N. Value selection bar 582 has primary axis 553-C. Value selection bar 582 has opposite ends 584-A and 584-B on primary axis 553-C. End 584-A is associated with minimum value 583, and end 584-B is associated with maximum value 585. Minimum value 583 and maximum value 585 define a range of values for value selection bar 582. In FIG. 5N, minimum value 583 has the value 4,000,000 and maximum value 585 has the value 5,000,000. The range of values defined by minimum value 583 and maximum value 585 is within the range of values for value selection bar 568 (i.e., the range of values defined by minimum value 569 and maximum value 571). Value selection object 580 may be moved on value selection bar 582 along primary axis 553-C, and the range of movement of value selection object 580 is bound by ends 584-A and 584-B.

In some embodiments, in response to detecting the third gesture, the device maintains display of the indicia of one or more additional value selection bars (846). As shown in FIG. 5N, in response to the detection of gesture 576, indicator 559 remains displayed (if there are additional value selection bars available).

In some embodiments, in response to detecting the third gesture, the device disables the second value selection bar (848). As shown in FIG. 5N, in response to the detection of gesture 576, value selection bar 568 is disabled; value selection object 566 is locked in place.

In some embodiments, the second value is substantially centered within the third range of values (850). In other words, in some embodiments, the third range of values is centered about the current value in the numerical field. For example, in FIG. 5N, the range for value selection bar 582 (4,000,000 to 5,000,000) is substantially centered about value 504 (4,552,345).

In some embodiments, the device detects a fourth user input that moves the third value selection object within the third value selection bar (852). In response to detecting the fourth user input, the device enters a third value within the third range of values into the numerical value field based on a position of the third value selection object on the third values selection bar, the third value replacing the second value (856). For example, in FIG. 5N, gesture 586 is detected on value selection object 580. In response to the detection of gesture 586, value selection object 580 is moved to a different position on value selection bar 582. In response to the detection of gesture 586, a value (4,702,335) within the range of values defined by minimum value 583 and maximum value 585 is entered as value 504 into cell 505 based on the new position of value selection object 580 on value selection bar 582 (FIG. 5O).

In some embodiments, the second user input, the first gesture, the third user input, the third gesture, and the fourth input are made in sequence by a single continuous contact with the touch-sensitive surface (854). For example, gestures 558, 562, 572, 576, and 586 may be one continuous gesture in sequence with no intervening liftoff of the contact.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to methods 600 and 700 (e.g., FIGS. 6A-6C and 7A-7D respectively) are also applicable in an analogous manner to method 800 described above with respect to FIGS. 8A-8C. For example, value 504 and cell 505 described above with reference to method 800 may have one or more of the characteristics of the value 504 and cell 505 described herein with reference to methods 600 and 700. For brevity, these details are not repeated here.

Figure 9:
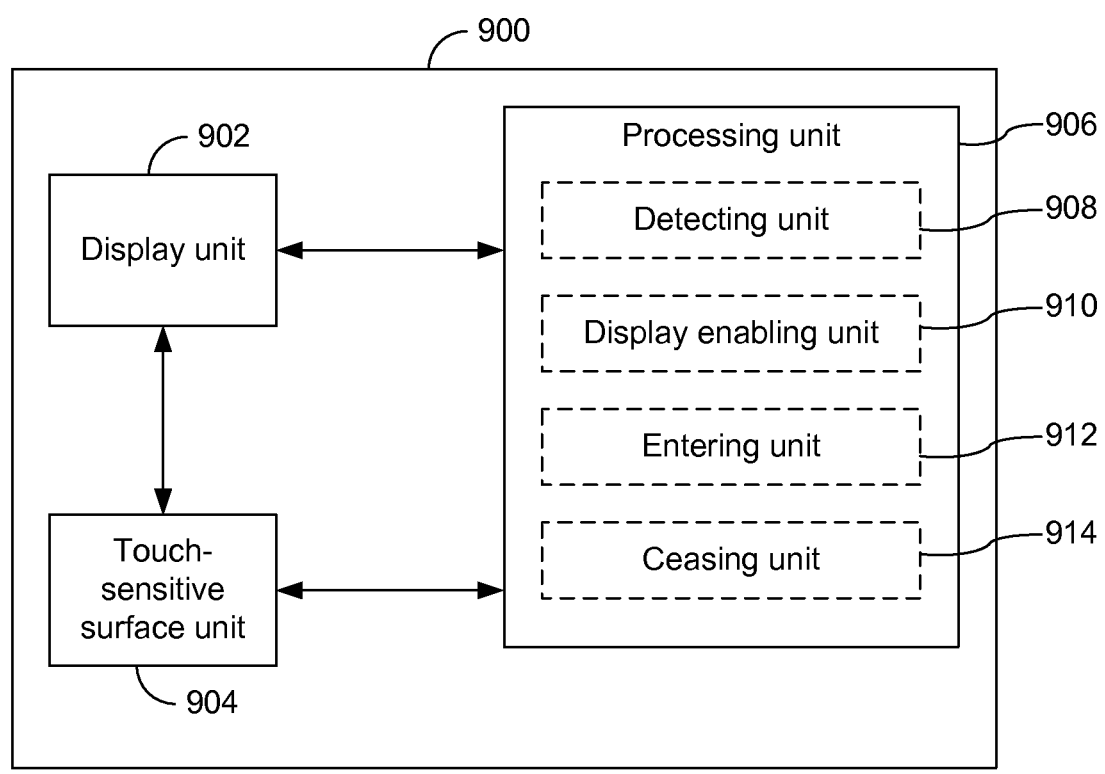
FIG. 9 is a functional block diagram of an electronic device in accordance with some embodiments.

In accordance with some embodiments, FIG. 9 shows a functional block diagram of an electronic device 900 configured in accordance with the principles of the invention as described above. The functional blocks of the device may be implemented by hardware, software, or a combination of hardware and software to carry out the principles of the invention. It is understood by persons of skill in the art that the functional blocks described in FIG. 9 may be combined or separated into sub-blocks to implement the principles of the invention as described above. Therefore, the description herein may support any possible combination or separation or further definition of the functional blocks described herein.

As shown in FIG. 9, an electronic device 900 includes a display unit 902 configured to display a first numerical value field at a first magnification level; a touch-sensitive surface unit 904 configured to receive user inputs and gestures; and a processing unit 906 coupled to the display unit 902 and the touch-sensitive surface unit 904. In some embodiments, the processing unit 906 includes a detecting unit 908, a display enabling unit 910, an entering unit 912, and a ceasing unit 914.

The processing unit 906 is configured to: detect a first user input that selects the first numerical value field (e.g., with the detecting unit 908); in response to detecting the first input, enable display of a value selection bar at a first length along a primary axis, and enable display of a value selection object on the value selection bar (e.g., with the display enabling unit 910), wherein: the value selection bar has a first end and a second end on the primary axis, the first end associated with a minimum value, and the second end, opposite the first end, associated with a maximum value, the minimum value and the maximum value defining a range of values associated with the value selection bar; and the value selection object is movable on the value selection bar along the primary axis within bounds of the first end and the second end; while the value selection bar is displayed at the first length: detect a second user input that moves the value selection object on the value selection bar (e.g., with the detecting unit 908); in response to detecting the second input, enter a first value within the range of values into the first numerical value field based on a position of the value selection object on the value selection bar (e.g., with the entering unit 912); detect a gesture on the value selection bar (e.g., with the detecting unit 908); and in response to detecting the gesture, enable display of the value selection bar at a second length along the primary axis, the second length different from the first length, while maintaining display of the first numerical value field at the first magnification level (e.g., with the display enabling unit 910); while the value selection bar is displayed at the second length: detect a third user input that moves the value selection object within the value selection bar (e.g., with the detecting unit 908); and in response to detecting the third user input, enter a second value within the range of values into the first numerical value field based on a position of the value selection object on the value selection bar, the second value replacing the first value (e.g., with the entering unit 912).

In some embodiments, the value selection bar is displayed proximate to the first numerical value field.

In some embodiments, the gesture is a multi-contact gesture having at least one contact on the value selection bar, the multi-contact gesture including movement of at least one contact along the primary axis.

In some embodiments, the gesture on the value selection bar is a depinch gesture, and the second length is greater than the first length.

In some embodiments, the gesture on the value selection bar is a pinch gesture, and the second length is less than the first length.

In some embodiments, the minimum value is equal to a value in a second numerical value field distinct from the first numerical value field.

In some embodiments, the maximum value is equal to a value in a third numerical value field distinct from the first numerical value field and the second numerical value field.

In some embodiments, the first numerical value field is a cell in a spreadsheet.

In some embodiments, the processing unit 906 is configured to: after entering the second value, detect a fourth user input away from the value selection bar (e.g., with the detecting unit 908); in response to detecting the fourth user input, cease to display the value selection bar while maintaining display of the second value in the first numerical value field at the first magnification level (e.g., with the ceasing unit 914); after ceasing to display the value selection bar while maintaining display of the second value in the first numerical value field, detect a fifth user input (e.g., with the detecting unit 908); and, in response to detecting the fifth user input, re-enable display of the value selection bar at the first length while maintaining display of the second value in the first numerical value field at the first magnification level (e.g., with the display enabling unit 910).

In some embodiments, the processing unit 906 is configured to: after entering the second value, detect a fourth user input away from the value selection bar (e.g., with the detecting unit 908); in response to detecting the fourth user input, cease to display the value selection bar while maintaining display of the second value in the first numerical value field at the first magnification level (e.g., with the ceasing unit 914); after ceasing to display the value selection bar while maintaining display of the second value in the first numerical value field, detect a fifth user input (e.g., with the detecting unit 908); and, in response to detecting the fifth user input, re-enable display of the value selection bar at the second length while maintaining display of the second value in the first numerical value field at the first magnification level (e.g., with the display enabling unit 910).

Figure 10:
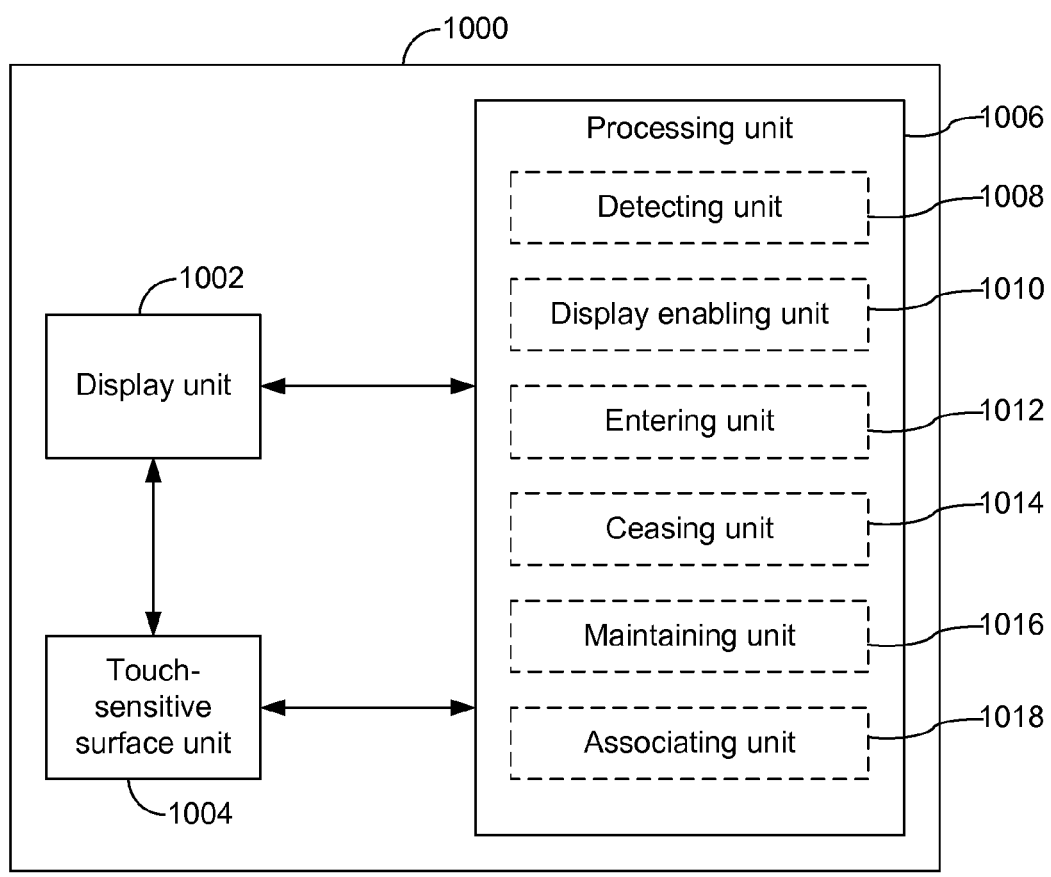
FIG. 10 is a functional block diagram of an electronic device in accordance with some embodiments.

In accordance with some embodiments, FIG. 10 shows a functional block diagram of an electronic device 1000 configured in accordance with the principles of the invention as described above. The functional blocks of the device may be implemented by hardware, software, or a combination of hardware and software to carry out the principles of the invention. It is understood by persons of skill in the art that the functional blocks described in FIG. 10 may be combined or separated into sub-blocks to implement the principles of the invention as described above. Therefore, the description herein may support any possible combination or separation or further definition of the functional blocks described herein.

As shown in FIG. 10, an electronic device 1000 includes a display unit 1002 configured to display a first numerical value field; a touch-sensitive surface unit 1004 configured to receive user inputs and gestures; and a processing unit 1006 coupled to the display unit 1002 and the touch-sensitive surface unit 1004. In some embodiments, the processing unit 1006 includes a detecting unit 1008, a display enabling unit 1010, an entering unit 1012, a ceasing unit 1014, a maintaining unit 1016, and an associating unit 1018.

The processing unit 1006 is configured to: detect a first user input that selects the first numerical value field (e.g., with the detecting unit 1008); in response to detecting the first input, enable display of a value selection bar, the value selection bar having a length along a primary axis, and enable display of a value selection object on the value selection bar (e.g., with the display enabling unit 1010), wherein: the value selection bar has a first end and a second end on the primary axis, the first end associated with a first minimum value, and the second end, opposite the first end, associated with a first maximum value, the first minimum value and the first maximum value defining a first range of values associated with the value selection bar; and the value selection object is movable on the value selection bar along the primary axis within bounds of the first end and the second end; detect a second user input that moves the value selection object on the value selection bar (e.g., with the detecting unit 1008); in response to detecting the second user input, enter a first value within the first range of values into the first numerical value field based on a position of the value selection object on the value selection bar (e.g., with the entering unit 1012); detect a gesture on the value selection bar (e.g., with the detecting unit 1008); in response to detecting the gesture: maintaining the length of the value selection bar along the primary axis (e.g., with the maintaining unit 1016); and associating the first end with a second minimum value and associating the second end with a second maximum value, the second minimum value and the second maximum value defining a second range of numerical values associated with the value selection bar, the second range of numerical values being distinct from the first range of numerical values (e.g., with the associating unit 1018); while the value selection bar corresponds to the second range of numerical values, detecting a third user input that moves the value selection object within the value selection bar (e.g., with the detecting unit 1008); and in response to detecting the third user input, entering a second numerical value within the second range of numerical values into the first numerical value field based on a position of the value selection object on the value selection bar, the second numerical value replacing the first numerical value (e.g., with the entering unit 1012).

In some embodiments, the value selection bar is displayed proximate to the first numerical value field.

In some embodiments, the gesture is a multi-contact gesture having at least one contact on the value selection bar, the multi-contact gesture including movement of at least one contact along the primary axis.

In some embodiments, the gesture on the value selection bar is a depinch gesture, and the second range of values is smaller than the first range of values.

In some embodiments, the gesture on the value selection bar is a pinch gesture, and the second range of values is larger than the first range of values.

In some embodiments, the first minimum value is equal to a value in a second numerical value field distinct from the first numerical value field.

In some embodiments, the second minimum value is greater than or equal to the value in the second numerical value field.

In some embodiments, the first maximum value is equal to a value in a third numerical value field distinct from the first numerical value field and the second numerical value field.

In some embodiments, the second maximum value is less than or equal to the value in the third numerical value field.

In some embodiments, the first value is substantially centered within the second range of values.

In some embodiments, the first numerical value field is a cell in a spreadsheet.

In some embodiments, the second range of values is within the first range of values.

In some embodiments, wherein enabling display of the value selection bar includes enabling display of value increment markers on the value selection bar with a first spacing distance between adjacent value increment markers.

In some embodiments, the processing unit 1006 is configured to: in response to detecting the gesture, enable display of the value increment markers on the value selection bar with a second spacing distance between adjacent value increment markers distinct from the first spacing distance (e.g., with the display enabling unit 1010).

In some embodiments, the second spacing distance is greater than the first spacing distance.

In some embodiments, the second spacing distance is less than the first spacing distance.

In some embodiments, wherein the processing unit 1006 is configured to: after entering the second value, detect a fourth user input away from the value selection bar (e.g., with the detecting unit 1008); in response to detecting the fourth user input, cease to display the value selection bar while maintaining display of the second value in the first numerical value field (e.g., with the ceasing unit 1014); after ceasing to display the value selection bar while maintaining display of the second value in the first numerical value field, detect a fifth user input (e.g., with the detecting unit 1008); and, in response to detecting the fifth user input, re-enable display of the value selection bar while maintaining display of the second value in the first numerical value field, the first range of numerical values being associated with the redisplayed value selection bar (e.g., with the display enabling unit 1010).

In some embodiments, wherein the processing unit 1006 is configured to: after entering the second value, detect a fourth user input away from the value selection bar (e.g., with the detecting unit 1008); in response to detecting the fourth user input, cease to display the value selection bar while maintaining display of the second value in the first numerical value field (e.g., with the ceasing unit 1014); after ceasing to display the value selection bar while maintaining display of the second value in the first numerical value field, detect a fifth user input (e.g., with the detecting unit 1008); and, in response to detecting the fifth user input, re-enable display of the value selection bar while maintaining display of the second value in the first numerical value field, the second range of numerical values being associated with the redisplayed value selection bar (e.g., with the display enabling unit 1010).

Figure 11:
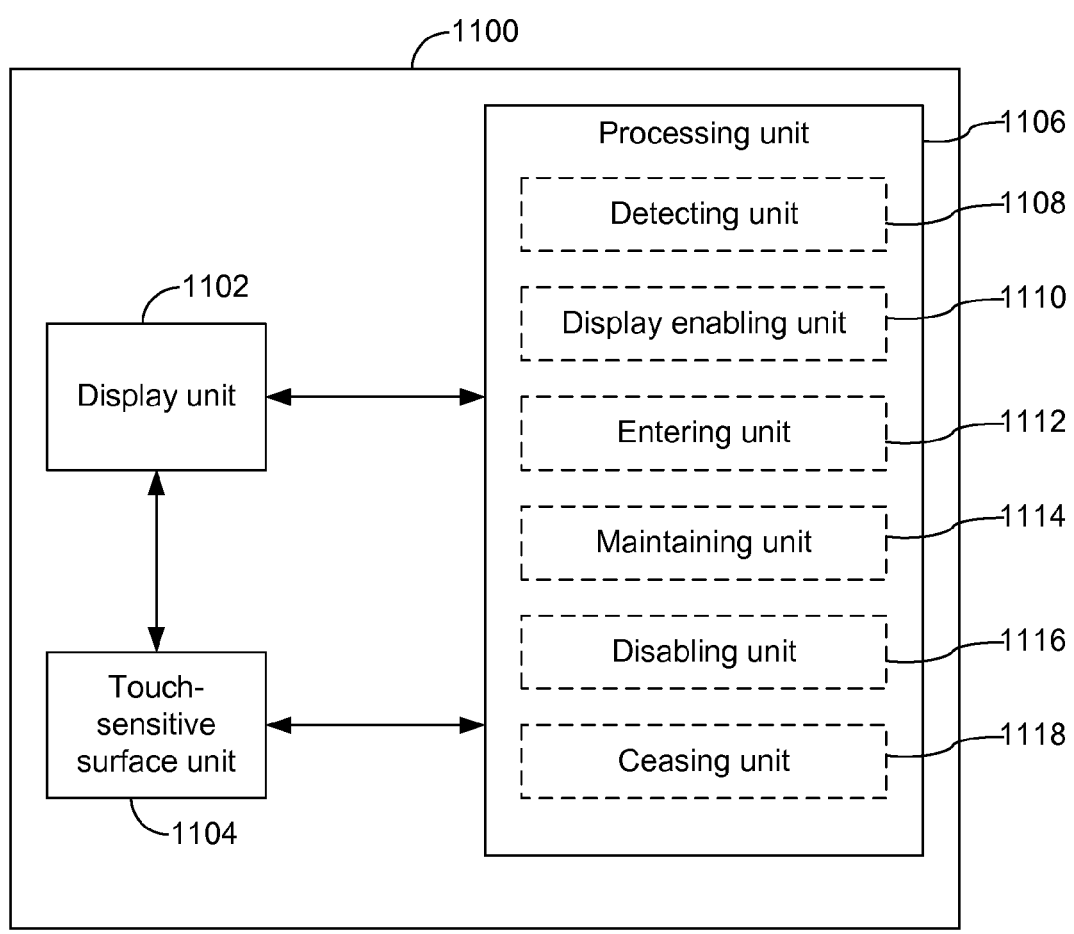
FIG. 11 is a functional block diagram of an electronic device in accordance with some embodiments.

In accordance with some embodiments, FIG. 11 shows a functional block diagram of an electronic device 1100 configured in accordance with the principles of the invention as described above. The functional blocks of the device may be implemented by hardware, software, or a combination of hardware and software to carry out the principles of the invention. It is understood by persons of skill in the art that the functional blocks described in FIG. 11 may be combined or separated into sub-blocks to implement the principles of the invention as described above. Therefore, the description herein may support any possible combination or separation or further definition of the functional blocks described herein.

As shown in FIG. 11, an electronic device 1100 includes a display unit 1102 configured to display a numerical value field; a touch-sensitive surface unit 1104 configured to receive user inputs and gestures; and a processing unit 1106 coupled to the display unit 1102 and the touch-sensitive surface unit 1104. In some embodiments, the processing unit 1106 includes a detecting unit 1108, a display enabling unit 1110, an entering unit 1112, a maintaining unit 1114, a disabling unit 1116, and a ceasing unit 1118.

The processing unit 1106 is configured to: detect a first user input selecting the numerical value field (e.g., with the detecting unit 1108); in response to detecting the first input, enable display of a first value selection bar having a first primary axis and a first value selection object on the first value selection bar (e.g., with the display enabling unit 1110), wherein: the first value selection bar has a first end and a second end on the first primary axis, the first end associated with a first minimum value, and the second end, opposite the first end, associated with a first maximum value, the first minimum value and the first maximum value defining a first range of values associated with the first value selection bar; and the first value selection object is movable on the first value selection bar along the first primary axis within bounds of the first end and the second end; detect a second user input that moves the first value selection object on the first value selection bar (e.g., with the detecting unit 1008); in response to detecting the second input, enter a first value within the first range of values into the numerical value field based on a position of the first value selection object on the first value selection bar (e.g., with the entering unit 1112); detect a first gesture, the first gesture including a contact moving in a first direction (e.g., with the detecting unit 1008); in response to detecting the first gesture, enable display of a second value selection bar having a second primary axis and a second value selection object on the second value selection bar (e.g., with the display enabling unit 1110), wherein: the second value selection bar has a third end and a fourth end on the second primary axis, the third end associated with a second minimum value, and the fourth end, opposite the third end, associated with a second maximum value, the second minimum value and the second maximum value defining a second range of values associated with the second value selection bar, wherein the second range of values is within the first range of values; and the second value selection object is movable on the second value selection bar along the second primary axis within bounds of the third end and the fourth end; detect a third user input that moves the second value selection object within the second value selection bar (e.g., with the detecting unit 1008); and in response to detecting the third user input, enter a second value within the second range of values into the numerical value field based on a position of the second value selection object on the second values selection bar, the second value replacing the first value (e.g., with the entering unit 1112).

In some embodiments, the second primary axis is parallel to the first primary axis.

In some embodiments, the first direction is substantially perpendicular to the first primary axis.

In some embodiments, the first value selection bar and the second value selection bar have the same length.

In some embodiments, the first value is substantially centered within the second range of values.

In some embodiments, the processing unit 1106 is configured to: in response to detecting the first input, enable display of an indicia of one or more additional value selection bars (e.g., with the display enabling unit 1110).

In some embodiments, the processing unit 1106 is configured to: in response to detecting the first gesture, maintain display of the indicia of one or more additional value selection bars (e.g., with the maintaining unit 1114).

In some embodiments, the processing unit 1106 is configured to: in response to detecting the first gesture, disable the first value selection bar (e.g., with the disabling unit 1116).

In some embodiments, the second user input, the first gesture, and the third user input are made in sequence by a single continuous contact with the touch-sensitive surface unit 1104.

In some embodiments, the processing unit 1106 is configured to: detect a second gesture, the second gesture including a contact moving in a second direction opposite the first direction (e.g., with the detecting unit 1108); in response to detecting the second gesture, cease to display the second value selection bar and the second value selection object (e.g., with the ceasing unit 1118).

In some embodiments, the processing unit 1106 is configured to: while displaying the second value in the numerical value field, detect a third gesture, the third gesture including a contact moving in the first direction (e.g., with the detecting unit 1108); in response to detecting the third gesture, enable display of a third value selection bar having a third primary axis and a third value selection object on the third value selection bar (e.g., with the display enabling unit 1110), wherein: the third value selection bar has a fifth end and a sixth end on the third primary axis, the fifth end associated with a third minimum value, and the sixth end, opposite the fifth end, associated with a third maximum value, the third minimum value and the third maximum value defining a third range of values associated with the third value selection bar, wherein the third range of values is within the second range of values; and the third value selection object is movable on the third value selection bar along the third primary axis within bounds of the fifth end and the sixth end; detect a fourth user input that moves the third value selection object within the third value selection bar (e.g., with the detecting unit 1108); and in response to detecting the fourth user input, enter a third value within the third range of values into the numerical value field based on a position of the third value selection object on the third values selection bar, the third value replacing the second value (e.g., with the entering unit 1112).

In some embodiments, the processing unit 1106 is configured to: in response to detecting the third gesture, maintain display of the indicia of one or more additional value selection bars (e.g., with the maintaining unit 1114).

In some embodiments, the processing unit 1106 is configured to: in response to detecting the third gesture, disable the second value selection bar (e.g., with the disabling unit 1116).

In some embodiments, the second value is substantially centered within the third range of values.

In some embodiments, the second user input, the first gesture, the third user input, and the third gesture are made in sequence by a single continuous contact with the touch-sensitive surface unit 1104.

In some embodiments, the second user input, the first gesture, the third user input, the third gesture, and the fourth input are made in sequence by a single continuous contact with the touch-sensitive surface unit 1104.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6C, 7A-7D, and 8A-8C may be implemented by components depicted in FIGS. 1A-1B. For example, detection operations 606, 618, 622, 634, displaying operations 608, 624, and entering operations 620, 636 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising: a display;
a touch-sensitive surface;
one or more processors;
memory; and
one or more programs, wherein the one or more programs are stored in the memory and configured to be executed by the one or more processors, the one or more programs including instructions for:
displaying a first numerical value field at a first magnification level;
detecting a first user input that selects the first numerical value field;
in response to detecting the first input, displaying a value selection bar at a first length along a primary axis, the first length of the value selection bar representing a first range of values for the first numerical field;
displaying a moveable value selection object on the value selection bar, the position of the value selection object corresponding to the value displayed in the first numerical value field;
detecting a user gesture on the value selection bar; and
in response to detecting the gestured;
displaying the value selection bar at a second length along the primary axis, the second length different from the first length, the second length representing the first range of values for the first numerical field and the position of the value selection object corresponding to the value displayed in the first numerical value field; and
maintaining display of the first numerical value field at the first magnification level; while the value selection bar is displayed at the second length:
detecting a third user input that moves the value selection object within the value selection bar; and
in response to detecting the third user input, entering a second value within the range of values into the first numerical value field based on a position of the value selection object on the value selection bar, the second value replacing the first value.

2. The device of claim 1, wherein the gesture is a multi-contact gesture having at least one contact on the value selection bar, the multi-contact gesture including movement of at least one contact along the primary axis.

3. The device of claim 1, wherein the gesture on the value selection bar is a depinch gesture, and the second length is greater than the first length.

4. The device of claim 1, wherein the gesture on the value selection bar is a pinch gesture, and the second length is less than the first length.

5. The device of claim 1, including:
after entering the second value, detecting a fourth user input away from the value selection bar;
in response to detecting the fourth user input, ceasing to display the value selection bar while maintaining display of the second value in the first numerical value field at the first magnification level;
after ceasing to display the value selection bar while maintaining display of the second value in the first numerical value field, detecting a fifth user input; and, in response to detecting the fifth user input, redisplaying the value selection bar at the first length while maintaining display of the second value in the first numerical value field at the first magnification level.

6. The device of claim 1, including:

after entering the second value, detecting a fourth user input away from the value selection bar;

in response to detecting the fourth user input, ceasing to display the value selection bar while maintaining display of the second value in the first numerical value field at the first magnification level;

after ceasing to display the value selection bar while maintaining display of the second value in the first numerical value field, detecting a fifth user input; and, in response to detecting the fifth user input, redisplaying the value selection bar at the second length while maintaining display of the second value in the first numerical value field at the first magnification level.

7. An electronic device, comprising:

a display;

a touch-sensitive surface;

one or more processors;

memory; and one or more programs, wherein the one or more programs are stored in the memory and configured to be executed by the one or more processors, the one or more programs including instructions for:

displaying a first numerical value field;

detecting a first user input that selects the first numerical value field;

in response to detecting the first input, displaying a value selection bar, the value selection bar having a length along a primary axis, and displaying a value selection object on the value selection bar, wherein:

the value selection bar has a first end and a second end on the primary axis, the first end associated with a first minimum value, and the second end, opposite the first end, associated with a first maximum value, the first minimum value and the first maximum value defining a first range of values associated with the value selection bar; and the value selection object is movable on the value selection bar along the primary axis within bounds of the first end and the second end;

detecting a second user input that moves the value selection object on the value selection bar;

in response to detecting the second user input, entering a first value within the first range of values into the first numerical value field based on a position of the value selection object on the value selection bar;

detecting a gesture on the value selection bar;

in response to detecting the gesture:

maintaining the length of the value selection bar along the primary axis; and associating the first end with a second minimum value and associating the second end with a second maximum value, the second minimum value and the second maximum value defining a second range of numerical values associated with the value selection bar, the second range of numerical values being distinct from the first range of numerical values;

while the value selection bar corresponds to the second range of numerical values, detecting a third user input that moves the value selection object within the value selection bar; and in response to detecting the third user input, entering a second numerical value within the second range of numerical values into the first numerical value field based on a position of the value selection object on the value selection bar, the second numerical value replacing the first numerical value.

8. The device of claim 7, wherein the gesture is a multi-contact gesture having at least one contact on the value selection bar, the multi-contact gesture including movement of at least one contact along the primary axis.

9. The device of claim 7, wherein the gesture on the value selection bar is a depinch gesture, and the second range of values is smaller than the first range of values.

10. The device of claim 7, wherein the gesture on the value selection bar is a pinch gesture, and the second range of values is larger than the first range of values.

11. The device of claim 7, wherein the second range of values is within the first range of values.

12. The device of claim 7, including:

after entering the second value, detecting a fourth user input away from the value selection bar;

in response to detecting the fourth user input, ceasing to display the value selection bar while maintaining display of the second value in the first numerical value field;

after ceasing to display the value selection bar while maintaining display of the second value in the first numerical value field, detecting a fifth user input; and, in response to detecting the fifth user input, redisplaying the value selection bar while maintaining display of the second value in the first numerical value field, the first range of numerical values being associated with the redisplayed value selection bar.

13. The device of claim 7, including:

after entering the second value, detecting a fourth user input away from the value selection bar;

in response to detecting the fourth user input, ceasing to display the value selection bar while maintaining display of the second value in the first numerical value field;

after ceasing to display the value selection bar while maintaining display of the second value in the first numerical value field, detecting a fifth user input; and, in response to detecting the fifth user input, redisplaying the value selection bar while maintaining display of the second value in the first numerical value field, the second range of numerical values being associated with the redisplayed value selection bar.

14. An electronic device, comprising:

a display;

a touch-sensitive surface;

one or more processors;

memory; and one or more programs, wherein the one or more programs are stored in the memory and configured to be executed by the one or more processors, the one or more programs including instructions for:

displaying a numerical value field;

detecting a first user input selecting the numerical value field;

in response to detecting the first input, displaying a first value selection bar having a first primary axis and a first value selection object on the first value selection bar, wherein:

the first value selection bar has a first end and a second end on the first primary axis, the first end associated with a first minimum value, and the second end, opposite the first end, associated with a first maximum value, the first minimum value and the first maximum value defining a first range of values associated with the first value selection bar; and the first value selection object is movable on the first value selection bar along the first primary axis within bounds of the first end and the second end;

detecting a second user input that moves the first value selection object on the first value selection bar;

in response to detecting the second input, entering a first value within the first range of values into the numerical value field based on a position of the first value selection object on the first value selection bar;

detecting a first gesture, the first gesture including a contact moving in a first direction;

in response to detecting the first gesture, displaying a second value selection bar having a second primary axis with a second length equal to the first length and a second value selection object on the second value selection bar, wherein:

the second value selection bar has a third end and a fourth end on the second primary axis, the third end associated with a second minimum value, and the fourth end, opposite the third end, associated with a second maximum value, the second minimum value and the second maximum value defining a second range of values associated with the second value selection bar, wherein the second range of values is within the first range of values; and the second value selection object is movable on the second value selection bar along the second primary axis within bounds of the third end and the fourth end;

detecting a third user input that moves the second value selection object within the second value selection bar; and in response to detecting the third user input, entering a second value within the second range of values into the numerical value field based on a position of the second value selection object on the second values selection bar, the second value replacing the first value.

15. The device of claim 14, including:
in response to detecting the first input, displaying an indicia of one or more additional value selection bars.

16. The device of claim 15, including:
in response to detecting the first gesture, maintaining display of the indicia of one or more additional value selection bars.

17. The device of claim 14, including:
in response to detecting the first gesture, disabling the first value selection bar.

18. The device of claim 14, wherein the second user input, the first gesture, and the third user input are made in sequence by a single continuous contact with the touch-sensitive surface.

19. The device of claim 14, including:
detecting a second gesture, the second gesture including a contact moving in a second direction opposite the first direction;

in response to detecting the second gesture, ceasing to display the second value selection bar and the second value selection object.

20. The device of claim 14, including:
while displaying the second value in the numerical value field, detecting a third gesture, the third gesture including a contact moving in the first direction;

in response to detecting the third gesture, displaying a third value selection bar having a third primary axis and a third value selection object on the third value selection bar, wherein:

the third value selection bar has a fifth end and a sixth end on the third primary axis, the fifth end associated with a third minimum value, and the sixth end, opposite the fifth end, associated with a third maximum value, the third minimum value and the third maximum value defining a third range of values associated with the third value selection bar, wherein the third range of values is within the second range of values; and the third value selection object is movable on the third value selection bar along the third primary axis within bounds of the fifth end and the sixth end;

detecting a fourth user input that moves the third value selection object within the third value selection bar; and in response to detecting the fourth user input, entering a third value within the third range of values into the numerical value field based on a position of the third value selection object on the third values selection bar, the third value replacing the second value.

21. The device of claim 1, wherein the value selection bar has a first end and a second end on the primary axis, the first end associated with a minimum value, and the second end, opposite the first end, associated with a maximum value, the minimum value and the maximum value defining a range of values associated with the value selection bar and the value selection object is movable on the value selection bar along the primary axis within bounds of the first end and the second end.

* * * * *

UNITED STATES PATENT AND TRADEMARK OFFICE
CERTIFICATE OF CORRECTION

PATENT NO.         : 9,772,759 B2
APPLICATION NO.    : 13/323761
DATED              : September 26, 2017
INVENTOR(S)        : Edward P. A. Hogan Page 1 of 1

It is certified that error appears in the above-identified patent and that said Letters Patent is hereby corrected as shown below:

In the Claims

In Claim 1, Line 6, delete "gestured;" and insert -- gesture: --, therefor.

Signed and Sealed this
First Day of May, 2018

Andrei Iancu
*Director of the United States Patent and Trademark Office*